United States Patent
Oh

(10) Patent No.: US 12,218,724 B2
(45) Date of Patent: Feb. 4, 2025

(54) APPARATUS AND METHOD FOR TRACKING DIRECTIONAL BEAM

(71) Applicant: AIOU UNIVERSITY INDUSTRY-ACADEMIC COOPERATION FOUNDATION, Suwon-si (KR)

(72) Inventor: Seongkeun Oh, Yongin-si (KR)

(*) Notice: Subject to any disclaimer, the term of this patent is extended or adjusted under 35 U.S.C. 154(b) by 13 days.

(21) Appl. No.: 18/240,360

(22) Filed: Aug. 31, 2023

(65) Prior Publication Data
US 2024/0072860 A1 Feb. 29, 2024

(30) Foreign Application Priority Data
Aug. 31, 2022 (KR) .......... 10-2022-0109652

(51) Int. Cl.
*H04B 7/06* (2006.01)
*H04B 7/0408* (2017.01)

(52) U.S. Cl.
CPC ......... *H04B 7/0617* (2013.01); *H04B 7/0408* (2013.01); *H04B 7/0632* (2013.01)

(58) Field of Classification Search
CPC ................ H04B 7/0617; H04B 7/0408; H04B 7/0632; H04B 7/0695; H04B 7/088; H04B 17/309; H04W 24/02
See application file for complete search history.

(56) References Cited

U.S. PATENT DOCUMENTS

| | | | |
|---|---|---|---|
| 11,296,770 B2 * | 4/2022 | Wong | H04B 7/0632 |
| 2018/0123675 A1 * | 5/2018 | Shi | H04B 7/0695 |
| 2019/0319680 A1 * | 10/2019 | Zhang | H04B 7/0408 |

FOREIGN PATENT DOCUMENTS

| | | |
|---|---|---|
| KR | 10-2017-0101751 | 9/2017 |
| KR | 10-2018-0004017 | 1/2018 |
| KR | 10-2018-0026470 | 3/2018 |

(Continued)

OTHER PUBLICATIONS

English Specification of 10-2021-0098323.
(Continued)

*Primary Examiner* — Vineeta S Panwalkar
(74) *Attorney, Agent, or Firm* — ANTONIO HA & U.S. PATENT, LLC

(57) ABSTRACT

The present disclosure relates to a technology for controlling an antenna in a wireless communication system. A beam tracking apparatus comprises an antenna unit simultaneously generating a plurality of directional beams, a transceiver including at least one transceiver unit (TXRU) supplying a signal to the antenna unit or receiving a signal from the antenna unit, and a controller controlling beam generation of the antenna unit and TXRU assignment of the transceiver. The controller controls the antenna unit to generate a serving beam, receives a first signal from a target communication device using the serving beam, controls the antenna unit to generate at least one tracking beam oriented in a different direction from the serving beam while maintaining the serving beam, receives a second signal from the target communication device using the serving beam and the at least one tracking beam, and determines whether to change the serving beam based on the received first and second signals.

20 Claims, 23 Drawing Sheets

(56) References Cited

FOREIGN PATENT DOCUMENTS

KR  10-2018-0101336  9/2018
KR  10-2021-0098323  8/2021

OTHER PUBLICATIONS

English Specification of 10-2018-0004017.
English Specification of 10-2018-0026470.
English Specification of 10-2017-0101751.
English Specification of 10-2018-0101336.

* cited by examiner

FIG. 3
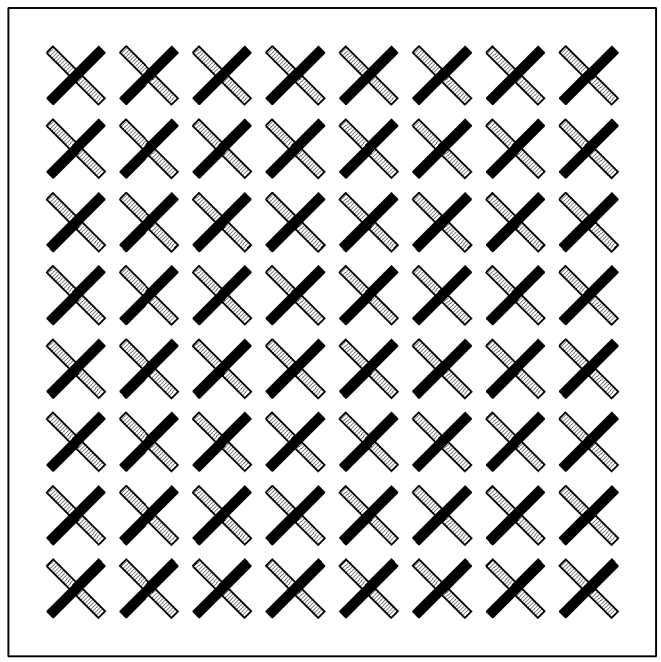
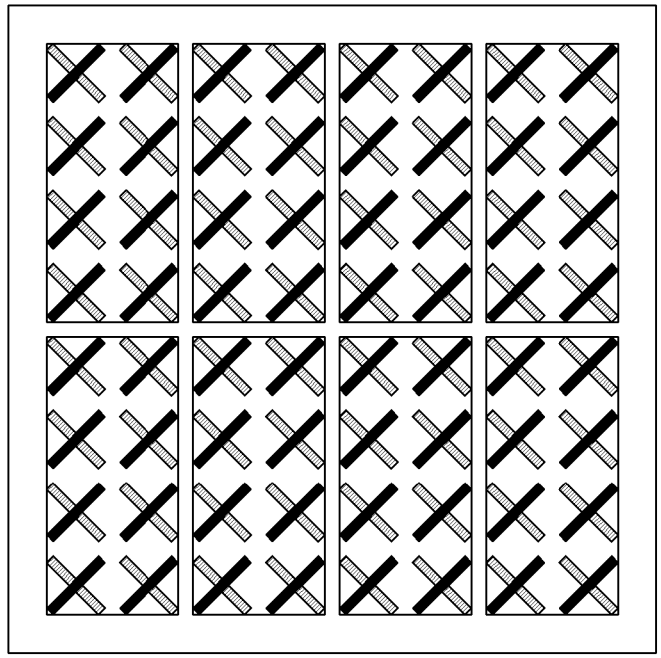
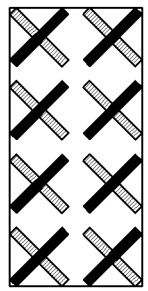
(A)
(B)

(a)　　　　　　　　　(b)　　　　　　　　　(c)

FIG. 30
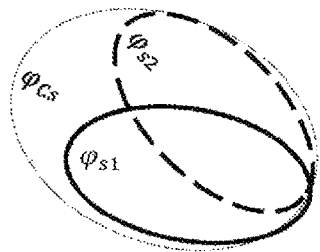
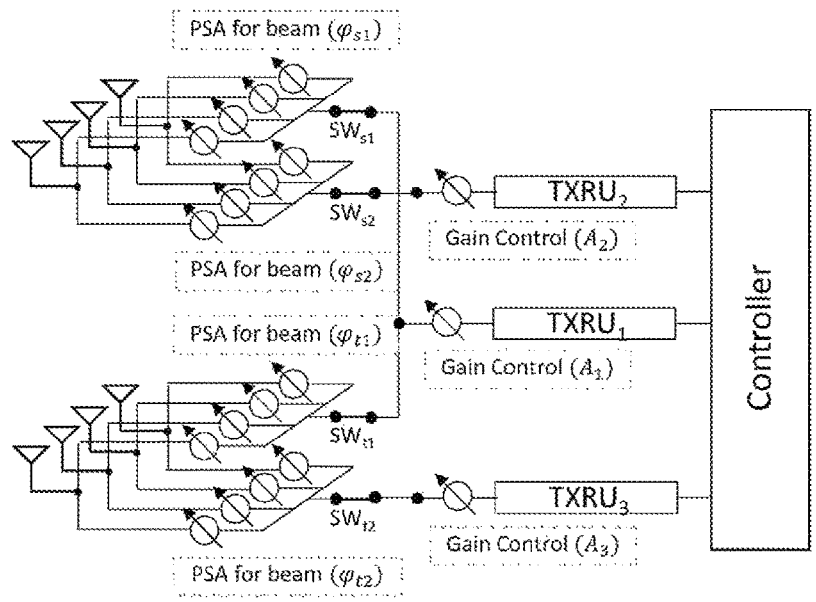
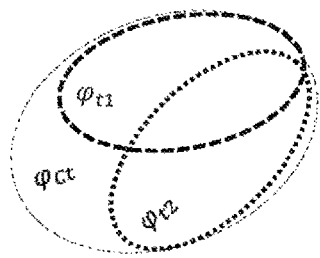
FIG. 31
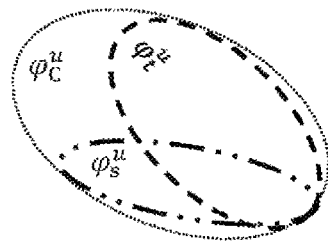
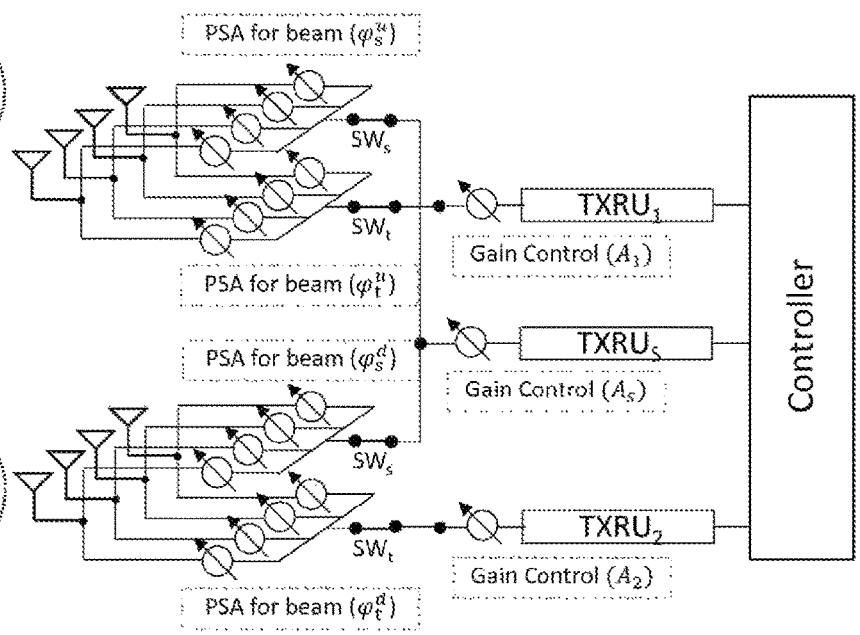
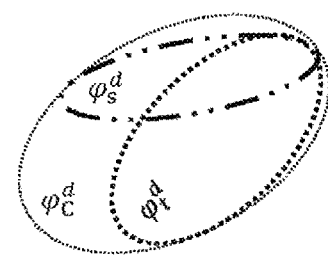

FIG. 32
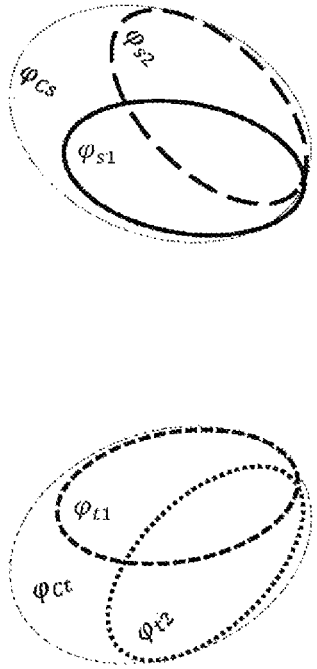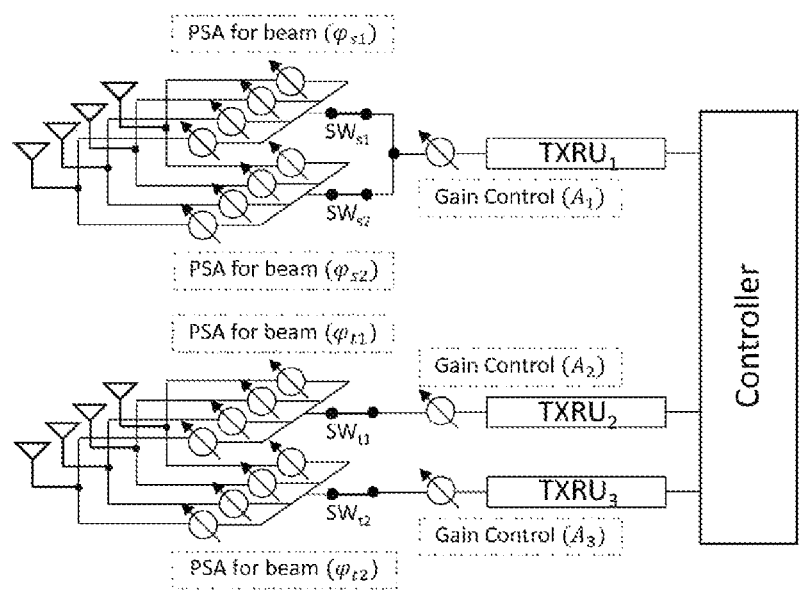
FIG. 33
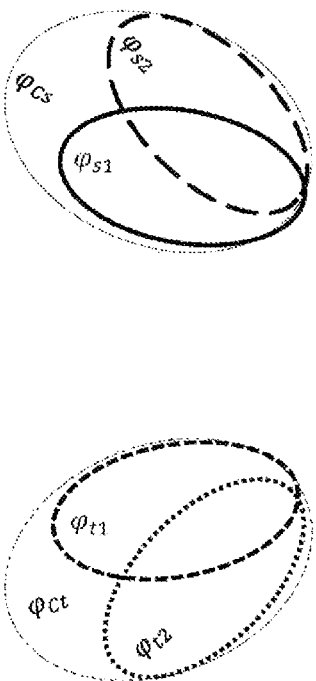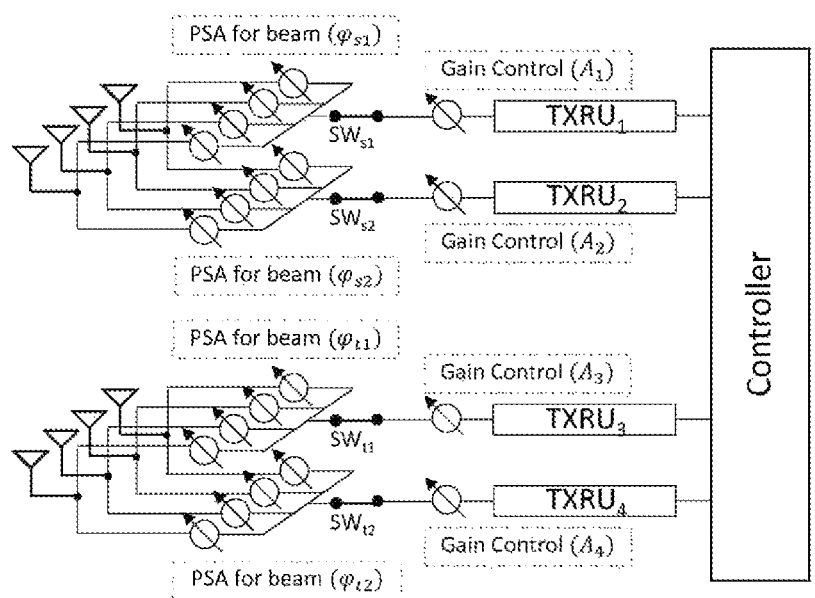

FIG. 34
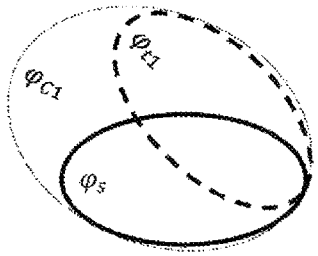
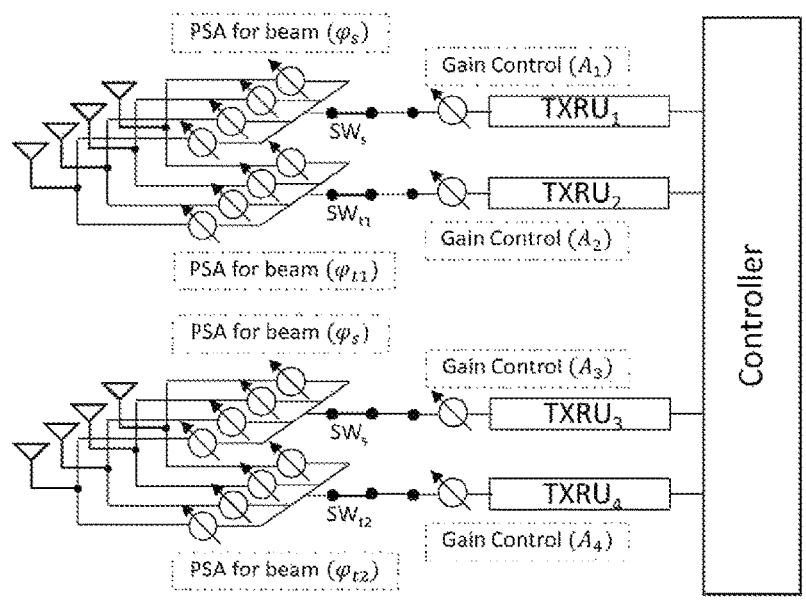
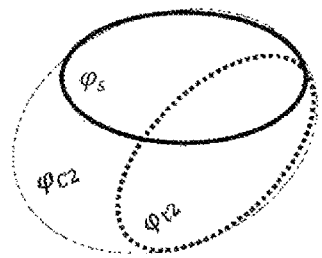
FIG. 35
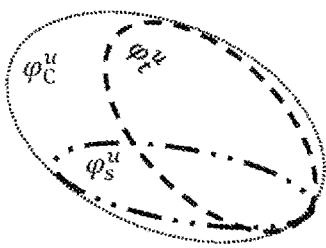
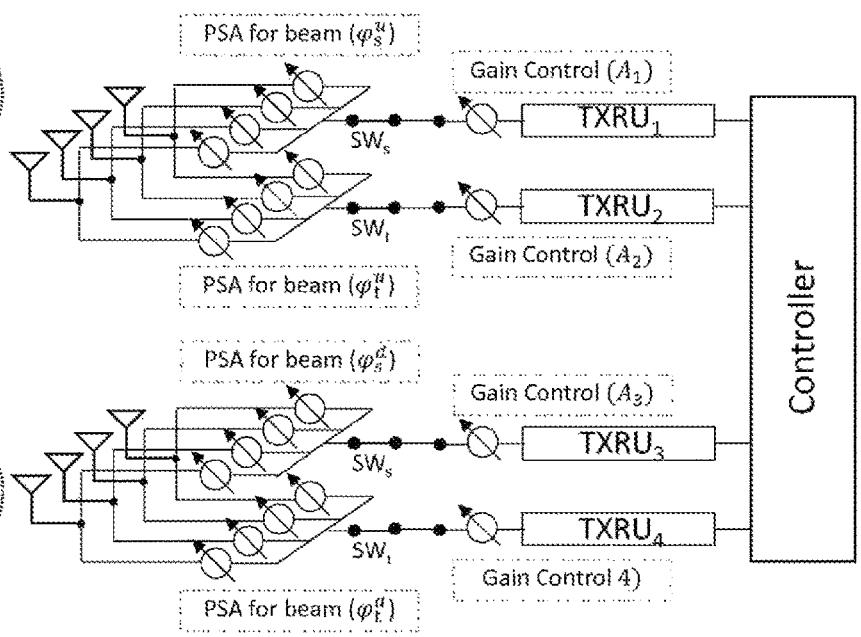
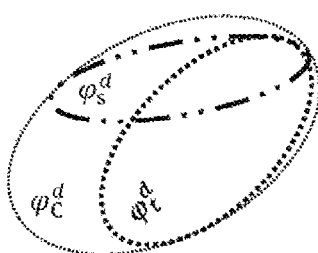

APPARATUS AND METHOD FOR TRACKING DIRECTIONAL BEAM

CROSS-REFERENCE TO RELATED APPLICATION(S)

This application claims priority to Korean Patent Application No. 10-2022-0109652 filed in the Korean Intellectual Property Office on Aug. 31, 2022, the disclosure of which is incorporated by reference herein in its entirety.

TECHNICAL FIELD

The present disclosure relates to a technology for controlling an antenna in a wireless communication system. More particularly, the present disclosure relates to an apparatus and method for tracking a directional beam of a user equipment (UE) without causing a loss of resources and without service interruption in an environment where a location or a direction of the UE rapidly changes.

BACKGROUND

In the past, mobile communication systems were focused on voice services, but a central axis of services is shifting to data services due to the increasing demand for high-quality multimedia services. Hence, a next-generation wireless transmission technology for rapidly and more reliably transmitting large amounts of data and various technologies, such as a beam forming technology for forming a directional beam, a diversity transmission, and a multiplexing transmission technology, to support this technology, have been proposed.

The 5G New Radio (NR) system standard based on a millimeter wave frequency band defines a communication method using multiple beams for both a gNodeB (gNB) and a user equipment (UE) for the purpose of securing a link budget and cancelling interference. To this end, an initial access subframe and a standard subframe are separately defined. The initial access subframe is used for configuring a communication link for newly scheduled UEs or for restoring a communication link after the communication link is disconnected, and the standard subframe is mainly used for data transmission. However, the method periodically checks a state of a pair of transmit (Tx) and receive (Rx) beams by periodically transmitting synchronization bursts for beam tracking and beam update in order to respond to rapid changes in a channel environment in a predetermined part of every standard subframe. If the state of the Tx-Rx beam pair deteriorates, the method searches for an optimal beam and updates the beam pair. In the prior art document presented below, a technique for performing beam tracking in a wireless communication system using a millimeter wave frequency band has been introduced.

However, this method periodically allocates a predetermined amount of resources to a base station for beam tracking and beam state check, and transmits a predetermined number of synchronization bursts or reference signal bursts. Hence, when the number of UEs increases or the number of beams of the UEs increases, a significant loss of resources is inevitable. If the number of subframes is increased to overcome this problem, beam tracking performance or communication service quality can be satisfactorily maintained, but a loss of resources is high. If the number of subframes is reduced, a period for beam update becomes longer, and it is difficult to actively respond to changes in beam directionality. Therefore, a reduction in the communication service quality resulting from path disconnection or beam direction mismatch may be inevitable. In particular, there may frequently occurs a situation where it is difficult for a mobile UE to maintain an optimal directional path with the gNB, etc. due to rapid 3D rotation, rapid 3D direction change, and rapid shaking as well as rapid mobility, and it may even fall into frequent path disconnection. The mobility, the 3D rotation, the 3D direction change, and the shaking are mainly caused by direction change including position change and/or rotation of a terminal such as the UE rather than a base station such as the gNB.

Accordingly, there is a strong need for a terminal-oriented beam search, tracking, and update method and system that does not require additional resource allocation, can actively respond to rapid channel state changes, and can maintain an optimal communication link without service interruption.

PRIOR ART DOCUMENT

[Patent Document] Korean Patent Application Publication No. 2017-0101751 entitled "Method and device for tracking and controlling beam in wireless communication system using millimeter wave frequency band".

SUMMARY

The technical problem to be solved by the present disclosure is to prevent a resource loss due to frequent control signal exchange and periodic reference signal transmission resulting from beam mismatch with a target communication device, prevent temporary service disconnection due to a beam search and switching procedure, and prevent communication quality reduction or communication link disconnection due to processing delay resulting from the beam search and switching by solving a problem of a rapid reduction of communication quality or disconnection of communication link when rapid and frequent changes in position and direction occur due to rapid mobility, rapid rotation, rapid direction change, and rapid shaking, etc. of a mobile UE in a wireless communication system; overcoming limitations of excessive demand for resources, increase in system load, and temporary service interruption in a conventional base station-oriented terminal tracking technology introduced for this problem; and enabling a mobile communication terminal to track a beam without an additional procedure with the target communication device when the mobile communication terminal uses a directional beam to communicate with the target communication device such as a base station, a relay, a repeater, or a cooperating device.

To solve the above-described technical problems, in one aspect of the present disclosure, there is provided a beam tracking apparatus comprising an antenna unit configured to simultaneously generate a plurality of directional beams; a transceiver including at least one transceiver unit (TXRU) configured to supply a signal to the antenna unit or receive a signal from the antenna unit; and a controller configured to control beam generation of the antenna unit and TXRU assignment of the transceiver, wherein the controller is configured to control the antenna unit to generate a serving beam, receive a first signal from a target communication device using the serving beam, control the antenna unit to generate at least one tracking beam oriented in a different direction from the serving beam while maintaining the serving beam, receive at least one second signal from the target communication device using the serving beam and the at least one tracking beam, and determine whether to change the serving beam based on the first signal and the at least one second signal.

The controller may be configured to measure a first signal quality of the first signal by receiving the first signal from the target communication device using the serving beam, measure at least one second signal quality of the at least one second signal by receiving the at least one second signal from the target communication device using the serving beam and the at least one tracking beam, and determine whether to change the serving beam based on the first signal quality and the at least one second signal quality.

The controller may be configured to calculate at least one comparison value based on a comparison metric from the first signal quality and the at least one second signal quality, select a best comparison value from among the at least one comparison value, and when the best comparison value is out of a preset threshold criterion for change, change the tracking beam generating the best comparison value to a new serving beam.

In the beam tracking apparatus according to one aspect, in order to receive the at least one second signal using the serving beam and the at least one tracking beam, the controller may be configured to receive the at least one second signal using the at least one tracking beam, or receive the at least one second signal by combining the serving beam and the at least one tracking beam, or receive the at least one second signal using at least one composite beam including a directionality of the serving beam and a directionality of the at least one tracking beam, or receive the first signal using the serving beam and at the same time receive the at least one second signal using the at least one tracking beam, at least one combination of the serving beam and the at least one tracking beam, or the at least one composite beam.

The antenna unit may include an antenna set based on an array antenna structure forming a beam pattern by combining individual antenna elements or a parasitic array antenna structure, a phase shifter connected to the antenna set and configured to control each of the antenna elements, and a gain controller configured to control a gain of the antenna set. The antenna set may include one or more antenna sets, and may simultaneously or sequentially generate a plurality of directional beams oriented in different directions, including the serving beam and the at least one tracking beam; or simultaneously or sequentially generate at least one composite beam including a directionality of the serving beam and a directionality of the at least one tracking beam; or simultaneously or sequentially generate the serving beam and the at least one composite beam. Simultaneously or sequentially generating the plurality of directional beams through the one or more antenna sets, one antenna set may generate a plurality of different directional beams, or at least two antenna sets each may generate at least one directional beam which is either the same or different among the sets. The phase shifter array may be provided according to the number of directional beams to be generated, and other phase shifter array flexibly operates to generate the at least one tracking beam or the at least one composite beam may variably operate while maintaining the operation of the phase shifter array corresponding to the serving beam.

In the beam tracking apparatus according to one aspect, for transmission and reception operations of the serving beam and the at least one tracking beam, the controller may be configured to individually assign one TXRU to each of the serving beam and the at least one tracking beam, individually assign one TXRU to a combination including at least two of the serving beam and the at least one tracking beam, individually assign one TXRU to each of a part of the serving beam and the at least one tracking beam and individually assign other one TXRU to a combination including at least two of other part, individually assign one TXRU to each of a part of at least one composite beam including a directionality of the serving beam and a directionality of the at least one tracking beam and individually assign other one TXRU to a combination including at least two composite beams of other part, assign one TXRU to the serving beam, and individually assign other one TXRU to each of part or all of the at least one tracking beam and individually assign the TXRU to a combination including at least two tracking beams in other part of the at least one tracking beam, or assign one TXRU to the serving beam, and individually assign the TXRU to a serving-tracking beam combination, which is at least one combination including the serving beam and at least one of the at least one tracking beam, or the at least one composite beam; and individually assign yet other one TXRU to at least two serving-tracking beam combinations or a combination of at least two composite beams for other part of the at least one serving-tracking beam combination or the at least one composite beam.

To solve the above-described technical problems, in another aspect of the present disclosure, there is provided a method of performing beam tracking by a communication device including an antenna unit simultaneously generating a plurality of directional beams, the method comprising steps of (a) generating a serving beam; (b) measuring a first signal quality of a first signal by receiving the first signal from a target communication device using the serving beam; (c) generating at least one tracking beam oriented in a different direction from the serving beam while maintaining the serving beam; (d) measuring at least one second signal quality of the at least one second signal by receiving the at least one second signal from the target communication device using the serving beam and the at least one tracking beam; and (e) determining whether to change the serving beam based on the first signal quality and the at least one second signal quality.

The step (c) of generating at least one tracking beam oriented in a different direction from the serving beam while maintaining the serving beam may comprise steps of (c1) by using one or more antenna sets based on an array antenna structure forming a beam pattern by combining individual antenna elements or a parasitic array antenna structure, simultaneously or sequentially generating a plurality of directional beams oriented in different directions, including the serving beam and the at least one tracking beam; or simultaneously or sequentially generating at least one composite beam including a directionality of the serving beam and a directionality of the at least one tracking beam; or simultaneously or sequentially generating the serving beam and the at least one composite beam; and (c2) by using a phase shifter array that is connected to the one or more antenna sets and is provided according to the number of directional beams to be generated, flexibly operating other phase shifter array to generate the at least one tracking beam or the at least one composite beam while maintaining the operation of the phase shifter array corresponding to the serving beam.

In the beam tracking method according to another aspect, for transmission and reception operations of the serving beam and the at least one tracking beam, the controller may be configured to individually assign one TXRU to each of the serving beam and the at least one tracking beam, individually assign one TXRU to a combination including at least two of the serving beam and the at least one tracking beam, individually assign one TXRU to each of a part of the serving beam and the at least one tracking beam and individually assign other one TXRU to a combination including at least two of other part, individually assign one TXRU to each of a part of at least one composite beam including a directionality of the serving beam and a directionality of the at least one tracking beam and individually assign other one TXRU to a combination including at least two composite beams of other part, assign one TXRU to the serving beam, and individually assign other one TXRU to each of part or all of the at least one tracking beam and individually assign yet other one TXRU to a combination including at least two tracking beams for other part of the at least one tracking beam, or assign one TXRU to the serving beam; and individually assign other one TXRU to each of all or part of at least one serving-tracking beam combination, which is at least one combination including the serving beam and at least one of the at least one tracking beam, or the at least one composite beam and individually assign yet other one TXRU to at least two serving-tracking beam combinations or a combination of at least two composite beams for other part of the at least one serving-tracking beam combination or the at least one composite beam.

In the beam tracking method according to another aspect, in order to receive the at least one second signal using the serving beam and the at least one tracking beam, the step (d) of measuring at least one second signal quality of the at least one second signal may comprise receiving the at least one second signal using the at least one tracking beam, or receiving the at least one second signal by combining the serving beam and the at least one tracking beam, or receiving the at least one second signal using at least one composite beam including a directionality of the serving beam and a directionality of the at least one tracking beam, or receiving the first signal using the serving beam and at the same time receiving the at least one second signal using the at least one tracking beam, at least one combination of the serving beam and the at least one tracking beam, or the at least one composite beam.

The step (e) of determining whether to change the serving beam may comprise steps of (e1) calculating at least one comparison value based on a comparison metric from the first signal quality and the at least one second signal quality; (e2) selecting a best comparison value from among the at least one comparison value; and (e3) when the best comparison value is out of a preset threshold criterion for change, changing the tracking beam generating the best comparison value to a new serving beam.

The beam tracking method according to another aspect may further comprise (f) repeatedly performing the steps (c) to (e) using at least one new tracking beam oriented in a different direction from the at least one tracking beam, wherein the step (f) may comprise generating the at least one new tracking beam oriented in the different direction from the at least one tracking beam while maintaining the serving beam through the step (c), measuring at least one new second signal quality by receiving at least one new second signal from the target communication device using the serving beam and the at least one new tracking beam through the step (d), and determining whether to change the serving beam based on the first signal quality and the at least one new second signal quality through the step (e).

To solve the above-described technical problems, in another aspect of the present disclosure, there is provided a method of performing beam tracking by a communication device including an antenna unit simultaneously generating a plurality of directional beams, the method comprising generating a serving beam; measuring a first signal quality of a first signal by receiving the first signal from a target communication device using the serving beam; simultaneously or sequentially generating a plurality of tracking beams oriented in a different direction from the serving beam or a plurality of composite beams based on the serving beam and the plurality of tracking beams while maintaining the serving beam; measuring a plurality of second signal qualities of a plurality of second signals by receiving the plurality of second signals from the target communication device using a plurality of combinations including the serving beam and the plurality of tracking beams or using the plurality of composite beams; and determining whether to change the serving beam by comparing the first signal quality with the plurality of second signal qualities.

In the beam tracking method according to another aspect, determining whether to change the serving beam may comprises calculating a plurality of comparison values based on a comparison metric by comparing the first signal quality with each of the plurality of second signal qualities; selecting a best comparison value from among the plurality of comparison values; and when the best comparison value is out of a preset threshold criterion for change, changing the tracking beam generating the best comparison value to a new serving beam.

Embodiments of the present disclosure generate at least one tracking beam while maintaining a serving beam in a mobile communication terminal and determine whether to change the serving beam of the mobile communication terminal based on a signal received using the serving beam and/or the tracking beam, and thus can search, track, and switch a directional beam of a terminal without an additional procedure for control signal exchange and beam switching, temporary service interruption due to the additional procedure, resource loss and processing delay, and communication quality reduction or communication link disconnection due to beam switching delay in a mobile communication system using directional beams, in response to a channel environment, in which rapid and frequent changes in position and direction occur due to rapid mobility, rapid rotation, rapid direction change, rapid shaking, etc. of a mobile communication UE, and can provide the best communication service by actively searching, tracking, and switching the directional beam of the terminal according to changes in a communication channel environment.

BRIEF DESCRIPTION OF THE DRAWINGS

The accompany drawings, which are included to provide a further understanding of the present disclosure and are incorporated on and constitute a part of the present disclosure illustrate embodiments of the present disclosure and together with the description serve to explain the principles of the present disclosure.

FIG. 3 illustrates configuration of an antenna unit adopting an array antenna structure.

FIGS. 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, and 39 are block diagrams illustrating various structures of a beam tracking apparatus according to embodiments of the present disclosure.

DETAILED DESCRIPTION

Reference will now be made in detail to embodiments of the disclosure, examples of which are illustrated in the accompanying drawings. Detailed descriptions of known arts will be omitted if such may mislead the gist of the present disclosure. In addition, throughout the present disclosure, "comprising" a certain component means that other components may be further comprised, not that other components are excluded, unless otherwise stated.

Further, although the terms first, second, etc. may be used herein to describe various components, these components should not be limited by these terms. These terms are only used to distinguish one component from another component. For example, a first component may be referred to as a second component, and, similarly, a second component may be referred to as a first component, without departing from the scope of the present disclosure.

Terms used in the present disclosure are only used to describe specific embodiments, and are not intended to limit the present disclosure. Expressions in the singular form include the meaning of the plural form unless they clearly mean otherwise in the context. In the present disclosure, expressions such as "comprise" or "have" are intended to mean that the described features, numbers, steps, operations, components, parts, or combinations thereof exist, and should not be understood to be intended to exclude in advance the presence or possibility of addition of one or more other features, numbers, steps, operations, components, parts, or combinations thereof.

Unless otherwise specified, all of the terms which are used herein, including the technical or scientific terms, have the same meanings as those that are generally understood by a person having ordinary skill in the art to which the present disclosure pertains. The terms defined in a generally used dictionary can be understood to have meanings identical to those used in the context of a related art, and are not to be construed to have ideal or excessively formal meanings unless they are obviously specified in the present disclosure.

Figure 1:
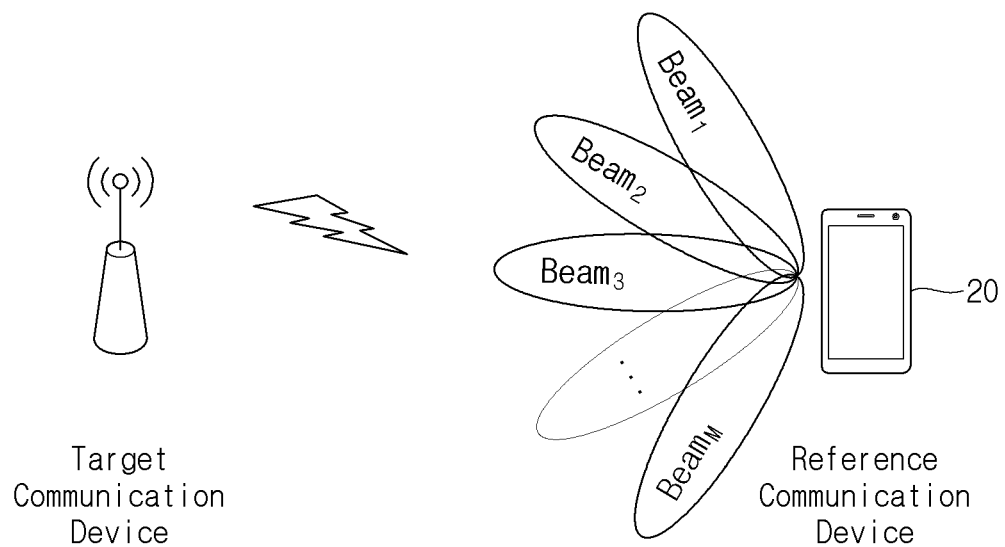
FIG. 1 illustrates a wireless communication environment implementing embodiments of the present disclosure.

FIG. 1 illustrates a wireless communication environment in which embodiments of the present disclosure are implemented, and it is considered a wireless communication environment in which a reference communication device 20 capable of generating a plurality of directional beams transmits and receives information or signal to/from at least one target communication device 10 using at least one directional beam. As briefly introduced above, embodiments of the present disclosure have been devised in consideration of a situation in which communication quality rapidly deteriorates, the communication connection is disconnected, a heavy load is applied to the beam tracking, or excessive resource loss occurs due to rapid fluctuations in the location and direction of a UE.

Accordingly, embodiments of the present disclosure disclose a control apparatus and method in which a reference communication device 20 such as a UE can independently track an optimal directional beam for maintaining communication with a target communication device 10 even without continuous exchange of control signals between the reference communication device 20, such as a UE, and the target communication device 10, such as a base station. To this end, embodiments of the present disclosure disclose an apparatus and method for simultaneously generating a tracking beam directed in a different direction (e.g. left/right direction with respect to the serving beam) from a serving beam in addition to a serving beam currently in service, and for checking whether to switch or move to a new serving beam in a different direction (e.g. adjacent direction) is required simultaneously while maintaining communication in the current serving beam.

Figure 2:
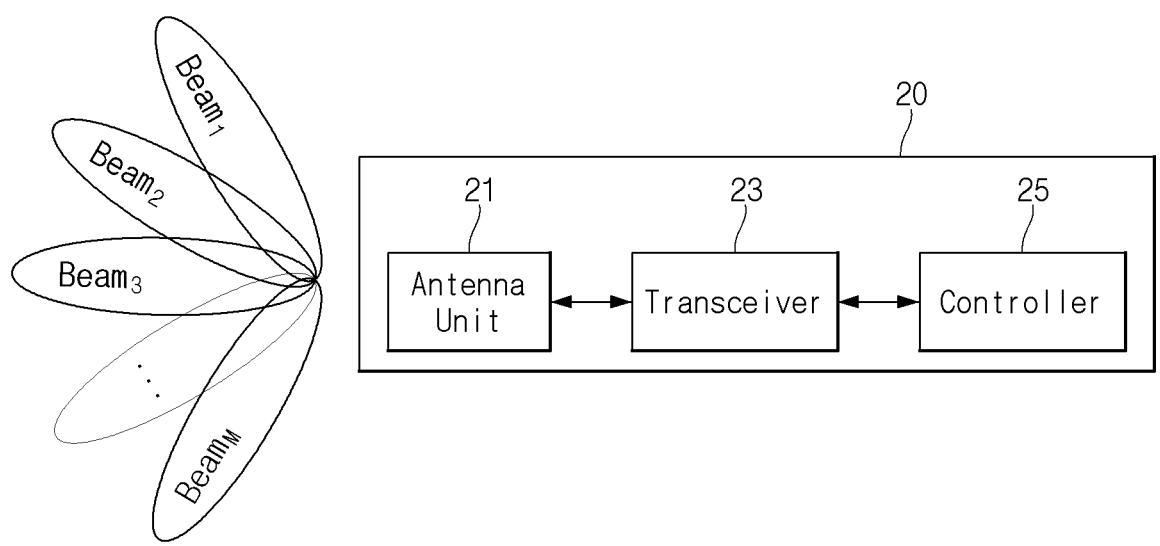
FIG. 2 is a block diagram illustrating a beam tracking apparatus according to an embodiment of the present disclosure.

FIG. 2 is a block diagram illustrating a beam tracking apparatus 20 according to an embodiment of the present disclosure, and the beam tracking apparatus 20 has a configuration corresponding to the reference communication device introduced through FIG. 1 above.

The antenna unit 21 is configured to simultaneously generate a plurality of directional beams, from an implementation point of view, it may be selected from among a set of directional beams in which the directional beams are predetermined, or it may be generated through beam-forming according to a direction determined each time.

The antenna unit 21 may be composed of at least one antenna set to simultaneously generate at least two different directional beams, and each antenna set includes at least one antenna element. Each of the at least two antenna sets includes at least one mutually exclusive antenna element. That is, a different antenna set includes at least one mutually exclusive antenna element.

The antenna unit 21 may be composed of including at least one antenna element and a beam generating circuit. An antenna unit composed of at least one antenna set, in order to at the same time generate at least two different directional beams, may be configured using an array antenna structure in which each antenna set includes at least two antenna elements, or using a parasitic array structure in which each antenna set uses one parasitic array antenna.

As an example of an antenna set, FIG. 3 illustrates the configuration of an antenna unit employing an array antenna structure. In the array antenna structure, the antenna unit 21 may be configured based on (A) one array antenna or (B) a plurality of array antenna sets as shown in FIG. 3. In this case, the beam generating circuit may be configured including a phase shifter array (PSA) for the corresponding antenna set consisting of at least one phase shifter connected to each of the antenna elements constituting the corresponding array antenna set for each array antenna set and a gain controller for adjusting the gain of the corresponding antenna set cascaded thereto.

On the other hand, as an example of an antenna set according to a parasitic array antenna structure, a switched parasitic antenna (SPA) and an electronically steerable passive array radiator (ESPAR) composed of one active element and a plurality of passive elements (or parasitic elements) can be utilized. In this case, the beam generating circuit is composed of one active element constituting each parasitic array element and a plurality of parasitic elements surrounding the active element. At this time, at least one beam space may be formed by adjusting the impedance of each parasitic element or controlling the shorting or opening of each parasitic element. An SPA (or ESPAR) or the like may adjust a beam pattern by forming at least one beam space using one parasitic array, or changing at least one beam space. Here, the beam pattern is determined by controlling the shape of the beam space, the beam width of the beam space, the direction of the beam space, and the number of beam spaces. Therefore, in embodiments of the present disclosure, it may be used as a composite beam by at the same time forming at least two different directional beam spaces using one SPA (or ESPAR), or it may be used to at the same time generate at least two different directional beams by using at least two SPA (or ESPAR) arrays, and allowing each to independently form at least one beam space to at the same time generate at least one directional beam.

The switched parasitic antenna (SPA) generally consists of one active element located in the center and a plurality of passive elements or parasitic elements surrounding it. The active element located in the center is connected to a radio transceiver unit (TXRU), and a plurality of passive elements may determine the direction and beam pattern of the directional beam by being open or shorted using pin diodes.

Figure 4:
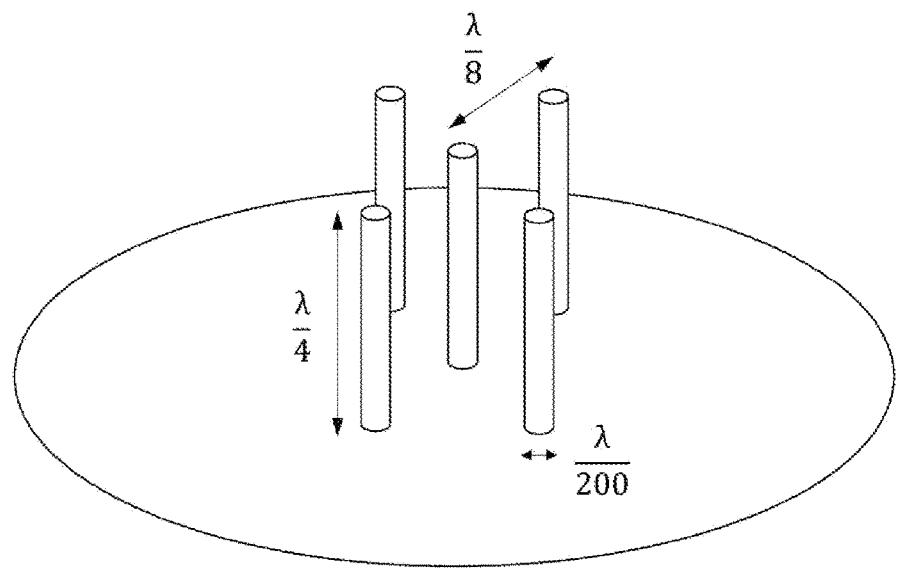
FIG. 4 illustrates configuration of an antenna unit adopting a switching parasitic array (SPA) antenna structure.

As an example, referring to FIG. 4 illustrating the configuration of an antenna unit employing a parasitic array antenna structure, a switched parasitic array (SPA) consisting of five monopole elements is shown, the element located in the center is active and connected to the radio transceiver unit (TXRU), four passive elements surrounding the active element determine the direction and beam pattern of the directional beam by opening or shorting using pin diodes.

Figure 5:
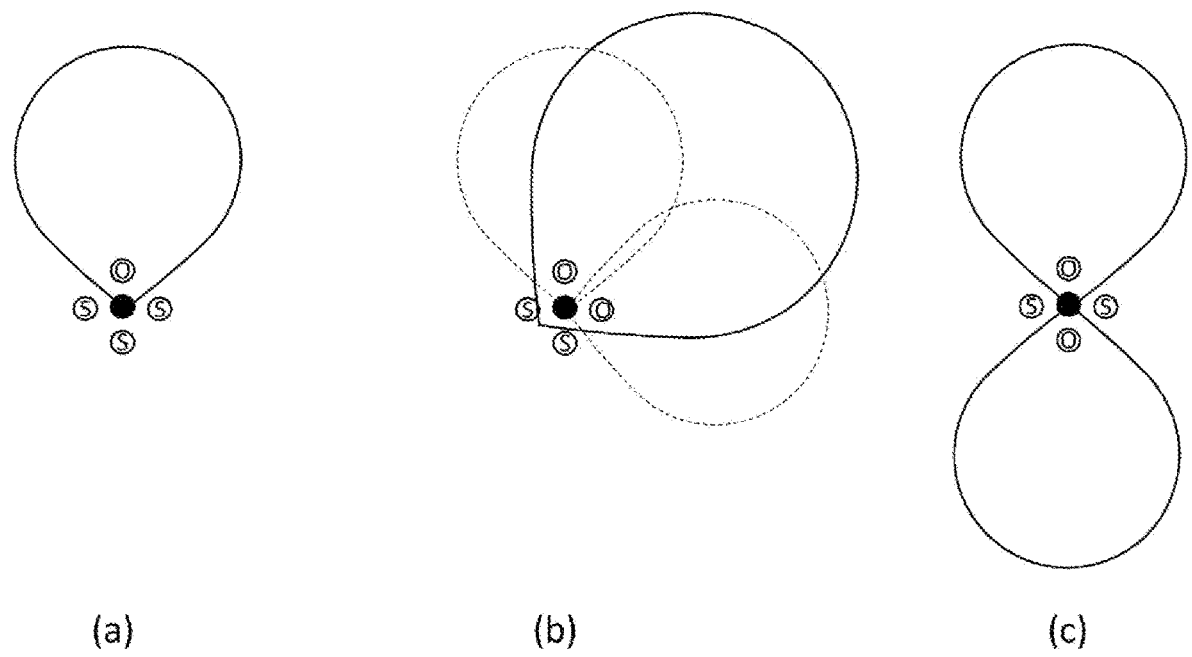
FIG. 5 illustrates a radiation pattern that may appear through an antenna structure of FIG. 4.

As another example, referring to FIG. 5 illustrating a radiation pattern that may appear through a parasitic array structure of five elements, FIG. 5(a) illustrates an antenna radiation pattern when three passive elements are short-circuited and one passive element is opened. A directional beam in a desired direction may be generated by opening a passive element in a direction in which a beam is to be formed and shorting all other passive elements. In addition, FIG. 5(b) and FIG. 5(c) illustrate two antenna radiation patterns that can be formed by opening two passive elements and shorting the remaining two elements, respectively. It goes without saying that the generated radiation pattern may be different depending on the location of the passive element that is opened. Therefore, using the SPA structure, a composite beam composed of at least one directional beam or at least two directional beams can be generated depending on the number and location of open or shorted passive elements. Therefore, using the SPA structure, a composite beam composed of at least one directional beam or at least two directional beams can be generated depending on the number and location of open or shorted passive elements.

Figure 6:
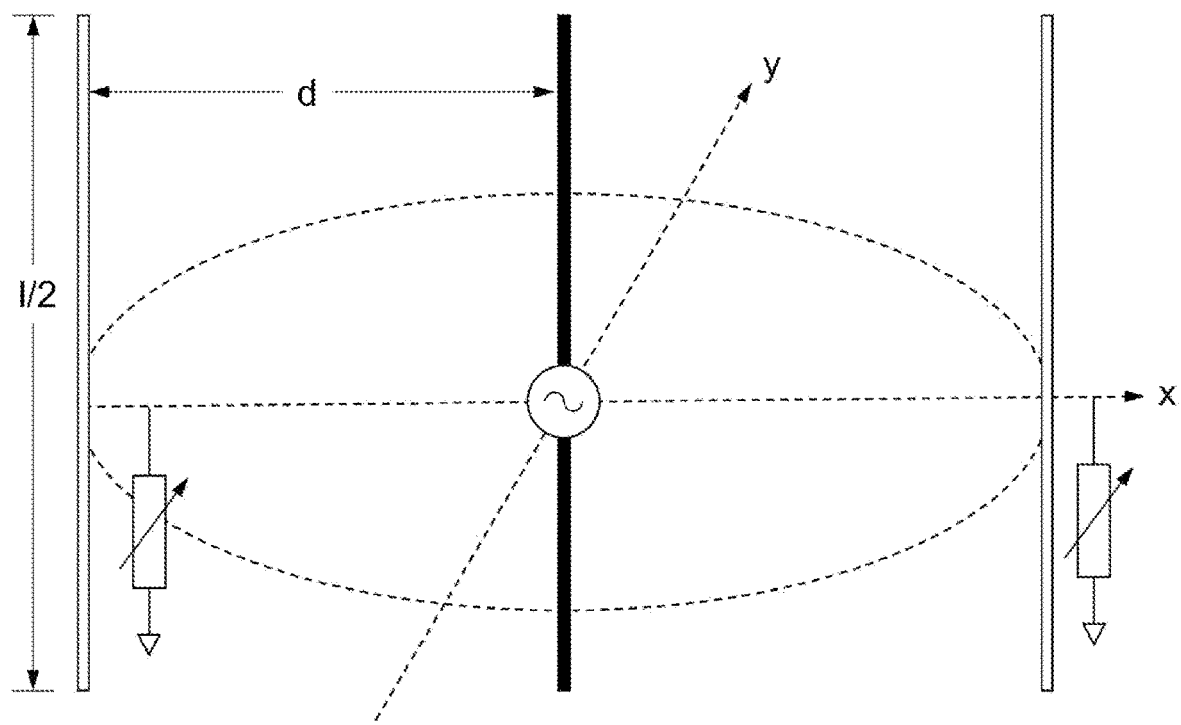
FIG. 6 illustrates an ESPAR antenna structure.

As another example, an electronically steerable passive array radiator (ESPAR) antenna is generally composed of one active element located in the center and a plurality of passive elements or parasitic elements surrounding the active element. The active element located in the center is connected to the radio transceiver unit (TXRU), and a number of passive elements short or control a variable reactor to control the imaginary part of the input impedance of the passive elements. By adjusting the value of the reactor, the radiation pattern of the ESPAR antenna can be controlled to form beams and nulls in a specific direction. Referring to FIG. 6 illustrating an ESPAR antenna structure, three elements are shown. Here, d represents a distance between elements, l represents a wavelength. y represents an admittance matrix representing mutual coupling between elements, and x represents a reactance matrix that determines the pattern of the antenna.

Therefore, the antenna unit 21 according to an embodiment of the present disclosure may include a set of antennas according to an array antenna structure or a parasitic array antenna structure in which individual antenna elements are combined to form a beam pattern, a phase shifter array (PSA) connected to the antenna set to control each antenna element, and a gain controller for adjusting the gain of the antenna set. Here, one or more antenna sets may be provided to simultaneously generate a plurality of directional beams directed in different directions, including the serving beam and the tracking beam, generate a composite beam that covers the directivity of the serving beam and the directivity of the tracking beam, or simultaneously generate the serving beam and the composite beam, the phase shifter array can flexibly operate another phase shifter array for generation of the tracking beam or the composite beam while maintaining the operation of the phase shifter array corresponding to the serving beam provided according to the number of directional beams to be generated. When a plurality of tracking beams or composite beams are generated, the antenna unit 21 may simultaneously or sequentially generate the plurality of tracking beams or the plurality of composite beams using the one or more antenna sets.

Returning again to FIG. 2, the transceiver 23 is a configuration for supplying a signal to the antenna unit 21 or receiving a signal from the antenna unit, and may include a transceiver unit (TXRU). For transmission and reception of signals using the serving beam and the tracking beam, the transceiver 23 may individually allocate one TXRU to each of the serving beam and the tracking beam, may allocate one TXRU by combining the serving beam and the tracking beam, may allocate one TXRU to a composite beam that covers the directivity of the serving beam and the directivity of the tracking beam, or may allocate one TXRU to the serving beam and combine the serving beam and the tracking beam, or allocate another TXRU to the composite beam.

A controller 25 is a configuration for controlling beam generation of the antenna unit 21 and TXRU allocation of the transceiver 23, may control transmission and reception of information or signal, or may control a beam tracking method and a beam tracking apparatus according to embodiments of the present disclosure. If necessary, the controller 25 may perform a control operation by referring to the signal received from the transceiver 23. The controller 25 may control the antenna unit 21 to generate a serving beam, receive a first signal from the target communication device 10 using the serving beam, control the antenna unit 21 to generate a tracking beam directed in a direction different from that of the serving beam while maintaining the serving beam, receive a second signal from the target communication device 10 using the serving beam and the tracking beam, and determine the change in the serving beam based on the received first and second signals. Here, the first signal may indicate a reference signal received corresponding to the serving beam currently being serviced, and the second signal may indicate a comparison signal for finding a direction in which a signal of better quality is measured. Accordingly, the second signal may be at least one or more signals. For example, the number of second signals may increase in proportion to the number of tracking beams.

More specifically, the controller 25 may measure the first signal quality by receiving the first signal from the target communication device 10 using the serving beam, measure the quality of at least one second signal by receiving the at least one second signal from the target communication device 10 using the serving beam and the at least one tracking beam, and determine the change in the serving beam based on the first signal quality and the at least one second signal quality. Here, to receive the at least one second signal using the serving beam and the at least one tracking beam, the controller 25 control to receive the at least one second signal using the at least one tracking beam, receive the at least one second signal using at least one combination of the serving beam and the at least one tracking beam, and receive the at least one second signal using at least one composite beam that covers the directivity of the serving beam and the directivity of the at least one tracking beam, or receive the first signal using the serving beam and receive the at least one second signal using the at least one tracking beam at the same time; using at least one combination of the serving beam and the at least one tracking beam; or using the at least one composite beam, so that reception of the first signal may be continuously maintained even while receiving the at least one second signal for beam tracking. The second signal received here may include all or part of the components of the first signal.

On the other hand, the first signal and the second signal include at least one of synchronization signals, reference signals, pilot signals, training signals, preamble/midamble/ postamble, control signals, data signals, broadcast signals and random access signals, the synchronization signals may include PSS/SSS, the reference signals may include at least one of CSI-RS signals, a sounding reference signal (SRS), a phase tracking reference signal (PTRS), a demodulation reference signal (DMRS) and a cell specific reference signal (CRS). As one embodiment, the synchronization signals and the reference signals may include the following.

Synchronization Signals
  Primary Synchronization Signals (PSS)
  Secondary Synchronization Signals (SSS)
Reference Signals
  Channel State Information-Reference Signals (CSI-RS)
  Sounding Reference Signal (SRS)
  Phase Tracking Reference Signal (PTRS)
  Demodulation Reference Signal (DMRS)
  Cell-Specific Reference Signal (CRS)

The controller 25 may calculate a comparison value according to a comparison metric from the first signal quality and the second signal quality, when the calculated comparison value is out of a preset threshold criterion for change, the controller 25 may set the tracking beam as a new serving beam. Here, the first signal quality and the second signal quality may be calculated using at least one of a signal quality indicator and an error rate indicator. The signal quality indicators may include Signal-to-Noise Ratio (SNR), Signal-to-Interference-plus-Noise Ratio (SINR), Reference Signal Received Power (RSRP), Received Signal Strength Indicator (RSSI), Reference Signal Received Quality (RSRQ) and Received Channel Power Indicator (RCPI). In addition, the error rate indicators may include a bit error rate (BER), a block error rate (BLER), a frame error rate (FER), and a packet error rate (PER). As an embodiment, the signal quality indicators and the error rate indicators may include the following for each type.

Signal Quality Indicators
  Signal-to-Noise Ratio (SNR)
  Signal-to-Interference-plus-Noise Ratio (SINR)
  Reference Signal Received Power (RSRP)
  Received Signal Strength Indicator (RSSI)
  Reference Signal Received Quality (RSRQ)
  Received Channel Power Indicator (RCPI)

Error Rate Indicators
  Bit Error Rate (BER)
  Block Error Rate (BLER)
  Frame Error Rate (FER)
  Packet Error Rate (PER)

Further, the comparison metric may include at least one of a comparison metric based on a difference in signal quality including a metric defined based on a difference obtained by subtracting the first signal quality from the second signal quality (metric in the form of a power of the difference), a metric defined based on a logarithm of the difference (metric in the form of a logarithmic function of the difference) and a metric defined based on an exponential function of the difference (metric in the form of an exponential function of the difference); and a comparison metric based on a ratio of signal quality including a metric defined based on a ratio obtained by dividing the second signal quality by the first signal quality (a metric in the form of a power of a ratio), a metric defined based on a logarithm of the ratio (metric in the form of a logarithmic function of the ratio) and a metric defined based on an exponential function of the ratio (metric in the form of an exponential function of the ratio).

For convenience of description, the first signal is named a reference signal and the second signal is named a comparison signal, and a comparison metric for comparing one signal quality of the reference signal and two signal qualities corresponding to each of the two comparison signals will be described. First, the signal quality of the reference signal is defined as $Q_1$, and the signal quality of the first comparison signal and the signal quality of the second comparison signal are defined as $Q_2^{(1)}$, $Q_2^{(2)}$, respectively. That is, in this case, a case in which the above-described second signal is plural is exemplified.

First, a comparison metric based on the difference between the signal quality of the reference signal and the signal quality of the comparison signal may be defined based on the signal quality difference, a logarithm of the difference, and an exponential function of the difference.

The comparison metric defined based on the difference takes the form of a power of the difference obtained by subtracting the signal quality of the reference signal from the signal quality of the comparison signal, and may be expressed as Equation 1 below.

$M^{(i)}=\alpha(Q_2^{(i)}-Q_1)^\beta, i=1,2 (\alpha,\beta: \text{control parameter})$ [Equation 1])

The comparison metric defined based on the logarithm function takes the form of a logarithmic function of the difference obtained by subtracting the signal quality of the reference signal from the signal quality of the comparison signal, and may be expressed as Equation 2 below.

$M^{(i)}=\alpha(Q_2^{(i)}-Q_1), i=1,2 (\alpha: \text{control parameter})$ [Equation 2])

The comparison metric defined based on an exponential function takes the form of an exponential function of the difference obtained by subtracting the signal quality of the reference signal from the signal quality of the comparison signal, and may be expressed as in Equation 3 below.

$$M^{(i)} = \alpha \cdot \beta^{(Q_2^{(i)}-Q_1)},$$ [Equation 3]
$$i = 1, 2 \, (\alpha, \beta: \text{control parameter})$$

Next, a comparison metric based on the ratio of the signal quality of the reference signal and the signal quality of the comparison signal may be defined based on the ratio, a logarithm of the ratio, and an exponential function of the ratio.

The comparison metric defined based on the ratio takes the form of a power of the ratio obtained by dividing the signal quality of the comparison signal by the signal quality of the reference signal, and may be expressed as in Equation 4 below.

$$M^{(i)} = \alpha \left( \frac{Q_2^{(i)}}{Q_1} \right)^\beta,$$ [Equation 4]

$i = 1, 2\ (\alpha, \beta:\ \text{control parameters})$

The comparison metric defined based on the logarithm function takes the form of a log function of the ratio obtained by dividing the signal quality of the comparison signal by the signal quality of the reference signal, and may be expressed as in Equation 5 below.

$$M^{(i)} = \alpha \ln\left( \frac{Q_2^{(i)}}{Q_1} \right) = \alpha \cdot (\ln Q_2^{(i)} - \ln Q_1),$$ [Equation 5]

$i = 1, 2\ (\alpha:\ \text{control parameter})$

The comparison metric defined based on an exponential function takes the form of an exponential function of a ratio obtained by dividing the signal quality of the comparison signal by the signal quality of the reference signal, and may be expressed as Equation 6.

$$M^{(i)} = \alpha \cdot \beta^{\left(\frac{Q_2^{(i)}}{Q_1}\right)},$$ [Equation 6]

$i = 1, 2\ (\alpha, \beta:\ \text{control parameters})$

A beam tracking apparatus using a directional beam according to embodiments of the present disclosure may be implemented in various structures by combining hardware used in the field. Therefore, first of all, a feasible combination and structure of components constituting a beam tracking apparatus proposed by embodiments of the present disclosure will be described. In common below, the reference communication device may mean a beam tracking apparatus, TXRU may represent a transceiver unit in the transceiver 23, and the TXRU may include at least one of an amplifier, a filter, a mixer, and a detector.

<Generation of Directional Beam of Antenna Unit>

The antenna unit 21 of the reference communication device may generate a plurality of directional beams.

The antenna unit 21 of the reference communication device may at the same time generate at least one directional beam.

The antenna unit 21 of the reference communication device may at the same time generate at least two different directional beams.

<Generation of Directional Beams of Individual Antenna Sets>

At least one antenna set of the antenna unit 21 of the reference communication device may generate a plurality of directional beams.

At least one antenna set of the antenna unit 21 of the reference communication device may at the same time generate at least one directional beam.

At least one antenna set of the antenna unit 21 of the reference communication device may at the same time generate at least two different directional beams.

Each antenna set of the antenna unit 21 of the reference communication device may generate a plurality of directional beams.

Each antenna set of the antenna unit 21 of the reference communication device may at the same time generate at least one directional beam.

Each antenna set of the antenna unit 21 of the reference communication device may at the same time generate at least two different directional beams.

Each of the at least one antenna set of the antenna unit 21 of the reference communication device may at the same time generate at least one directional beam.

Each of the at least one antenna set of the antenna unit 21 of the reference communication device may at the same time generate at least two different directional beams.

All of the at least one antenna set of the antenna unit 21 of the reference communication device may at the same time and identically generate at least one directional beam, respectively.

All of the at least one antenna set of the antenna unit 21 of the reference communication device may at the same time and identically generate at least two different directional beams, respectively.

Each of the at least one antenna set of the antenna unit 21 of the reference communication device may at the same time and independently generate at least one directional beam.

Each of the at least one antenna set of the antenna unit 21 of the reference communication device may at the same time and independently generate at least two different directional beams.

At least one antenna set of the antenna unit 21 of the reference communication device may at the same time generate at least two different directional beams.

At least two sets of antennas of the antenna unit 21 of the reference communication device may at the same time generate at least two different directional beams.

All of the at least two antenna sets of the antenna unit 21 of the reference communication device may at the same time and identically generate at least one different directional beam.

All of the at least two antenna sets of the antenna unit 21 of the reference communication device may at the same time and identically generate at least two different directional beams, respectively.

Each of the at least two antenna sets of the antenna unit 21 of the reference communication device may at the same time and independently generate at least one different directional beam.

Each of the at least two antenna sets of the antenna unit 21 of the reference communication device may at the same time and independently generate at least two different directional beams.

All of the at least one first antenna set among the at least two antenna sets of the antenna unit 21 of the reference communication device may identically and at the same time generate at least one directional beam, respectively, and each of at least one second antenna set among the at least two antenna sets may independently and at the same time generate at least one different directional beam.

The at least two antenna set of the antenna unit 21 of the reference communication device may be configured including at least two array antennas, or at least one array antenna and at least one parasitic array, or at least two parasitic arrays.

<Identity and Independence of Directional Beam Generation of Two Antenna Sets>

All of the at least two antenna sets of the antenna unit 21 of the reference communication device may identically and at the same time generate at least one directional beam, respectively, and each of the at least two antenna sets may at the same time generate at least one independent directional beam.

All of the at least one first antenna set of the at least two antenna sets of the antenna unit 21 of the reference communication device may at the same time generate at least one directional beam, respectively, and each of the at least one second antenna set among the at least one antenna set may independently and at the same time generate at least one different directional beam.

All of the at least one antenna set of the antenna unit 21 of the reference communication device may at the same time and identically generate at least two different directional beams, respectively.

Each of the at least two antenna sets of the antenna unit 21 of the reference communication device may at the same time and independently generate at least one different directional beam.

All of the at least one first antenna set among the at least two antenna sets of the antenna unit 21 of the reference communication device may identically and at the same time generate at least one directional beam, respectively, and all of the at least one second antenna set among the at least two antenna sets may identically and at the same time generate at least one directional beam different from the at least one directional beam of the first antenna set, respectively.

All of the at least one first antenna set among the at least two antenna sets of the antenna unit 21 of the reference communication device may identically and at the same time generate at least one directional beam, respectively, and each of at least one second antenna set among the at least two antenna sets may independently and at the same time generate at least one directional beam.

Here, in each of the at least two antenna sets, at least one of the number of directional beams, a beam direction of each directional beam, and a beam pattern of each directional beam may be independently set.

<Data Transmission and Reception of Antenna Unit>

The antenna unit 21 of the reference communication device may at the same time transmit or at the same time receive at least one of information or signal.

<Identity and Independence of Data Transmission and Reception of Antenna Set>

All of the at least one antenna set of the antenna unit 21 of the reference communication device may at the same time transmit or at the same time receive at least one of the same information or signal. Through this, antenna diversity may be formed.

Each of at least one antenna set of the antenna unit 21 of the reference communication device may at the same time transmit or at the same time receive at least one of independent information or signal. Through this, antenna multiplexing can be formed.

All of at least two antenna sets among at least one antenna set of the antenna unit 21 of the reference communication device may at the same time transmit or at the same time receive at least one of the same information or signal. Through this, antenna diversity may be formed.

Each of at least two antenna sets among at least one antenna set of the antenna unit 21 of the reference communication device may at the same time transmit or at the same time receive at least one of independent information or signal. Through this, antenna multiplexing may be formed.

All of the at least two antenna sets among the at least one antenna set of the antenna unit 21 of the reference communication device may at the same time transmit or at the same time receive at least one of the same information or signal, and each of the at least two antenna sets may at the same time transmit or at the same time receive at least one of independent information or signal. Through this, antenna diversity and antenna multiplexing may be formed.

<Single Antenna Set, Equality and Independence of Data Transmission and Reception Using Multiple Directional Beams>

The reference communication device may operate at least one directional beam generated at the same time by each antenna set of the antenna unit 21 to at the same time transmit or at the same time receive at least one of information or signal.

The reference communication device may operate all of the at least one directional beam at the same time generated by each antenna set of the antenna unit 21 to at the same time transmit or at the same time receive at least one of the same information or signal. Through this, beam diversity may be formed.

The reference communication device may operate each of the at least one directional beam at the same time generated by each antenna set of the antenna unit 21 to at the same time transmits or at the same time receive at least one independent information or signal. Through this, beam multiplexing may be formed.

The reference communication device may operate all of the at least two directional beams at the same time generated by each antenna set of the antenna unit 21 to at the same time transmit or at the same time receive at least one of the same information or signal. Through this, beam diversity may be formed.

The reference communication device may operate each of at least two directional beams at the same time generated by each antenna set of the antenna unit 21 to at the same time transmit or at the same time receive at least one of independent information or signal. Through this, beam multiplexing may be formed.

The reference communication device may operate at least two directional beams among at least one directional beam at the same time generated by each antenna set of the antenna unit 21 to at the same time transmits or at the same time receive at least one the same information or signal, and may operate each of the other at least two directional beams among the at least one directional beam to at the same time transmit or at the same time receive at least one independent information or signal. Through this, beam multiplexing and beam diversity may be formed.

<Multiple Antenna Sets, Identity and Independence Between Antenna Sets, at Least One Directional Beam, and Identity and Independence of Data Transmission and Reception for Each Antenna Set>

The reference communication device uses at least one directional beams generated at the same time and identically by all of the at least two antenna sets among the at least one antenna set of the antenna unit 21 to operate so that all of the at least two sets of antennas can at the same time transmit or at the same time receive at least one of the same information or signal. Through this, antenna diversity may be formed, and beam diversity or beam multiplexing may be additionally formed.

The reference communication device uses at least one directional beams respectively generated at the same time and identically by all of at least two antenna sets among at least one antenna set of the antenna unit 21 to operate so that each of the at least two antenna sets can at the same time transmit or at the same time receive at least one of independent information or signal. Through this, antenna multiplexing may be formed, and beam diversity or beam multiplexing may be additionally formed.

The reference communication device uses at least one directional beam generated at the same time and identically by all of the at least two antenna sets among the at least one antenna set of the antenna unit 21 to operate so that all of the at least two antenna sets at the same time transmit or at the same time receive at least one of the same information or signal, and each of the at least two antenna sets at the same time transmit or at the same time receive at least one independent information or signal. Through this, antenna diversity and antenna multiplexing may be formed, and beam diversity or beam multiplexing may be additionally formed.

The reference communication device uses at least one directional beam generated at the same time and independently by each of the at least two antenna sets among at least one antenna set of the antenna unit 21 to operate so that all of the at least two antenna sets at the same time transmit or at the same time receive at least one of the same information or signal. Through this, antenna diversity and beam diversity may be formed, and beam multiplexing may be additionally formed.

The reference communication device uses at least one directional beam generated at the same time and independently by each of the at least two antenna sets among at least one antenna set of the antenna unit 21 to operate so that each of the at least two antenna sets can at the same time transmit or at the same time receive at least one of independent information or signal. Through this, antenna multiplexing may be formed, and beam multiplexing or beam diversity may be additionally formed.

The reference communication device uses at least one directional beam generated at the same time and independently by at least two antenna sets among at least one antenna set of the antenna unit 21 to operate so that all of the at least two antenna sets at the same time transmit or at the same time receive at least one of the same information or signal, and each of the at least two antenna sets can at the same time transmit or at the same time receive at least one of independent information or signal. Through this, antenna diversity and antenna multiplexing may be formed, and beam multiplexing or beam diversity may be additionally formed.

<Multiple Antenna Sets, Identity and Independence Between Antenna Sets, at Least Two Directional Beams, and Identity and Independence of Data Transmission and Reception for Each Antenna Set>

The reference communication device uses at least two directional beams generated at the same time and identically by all of at least two antenna sets among at least one antenna set of the antenna unit 21 to operate so that all of the at least two antenna sets at the same time transmit or at the same time receive at least one of the same information or signal. Through this, antenna diversity, beam diversity, and beam multiplexing may be formed.

The reference communication device uses at least two directional beams generated at the same time and identically by all of at least two antenna sets among at least one antenna set of the antenna unit 21 to operate so that each of the at least two antenna sets can at the same time transmit or at the same time receive at least one of independent information or signal. Through this, antenna multiplexing, beam diversity, and beam multiplexing may be formed.

The reference communication device uses at least two directional beams generated at the same time and identically by all of the at least two antenna sets among at least one antenna set of the antenna unit 21 to operate so that all of the at least two antenna sets at the same time transmit or at the same time receive at least one of the same information or signal, and so that each of the at least two antenna sets can at the same time transmit or at the same time receive at least one of independent information or signal. Through this, antenna diversity, antenna multiplexing, beam diversity, and beam multiplexing may be formed.

The reference communication device uses at least two directional beams generated at the same time and independently by each of the at least two antenna sets among at least one antenna set of the antenna unit 21 to operate so that all of the at least two antenna sets at the same time transmit or at the same time receive at least one of the same information or signal. Through this, antenna diversity, beam diversity, and beam multiplexing may be formed.

The reference communication device uses at least two directional beams generated at the same time and independently by each of the at least two antenna sets among at least one antenna set of the antenna unit 21 to operate so that each of the at least two antenna sets can at the same time transmit or at the same time receive at least one of independent information or signal. Through this, antenna multiplexing, beam diversity, and beam multiplexing may be formed.

The reference communication device uses at least two directional beams generated at the same time and independently by each of the at least two antenna sets among at least one antenna set of the antenna unit 21 to operate so that all of the at least two antenna sets at the same time transmit or at the same time receive at least one of the same information or signal, and so that each of the at least two antenna sets may at the same time transmit or at the same time receive at least one independent information or signal. Through this, antenna diversity, antenna multiplexing, beam diversity, and beam multiplexing may be formed.

The reference communication device may operate to at the same time transmit or at the same time receive at least one of information or signal in which at least one first directional beam of all of the at least two antenna sets is identical to each other among at least one directional beam generated at the same time and identically by all of the at least two antenna sets of the antenna unit 21. Through this, antenna diversity, beam diversity, and beam multiplexing may be formed.

The reference communication device may operate to at the same time transmit or at the same time receive at least one of information or signal in which at least one first directional beam of each of the at least two antenna sets is independent of each other among at least one directional beam generated at the same time and identically by all of the at least two antenna sets of the antenna unit 21. Through this, antenna multiplexing, beam multiplexing, and beam diversity may be formed.

The reference communication device may operate to at the same time transmit or at the same time receive at least one of information or signal in which at least one directional beam of all of the at least two sets of antennas is the same among the at least one directional beam generated at the same time and identically by each of the at least two antenna sets of the antenna unit 21. Through this, antenna diversity, beam diversity, and beam multiplexing may be formed.

The reference communication device may operate to at the same time transmit or at the same time receive at least one of information or signal in which at least one directional beam of each of the at least two sets of antennas is independent of each other among at least one directional beam generated at the same time and independently by each of the at least two antenna sets of the antenna unit 21. Through this, antenna multiplexing, beam multiplexing, and beam diversity may be formed.

The reference communication device may operate to at the same time transmit or at the same time receive at least one of information or signal in which at least one first directional beam of all of the at least two sets of antennas is the same among at least two directional beams generated at the same time and identically by all of the at least two antenna sets of the antenna unit 21. Through this, antenna diversity, beam diversity, and beam multiplexing may be formed.

The reference communication device may operate to at the same time transmit or at the same time receive at least one of information or signal in which at least one first directional beam of each of the at least two sets of antennas is independent among at least two directional beams generated at the same time and identically by all of the at least two antenna sets of the antenna unit 21. Through this, antenna multiplexing, beam multiplexing, and beam diversity may be formed.

The reference communication device may operate to at the same time transmit or at the same time receive at least one of information or signal in which at least one directional beam of each of the at least two sets of antennas is the same among the at least two directional beams at the same time and independently generated by each of the at least two antenna sets of the antenna unit 21. Through this, antenna diversity, beam diversity, and beam multiplexing may be formed.

The reference communication device may operate to at the same time transmit or at the same time receive at least one of information or signal in which at least one directional beam of each of the at least two antenna sets is independent among at least two directional beams at the same time and independently generated by each of the at least two antenna sets of the antenna unit 21. Through this, antenna multiplexing, beam multiplexing, and beam diversity may be formed.

The reference communication device may operate to at the same time transmit or at the same time receive at least one of information or signal in which all of the first antenna sets of at least one among the at least two antenna sets of the antenna unit 21 are the same, and operate to at the same time transmit or at the same time receive at least one independent information or signal in which each of the at least one second antenna set among the at least two antenna sets is independent of each other. Through this, antenna multiplexing, antenna diversity, beam multiplexing, and beam diversity may be formed.

The reference communication device may operate to at the same time transmit or at the same time receive at least one of information or signal in which all of the first antenna sets of at least one among the at least two antenna sets of the antenna unit 21 are the same, and operate to at the same time transmit or at the same time receive at least one of the same information or signal in which all of the second antenna sets of at least one of the at least two antenna sets are different from the first antenna set. Through this, antenna multiplexing, antenna diversity, beam multiplexing, and beam diversity may be formed.

The reference communication device may operate to at the same time transmit or at the same time receive at least one of information or signal in which the at least one set of antennas is the same to/from all of the at least two second communication devices using at least one directional beam at the same time and identically generated by all of the at least one antenna set of the antenna unit 21.

The reference communication device may operate to at the same time transmit or at the same time receive at least one of information or signal in which the at least one set of antennas is the same to/from all of the at least two second communication devices using at least two directional beams at the same time and identically generated by all of the at least one antenna set of the antenna unit 21.

The reference communication device may operate to at the same time transmit or at the same time receive at least one of information or signal in which the at least one antenna set is the same to/from all of the at least two second communication devices using at least one directional beam at the same time and independently generated by each of the at least one antenna set of the antenna unit 21.

The reference communication device may operate to at the same time transmit or at the same time receive at least one of information or signal in which the at least one antenna set is the same to/from all of the at least two second communication devices using at least two directional beams at the same time and independently generated by each of the at least one antenna set of the antenna unit 21.

<Transmission of Data to at Least Two Second Communication Devices—Same Data and Independent Data>

The reference communication device may operate to at the same time transmit or at the same time receive at least one of information or signal in which the at least one antenna set is independent to/from each of the at least two second communication devices using at least one directional beam at the same time and identically generated by all of the at least one antenna set of the antenna unit 21.

The reference communication device may operate to at the same time transmit or at the same time receive at least one of information or signal in which the at least one antenna set is independent to/from each of the at least two second communication devices using at least two directional beams at the same time and identically generated by all of the at least one antenna set of the antenna unit 21.

The reference communication device may operate to at the same time transmit or at the same time receive at least one of information or signal in which the at least one antenna set is independent from/to each of the at least two second communication devices using at least one directional beam at the same time and identically generated by each of the at least one antenna set of the antenna unit 21.

The reference communication device may operate to at the same time transmit or at the same time receive at least one of information or signal in which the at least one antenna set is independent from/to each of the at least two second communication devices using at least two directional beams at the same time and identically generated by each of the at least one antenna set of the antenna unit 21.

The reference communication device may operate to at the same time transmit or at the same time receive at least one of information or signal in which the at least two antenna sets are the same to/from all of the at least two second communication devices using at least one directional beam at the same time and identically generated by all of the at least two antenna sets of the antenna unit 21.

The reference communication device may operate to at the same time transmit or at the same time receive at least one of information or signal in which the at least two antenna sets are the same to/from all of the at least two second communication devices using at least two directional beams at the same time and identically generated by all of the at least two antenna sets of the antenna unit 21.

The reference communication device may operate to at the same time transmit or at the same time receive at least one of information or signal in which the at least two antenna sets are the same to/from all of the at least two second communication devices using at least one directional beam at the same time and independently generated by each of the at least two antenna sets of the antenna unit 21.

The reference communication device may operate to at the same time transmit or at the same time receive at least one of information or signal in which the at least two antenna sets are the same to/from all of the at least two second communication devices using at least two directional beams at the same time and independently generated by each of the at least two antenna sets of the antenna unit 21.

The reference communication device may operate to at the same time transmit or at the same time receive at least one of information or signal in which the at least two antenna sets are independent to/from each of the at least two second communication devices using at least one directional beam at the same time and identically generated by all of the at least two antenna sets of the antenna unit 21.

The reference communication device may operate to at the same time transmit or at the same time receive at least one of information or signal in which the at least two antenna sets are independent to/from each of the at least two second communication devices using at least two directional beams at the same time and identically generated by all of the at least two antenna sets of the antenna unit 21.

The reference communication device may operate to at the same time transmit or at the same time receive at least one of information or signal in which the at least two antenna sets are independent to/from each of the at least two second communication devices using at least one directional beam at the same time and independently generated by each of the at least two antenna sets of the antenna unit 21.

The reference communication device may operate to at the same time transmit or at the same time receive at least one of information or signal in which the at least two antenna sets are independent to/from each of the at least two second communication devices using at least two directional beams at the same time and independently generated by each of the at least two antenna sets of the antenna unit 21.

<Transmission of Data to the Second Communication Device for Each Antenna Set—Same System and Independent System>

The reference communication device may operate to at the same time transmit or at the same time receive at least one of information or signal to/from at least one second communication device in which all of the at least two sets of antennas are the same using at least one first directional beam of each of the at least two antenna sets among at least one directional beam generated at the same time and identically by all of the at least two antenna sets of the antenna unit 21.

The reference communication device may operate to at the same time transmit or at the same time receive at least one of information or signal to/from at least one second communication device in which all of the at least two sets of antennas are the same using at least one first directional beam of each of the at least two antenna sets among the at least two directional beams generated at the same time and identically by all of the at least two antenna sets of the antenna unit 21.

The reference communication device may operate to at the same time transmit or at the same time receive at least one of information or signal to/from at least one second communication device in which all of the at least two sets of antennas are the same using at least one directional beam of each of the at least two antenna sets among at least one directional beam generated at the same time and independently by each of the at least two antenna sets of the antenna unit 21.

The reference communication device may operate to at the same time transmit or at the same time receive at least one of information or signal to/from at least one second communication device in which all of the at least two sets of antennas are the same using at least one directional beam of each of the at least two antenna sets among the at least two directional beams at the same time and independently generated by each of the at least two antenna sets of the antenna unit 21.

The reference communication device may operate to at the same time transmit or at the same time receive at least one of information or signal to/from at least one second communication device in which each of the at least two antenna sets are independent using at least one first directional beam of each of the at least two antenna sets among at least one directional beam generated at the same time and identically by all of the at least two antenna sets of the antenna unit 21.

The reference communication device may operate to at the same time transmit or at the same time receive at least one of information or signal to/from at least one second communication device in which each of the at least two antenna sets are independent using at least one first directional beam of each of the at least two antenna sets among the at least two directional beams generated at the same time and identically by all of the at least two antenna sets of the antenna unit 21.

The reference communication device may operate to at the same time transmit or at the same time receive at least one of information or signal to/from at least one second communication device in which each of the at least two antenna sets are independent using at least one directional beam of each of the at least two antenna sets among at least one directional beam generated at the same time and independently by each of the at least two antenna sets of the antenna unit 21.

The reference communication device may operate to at the same time transmit or at the same time receive at least one of information or signal to/from at least one second communication device in which each of the at least two antenna sets are independent using at least one directional beam of each of the at least two antenna sets among the at least two directional beams at the same time and independently generated by each of the at least two antenna sets of the antenna unit 21.

<TXRU Allocation to Antenna Set>

The antenna unit 21 of the reference communication device may be composed of at least one antenna set.

The at least one antenna set may be allocated to one TXRU.

At least two antenna sets among the at least one antenna set may be allocated to one TXRU.

All of the at least two antenna sets among the at least one antenna set may be allocated to one TXRU.

Each of at least two antenna sets among the at least one antenna set may be allocated to one TXRU.

The at least one antenna set may be allocated to at least one TXRU.

At least two antenna sets among the at least one antenna set may be allocated to at least one TXRU.

All of the at least two antenna sets among the at least one antenna set may be allocated to at least one TXRU.

Each of at least two antenna sets among the at least one antenna set may be allocated to at least one TXRU.

<TXRU Allocation to Directional Beams Generated by Antenna Unit>

The antenna unit 21 of the reference communication device may at the same time generate at least one directional beam.

The antenna unit 21 of the reference communication device may at the same time generate at least two different directional beams.

All of the at least one directional beam generated at the same time may be allocated to one TXRU.

All of the at least two different directional beams generated at the same time may be allocated to one TXRU.

All of the at least two directional beams among the at least one directional beam generated at the same time may be allocated to one TXRU.

All of the at least two directional beams among the at least two different directional beams generated at the same time may be allocated to one TXRU.

At least one directional beam generated at the same time may be allocated to at least one TXRU.

At least two different directional beams generated at the same time may be allocated to at least one TXRU.

At least two directional beams among the at least one directional beam generated at the same time may be allocated to at least one TXRU.

At least two directional beams among the at least two different directional beams generated at the same time may be allocated to at least one TXRU.

Each of at least two directional beams among the at least one directional beam generated at the same time may be allocated to one TXRU.

Each of the at least two different directional beams generated at the same time may be allocated to one TXRU.

Each of at least two directional beams among the at least two different directional beams generated at the same time may be allocated to one TXRU.

Each of at least two directional beams among the at least one directional beam generated at the same time may be allocated to at least one TXRU.

Each of the at least two different directional beams generated at the same time may be allocated to at least one TXRU.

Each of at least two directional beams among the at least two different directional beams generated at the same time may be allocated to at least one TXRU.

<TXRU Allocation to Individual Antenna Set Directional Beams>

At least one antenna set of the antenna unit 21 of the reference communication device may generate a plurality of directional beams.

Each antenna set of the antenna unit 21 of the reference communication device may generate a plurality of directional beams.

Each antenna set of the antenna unit 21 of the reference communication device may at the same time generate at least one directional beam.

Each antenna set of the antenna unit 21 of the reference communication device may at the same time generate at least two different directional beams.

At least one directional beam at the same time generated by each antenna set may be allocated to one TXRU.

At least two directional beams at the same time generated by each antenna set may be allocated to one TXRU.

At least two directional beams among at least one directional beam at the same time generated by each antenna set may be allocated to one TXRU.

At least two directional beams among at least two directional beams at the same time generated by each antenna set may be allocated to one TXRU.

At least one directional beam at the same time generated by each antenna set may be allocated to at least one TXRU.

At least two directional beams at the same time generated by each antenna set may be allocated to at least one TXRU.

At least two directional beams among at least one directional beam at the same time generated by each antenna set may be allocated to at least one TXRU.

At least two directional beams among at least two directional beams at the same time generated by each antenna set may be allocated to at least one TXRU.

All of the at least one directional beam at the same time generated by each antenna set may be allocated to one TXRU.

All of the at least two directional beams at the same time generated by each antenna set may be allocated to one TXRU.

All of at least two directional beams among at least one directional beam at the same time generated by each antenna set may be allocated to one TXRU.

All of the at least two directional beams among the at least two directional beams at the same time generated by each antenna set may be allocated to one TXRU.

All of the at least one directional beam at the same time generated by each antenna set may be allocated to at least one TXRU.

All of the at least two directional beams at the same time generated by each antenna set may be allocated to at least one TXRU All of the at least two directional beams among the at least one directional beam at the same time generated by each antenna set may be allocated to at least one TXRU.

All of the at least two directional beams among the at least two directional beams at the same time generated by each antenna set may be allocated to at least one TXRU.

Each of the at least two directional beams at the same time generated by each antenna set may be allocated to one TXRU.

Each of at least two directional beams among at least one directional beam at the same time generated by each antenna set may be allocated to one TXRU.

Each of at least two directional beams among at least two directional beams at the same time generated by each antenna set may be allocated to one TXRU.

Each of the at least two directional beams at the same time generated by each antenna set may be allocated to at least one TXRU.

Each of at least two directional beams among at least one directional beam at the same time generated by each antenna set may be allocated to at least one TXRU.

Each of at least two directional beams among at least two directional beams at the same time generated by each antenna set may be allocated to at least one TXRU.

\<TXRU Allocation to Directional Beams Generated by at Least One Antenna Set\>

At least one antenna set of the antenna unit 21 of the reference communication device may at the same time generate at least one directional beam.

At least one antenna set of the antenna unit 21 of the reference communication device may at the same time generate at least two different directional beams.

At least two antenna sets among at least one antenna set of the antenna unit 21 of the reference communication device may at the same time generate at least one directional beam.

At least two antenna sets among at least one antenna set of the antenna unit 21 of the reference communication device may at the same time generate at least two different directional beams.

At least one directional beam generated at the same time by the at least one antenna set may be allocated to one TXRU.

At least two different directional beams generated at the same time by the at least one antenna set may be allocated to one TXRU.

At least one directional beam generated at the same time by the at least two antenna sets may be allocated to one TXRU.

At least two different directional beams generated at the same time by the at least two antenna sets may be allocated to one TXRU.

At least one directional beam generated at the same time by the at least one antenna set may be allocated to at least one TXRU.

At least two different directional beams generated at the same time by the at least one antenna set may be allocated to at least one TXRU.

At least one directional beam generated at the same time by the at least two antenna sets may be allocated to at least one TXRU.

At least two different directional beams generated at the same time by the at least two antenna sets may be allocated to at least one TXRU.

At least two directional beams among at least one directional beam generated at the same time by the at least one antenna set may be allocated to at least one TXRU.

At least two directional beams among at least two different directional beams generated at the same time by the at least one antenna set may be allocated to at least one TXRU.

At least two directional beams among at least one directional beam generated at the same time by the at least two antenna sets may be allocated to at least one TXRU.

At least two directional beams among at least two different directional beams generated at the same time by the at least two antenna sets may be allocated to at least one TXRU.

All of the at least one directional beam at the same time generated by the at least one antenna set may be allocated to one TXRU.

All of the at least two different directional beams at the same time generated by the at least one antenna set may be allocated to one TXRU.

All of the at least one directional beam at the same time generated by the at least two antenna sets may be allocated to one TXRU.

All of the at least two different directional beams at the same time generated by the at least two antenna sets may be allocated to one TXRU.

All of at least two directional beams among at least one directional beam generated at the same time by the at least one antenna set may be allocated to one TXRU.

All of at least two directional beams among at least two different directional beams at the same time generated by the at least one antenna set may be allocated to one TXRU.

All of the at least two directional beams among the at least one directional beam generated at the same time by the at least two antenna sets may be allocated to one TXRU.

All of at least two directional beams among at least two different directional beams generated at the same time by the at least two antenna sets may be allocated to one TXRU.

All of the at least one directional beam at the same time generated by the at least one antenna set may be allocated to at least one TXRU.

All of the at least two different directional beams at the same time generated by the at least one antenna set may be allocated to at least one TXRU.

All of the at least one directional beam generated at the same time by the at least two antenna sets may be allocated to at least one TXRU.

All of the at least two different directional beams at the same time generated by the at least two antenna sets may be allocated to at least one TXRU.

All of at least two directional beams among at least one directional beam generated at the same time by the at least one antenna set may be allocated to at least one TXRU.

All of at least two directional beams among at least two different directional beams at the same time generated by the at least one antenna set may be allocated to at least one TXRU.

All of the at least two directional beams among the at least one directional beam generated at the same time by the at least two antenna sets may be allocated to at least one TXRU.

All of at least two directional beams among at least two different directional beams generated at the same time by the at least two antenna sets may be allocated to at least one TXRU.

Each of at least two different directional beams at the same time generated by the at least one antenna set may be allocated to one TXRU.

Each of at least two different directional beams at the same time generated by the at least two antenna sets may be allocated to one TXRU.

Each of at least two directional beams among at least one directional beam generated at the same time by the at least one antenna set may be allocated to one TXRU.

Each of at least two directional beams among at least two different directional beams at the same time generated by the at least one antenna set may be allocated to one TXRU Each of at least two directional beams among at least one directional beam generated at the same time by the at least two antenna sets may be allocated to one TXRU.

Each of at least two directional beams among at least two different directional beams at the same time generated by the at least two antenna sets may be allocated to one TXRU.

Each of at least two different directional beams at the same time generated by the at least one antenna set may be allocated to at least one TXRU.

Each of at least two different directional beams at the same time generated by the at least two antenna sets may be allocated to at least one TXRU.

Each of at least two directional beams among at least one directional beam generated at the same time by the at least one antenna set may be allocated to at least one TXRU.

Each of at least two directional beams among at least two different directional beams at the same time generated by the at least one antenna set may be allocated to at least one TXRU.

Each of at least two directional beams among at least one directional beam generated at the same time by the at least two antenna sets may be allocated to at least one TXRU.

Each of at least two directional beams among at least two different directional beams at the same time generated by the at least two antenna sets may be allocated to at least one TXRU.

<TXRU Allocation to Each Beam Generating Directional Beam of at Least One Antenna Set>

Each of at least one antenna set of the antenna unit 21 of the reference communication device may generate a plurality of directional beams.

Each of the at least one antenna set of the antenna unit 21 of the reference communication device may at the same time generate at least one directional beam.

Each of at least one antenna set of the antenna unit 21 of the reference communication device may at the same time generate at least two different directional beams.

Each of the at least two antenna sets of the antenna unit 21 of the reference communication device may at the same time generate at least one directional beam.

Each of the at least two antenna sets of the antenna unit 21 of the reference communication device may at the same time generate at least two different directional beams.

At least one directional beam of each of the antenna sets at the same time generated by each of the at least one antenna set may be allocated to one TXRU for each antenna set.

At least two directional beams of each of the antenna sets at the same time generated by each of the at least one antenna set may be allocated to one TXRU for each antenna set.

At least one directional beam of each of the antenna sets at the same time generated by each of the at least two antenna sets may be allocated to one TXRU for each antenna set.

At least two directional beams of each of the antenna sets at the same time generated by each of the at least two antenna sets may be allocated to one TXRU for each antenna set.

At least one directional beam of each of the antenna sets at the same time generated by each of the at least one antenna set may be allocated to at least one TXRU for each antenna set.

At least two directional beams of each of the antenna sets at the same time generated by each of the at least one antenna set may be allocated to at least one TXRU for each antenna set.

At least one directional beam of each of the antenna sets at the same time generated by each of the at least two antenna sets may be allocated to at least one TXRU for each antenna set.

At least two directional beams of each of the antenna sets at the same time generated by each of the at least two antenna sets may be allocated to at least one TXRU for each antenna set.

All of the at least one directional beam of each of the antenna set at the same time generated by each of the at least one antenna set may be allocated to one TXRU.

All of at least two directional beams among at least one directional beam of each of the antenna set at the same time generated by each of the at least one antenna set may be allocated to one TXRU.

All of the at least two directional beams of each of the antenna set at the same time generated by each of the at least one antenna set may be allocated to one TXRU.

All of at least two directional beams among at least two directional beams of each of the antenna set at the same time generated by each of the at least one antenna set may be allocated to one TXRU.

All of the at least one directional beam of each of the antenna sets at the same time generated by each of the at least two antenna sets may be allocated to one TXRU.

All of at least two directional beams among at least one directional beam of each of the antenna sets generated at the same time by each of the at least two antenna sets may be allocated to one TXRU.

All of the at least two directional beams of each of the antenna sets at the same time generated by each of the at least two antenna sets may be allocated to one TXRU.

All of the at least two directional beams among the at least two directional beams of each of the antenna sets generated at the same time by each of the at least two antenna sets may be allocated to one TXRU.

All of the at least one directional beam of each of the antenna set at the same time generated by each of the at least one antenna set may be allocated to at least one TXRU.

All of at least two directional beams among at least one directional beam of each of the antenna set at the same time generated by each of the at least one antenna set may be allocated to at least one TXRU.

All of the at least two directional beams of each of the antenna set at the same time generated by each of the at least one antenna set may be allocated to at least one TXRU.

All of at least two directional beams among at least two directional beams of each of the antenna set generated at the same time by each of the at least one antenna set may be allocated to at least one TXRU.

All of the at least one directional beam of each of the antenna sets at the same time generated by each of the at least two antenna sets may be allocated to at least one TXRU.

All of at least two directional beams among at least one directional beam of each of the antenna sets at the same time generated by each of the at least two antenna sets may be allocated to at least one TXRU.

All of the at least two directional beams of each of the antenna sets at the same time generated by each of the at least two antenna sets may be allocated to at least one TXRU.

All of at least two directional beams among at least two directional beams of each of the antenna sets generated at the same time by each of the at least two antenna sets may be allocated to at least one TXRU.

All of the at least one directional beam of each of the antenna set at the same time generated by each of the at least one antenna set may be allocated to one TXRU for each antenna set.

All of at least two directional beams among at least one directional beam of each of the antenna set at the same time generated by each of the at least one antenna set may be allocated to one TXRU for each antenna set.

All of the at least two directional beams of each of the antenna set at the same time generated by each of the at least one antenna set may be allocated to one TXRU for each antenna set.

All of at least two directional beams among at least two directional beams of each of the antenna set at the same time generated by each of the at least one antenna set may be allocated to one TXRU for each antenna set.

All of the at least one directional beam of each of the antenna sets at the same time generated by each of the at least two antenna sets may be allocated to one TXRU for each antenna set.

All of at least two directional beams among at least one directional beam of each of the antenna sets at the same time generated by each of the at least two antenna sets may be allocated to one TXRU for each antenna set.

All of the at least two directional beams of each of the antenna sets at the same time generated by each of the at least two antenna sets may be allocated to one TXRU for each antenna set.

All of at least two directional beams among at least two directional beams of each of the antenna sets at the same time generated by each of the at least two antenna sets may be allocated to one TXRU for each antenna set.

All of the at least one directional beam of each of the antenna set at the same time generated by each of the at least one antenna set may be allocated to at least one TXRU for each antenna set.

All of at least two directional beams among at least one directional beam of each of the antenna set at the same time generated by each of the at least one antenna set may be allocated to at least one TXRU for each antenna set.

All of the at least two directional beams of each of the antenna set at the same time generated by each of the at least one antenna set may be allocated to at least one TXRU for each antenna set.

All of at least two directional beams among at least two directional beams of each of the antenna set at the same time generated by each of the at least one antenna set may be allocated to at least one TXRU for each antenna set.

All of the at least one directional beam of each of the antenna sets at the same time generated by each of the at least two antenna sets may be allocated to at least one TXRU for each antenna set.

All of at least two directional beams among at least one directional beam of each of the antenna sets at the same time generated by each of the at least two antenna sets may be allocated to at least one TXRU for each antenna set.

All of the at least two directional beams of each of the antenna sets at the same time generated by each of the at least two antenna sets may be allocated to at least one TXRU for each antenna set.

All of at least two directional beams among at least two directional beams of each of the antenna sets at the same time generated by each of the at least two antenna sets may be allocated to at least one TXRU for each antenna set.

Each of the at least two directional beams of each of the antenna set at the same time generated by each of the at least one antenna set may be allocated to one TXRU.

Each of at least two directional beams among at least two directional beams of each of the antenna set at the same time generated by each of the at least one antenna set may be allocated to one TXRU.

Each of the at least two directional beams of each of the antenna sets at the same time generated by each of the at least two antenna set may be allocated to one TXRU.

Each of at least two directional beams among the at least two directional beams of each of the antenna sets at the same time generated by each of the at least two antenna set may be allocated to one TXRU.

Each of the at least two directional beams of each of the antenna set at the same time generated by each of the at least one antenna set may be allocated to at least one TXRU.

Each of at least two directional beams among at least two directional beams of each of the antenna set at the same time generated by each of the at least one antenna set may be allocated to at least one TXRU.

Each of the at least two directional beams of each of the antenna sets at the same time generated by each of the at least two antenna set may be allocated to at least one TXRU.

Each of at least two directional beams among at least two directional beams of each of the antenna sets generated at the same time by each of the at least two antenna sets may be allocated to at least one TXRU.

At least one antenna set of the antenna unit 21 of the reference communication device may at the same time generate the same at least one directional beam, respectively.

At least two antenna sets of the antenna unit 21 of the reference communication device may at the same time generate the same at least one directional beam, respectively.

At least one antenna set of the antenna unit 21 of the reference communication device may at the same time generate the same at least two different directional beams, respectively.

At least two antenna sets of the antenna unit 21 of the reference communication device may at the same time generate the same at least two different directional beams, respectively.

For example, there are two antenna sets, and a first antenna set, which is one of them, at the same time generates at least two different directional beams, and a second antenna set, which is the other one, also generates at least two different directional beams identical to the at least two different directional beams generated by the first antenna set at the same time with the first antenna set.

At least one directional beam of each of the antenna sets at the same time and identically generated by all of the at least one antenna set may be allocated to one TXRU for each antenna set.

At least one directional beam of each of the antenna sets each at the same time and identically generated by all of the at least one antenna set may be allocated to at least one TXRU for each antenna set.

All of the at least two directional beams among the at least one directional beam of each of the antenna set each at the same time and identically generated by all of the at least one antenna set may be allocated to one TXRU for each antenna set.

All of the at least two directional beams among the at least one directional beam of each of the antenna set generated each at the same time and identically by all of the at least one antenna set may be allocated to at least one TXRU for each antenna set.

At least one directional beam of each of the antenna sets generated each at the same time and identically by all of the at least two antenna sets may be allocated to one TXRU for each antenna set.

At least one directional beam of each of the antenna sets generated each at the same time and identically by all of the at least two antenna sets may be allocated to at least one TXRU for each antenna set.

All of the at least two directional beams among the at least one directional beam of each of the antenna sets each at the same time and identically generated by all of the at least two antenna sets may be allocated to one TXRU for each antenna set.

All of the at least two directional beams among the at least one directional beam of each of the antenna sets generated each at the same time and identically by all of the at least two antenna sets may be allocated to at least one TXRU for each antenna set.

At least two directional beams of each of the antenna sets generated each at the same time and identically by all of the at least two antenna sets may be allocated to one TXRU for each antenna set.

At least two directional beams of each of the antenna sets generated each at the same time and identically by all of the at least two antenna sets may be allocated to at least one TXRU for each antenna set.

All of the at least two directional beams among the at least two directional beams of each of the antenna sets generated each at the same time and identically by all of the at least two antenna sets may be allocated to one TXRU for each antenna set.

All of the at least two directional beams among the at least two directional beams of each of the antenna sets generated each at the same time and identically by all of the at least two antenna sets may be allocated to at least one TXRU for each antenna set.

All of the at least one directional beam of each of the antenna set generated each at the same time and identically by all of the at least one antenna set may be allocated to one TXRU.

All of the at least one directional beam of each of the antenna set generated each at the same time and identically by all of the at least one antenna set may be allocated to at least one TXRU.

All of the at least two directional beams among the at least one directional beam of each of the antenna set generated each at the same time and identically by all of the at least one antenna set may be allocated to one TXRU.

All of the at least two directional beams among the at least one directional beam of each of the antenna set generated each at the same time and identically by all of the at least one antenna set may be allocated to at least one TXRU.

All of the at least one directional beam of each of the antenna sets generated each at the same time and identically by all of the at least two antenna sets may be allocated to one TXRU.

All of the at least one directional beam of each of the antenna sets generated each at the same time and identically by all of the at least two antenna sets may be allocated to at least one TXRU.

All of the at least two directional beams among the at least one directional beam of each of the antenna set generated each at the same time and identically by all of the at least two antenna sets may be allocated to one TXRU.

All of the at least two directional beams among the at least one directional beam of each of the antenna set generated each at the same time and identically by all of the at least two antenna sets may be allocated to at least one TXRU.

All of the at least two directional beams of each of the antenna set generated each at the same time and identically by all of the at least two antenna sets may be allocated to one TXRU.

All of the at least two directional beams of each of the antenna set generated each at the same time and identically by all of the at least two antenna sets may be allocated to at least one TXRU.

All of the at least two directional beams among the at least two directional beams of each of the antenna set generated each at the same time and identically by all of the at least two antenna sets may be allocated to one TXRU.

All of the at least two directional beams among the at least two directional beams of each of the antenna set generated each at the same time and identically by all of the at least two antenna sets may be allocated to at least one TXRU.

All of the same at least one directional beam (hereinafter, a first directional beam) of each of the antenna sets among at least one directional beam of each of the antenna sets generated each at the same time and identically by all of the at least one antenna set may be allocated to at least one TXRU (hereinafter, a first TXRU), and all of the same at least one first directional beam (hereinafter, a second directional beam) of each of the antenna set different from at least one first directional beam of each of the antennas may be allocated to at least one TXRU (hereinafter referred to as a second TXRU) different from the at least one first TXRU.

All of the same at least one first directional beam of each of the antenna sets among at least two directional beams of each of the antenna sets each at the same time and identically by all of the at least one antenna set may be allocated to at least one first TXRU, and all of the same at least one second directional beam of each of the antenna sets different from at least one first directional beam of each of the antenna sets may be allocated to at least one second TXRU different from the at least one first TXRU.

As an example, all of one directional beam generated each at the same time and identically by all of the first antenna sets (first directional beam of the first antenna set) and one directional beam generated each at the same time and identically by all of the second antenna sets (first directional beam of the second antenna set) among the same two different directional beams of each of the antenna sets generated each at the same time and identically by all of the two antenna sets may be allocated to one TXRU (first TXRU), and all of the same one directional beams (the second directional beam of the first antenna set and the second directional beam of the second antenna set) of each of antenna set different from the first directional beam (the first directional beam of the first antenna set and the first directional beam of the second antenna set) may be allocated to another TXRU (second TXRU).

All of the same at least one first directional beam of each of the antenna sets among at least one directional beam of each of the antenna sets each at the same time and identically by all of the at least two antenna sets may be allocated to at least one first TXRU, and all of the same at least one second directional beam of each of the antenna sets different from the same at least one first directional beam of each of the antenna sets may be allocated to at least one second TXRU different from the at least one first TXRU.

All of the same at least one first directional beam of each of the antenna sets among at least two directional beams of each of the antenna sets generated each at the same time and identically by all of the at least two antenna sets is allocated to at least one first TXRU, and at least one identical second directional beam of each of antenna set different from the same at least one first directional beam of each of the antenna sets is allocated to independent at least one TXRU different from the at least one first TXRU for each antenna set.

As an example, all of the same one directional beams (the first directional beam of the first antenna set and the first directional beam of the second antenna set) of each of the antenna sets among the same two different directional beams of each of the antenna set each at the same time and identically by all of the two antenna sets may be allocated to one TXRU (first TXRU), and all of the same remaining directional beams of each of the two antenna sets (the second directional beam of the first antenna set and the second directional beam of the second antenna set) may be allocated to another TXRU (2nd TXRU).

As an example, the same one first directional beam of each antenna set (the first directional beam of the first antenna set and the first directional beam of the second antenna set) among the same two different directional beams of each of the antenna set each at the same time and identically by all of the two antenna sets may be allocated to one TXRU (first TXRU), the second directional beam of the first antenna set may be allocated to the second TXRU, and the second directional beam of the second antenna set may be allocated to the third TXRU.

Each of at least one antenna set of the antenna unit 21 of the reference communication device may at the same time generate independent at least one directional beam.

Each of at least two antenna sets of the antenna unit 21 of the reference communication device may at the same time generate independent at least one directional beam.

Each of at least one antenna set of the antenna unit 21 of the reference communication device may at the same time generate independent at least two different directional beams.

Each of the at least two antenna sets of the antenna unit 21 of the reference communication device may at the same time generate independent at least two different directional beams.

For example, there are two antenna sets, one of them, the first antenna set, at the same time generates at least two different directional beams, and the remaining second antenna set generates at least two different directional beams generated by the first set of antennas and independent at least two different directional beams.

At least one directional beam of each of the antenna sets independently generated at the same time by each of the at least one antenna set may be allocated to one TXRU for each antenna set.

At least one directional beam of each of the antenna sets independently generated at the same time by each of the at least one antenna set may be allocated to at least one TXRU for each antenna set.

All of at least two directional beams among at least one directional beam of each of the antenna set independently generated at the same time by each of the at least one antenna set may be allocated to one TXRU for each antenna set.

All of at least two directional beams among at least one directional beam of each of the antenna set independently generated at the same time by each of the at least one antenna set may be allocated to at least one TXRU for each antenna set.

At least one directional beam of each of the antenna sets independently generated at the same time by each of the at least two antenna sets may be allocated to one TXRU for each antenna set.

At least one directional beam of each of the antenna sets independently generated at the same time by each of the at least two antenna sets may be allocated to at least one TXRU for each antenna set.

All of at least two directional beams among at least one directional beam of each of the antenna sets independently generated at the same time by each of the at least two antenna sets may be allocated to one TXRU for each antenna set.

All of at least two directional beams among at least one directional beam of each of the antenna sets independently generated at the same time by each of the at least two antenna sets may be allocated to at least one TXRU for each antenna set.

At least two directional beams of each of the antenna sets independently generated at the same time by each of the at least two antenna sets may be allocated to one TXRU for each antenna set.

At least two directional beams of each of the antenna sets independently generated at the same time by each of the at least two antenna sets may be allocated to at least one TXRU for each antenna set.

All of at least two directional beams among at least two directional beams of each of the antenna sets independently generated at the same time by each of the at least two antenna sets may be allocated to one TXRU for each antenna set.

All of the at least two directional beams among the at least two directional beams of each of the antenna sets independently generated at the same time by each of the at least two antenna sets may be allocated to at least one TXRU for each antenna set.

All of the at least one directional beam of each of the antenna sets independently generated at the same time by each of the at least one antenna set may be allocated to one TXRU.

All of the at least one directional beam of each of the antenna sets independently generated at the same time by each of the at least one antenna set may be allocated to at least one TXRU.

All of at least two directional beams among at least one directional beam of each of the antenna sets independently generated at the same time by each of the at least one antenna set may be allocated to one TXRU.

All of at least two directional beams among at least one directional beam of each of the antenna sets independently generated at the same time by each of the at least one antenna set may be allocated to at least one TXRU.

All of the at least one directional beam of each of the antenna sets independently generated at the same time by each of the at least two antenna sets may be allocated to one TXRU.

All of the at least one directional beam of each of the antenna sets independently generated at the same time by each of the at least two antenna sets may be allocated to at least one TXRU.

All of at least two directional beams among at least one directional beam of each of the antenna sets independently generated at the same time by each of the at least two antenna sets may be allocated to one TXRU.

All of at least two directional beams among at least one directional beam of each of the antenna sets independently generated at the same time by each of the at least two antenna sets may be allocated to at least one TXRU.

All of the at least two directional beams of each of the antenna sets independently generated at the same time by each of the at least two antenna sets may be allocated to one TXRU.

All of the at least two directional beams of each of the antenna sets independently generated at the same time by each of the at least two antenna sets may be allocated to at least one TXRU.

All of the at least two directional beams among the at least two directional beams of each of the antenna sets independently generated at the same time by each of the at least two antenna sets may be allocated to one TXRU.

All of the at least two directional beams among the at least two directional beams of each of the antenna sets independently generated at the same time by each of the at least two antenna sets may be allocated to at least one TXRU.

All of the independent at least one directional beam (hereinafter, a first directional beam) for each antenna set among at least one directional beam of each of the antenna sets independently generated at the same time by each of the at least one antenna set may be allocated to at least one TXRU (hereinafter, a first TXRU), and all of independent at least one directional beam (hereinafter, a second directional beam) for each antenna set different from at least one first directional beam for each antenna set may be allocated to at least one TXRU (hereinafter, a second TXRU) different from the at least one first TXRU.

All of the independent at least one first directional beam for each antenna set among the at least two directional beams of each of the antenna set independently generated at the same time by each of the at least one antenna set may be allocated to at least one first TXRU, and all of the independent at least one second directional beam for each antenna set different from the at least one first directional beam for each antenna set may be allocated to at least one second TXRU different from the at least one first TXRU.

As an example, among the independent two different directional beams of each of the antenna sets independently generated at the same time by each of the two antenna sets, all of one directional beam (the first directional beam of the first antenna set) independently generated at the same time by the first antenna set and one directional beam (the first directional beam of the second antenna set) independently generated at the same time by the second antenna set may be allocated to one TXRU (the first TXRU), and all of the first directional beam (the first directional beam of the first antenna set and the first directional beam of the second antenna set) and one independent directional beam for each other antenna set (the second directional beam of the first antenna set and the second directional beam of the second antenna set) may be allocated to another TXRU (second TXRU).

Among the at least one directional beam of each of the antenna sets independently generated at the same time by each of the at least two antenna sets, all of the independent at least one first directional beam for each antenna set may be allocated to at least one first TXRU, and all of the independent at least one first directional beam for each antenna set and the independent at least one second directional beam for each different antenna set may be allocated to at least one second TXRU different from the at least one first TXRU.

Among the at least two directional beams of each of the antenna sets independently generated at the same time by each of the at least two antenna sets, all of the independent at least one first directional beam for each antenna set is allocated to at least one first TXRU, and the independent at least one first directional beam for each antenna set and the independent at least one second directional beam for each different antenna set is allocated to independent at least one TXRU for each antenna set different from the at least one first TXRU.

As an example, among independent two different directional beams for each antenna set independently generated at the same time by each of the two antenna sets, all of independent one directional beam (the first directional beam of the first antenna set and the first directional beam of the second antenna set) for each antenna set may be allocated to one TXRU (first TXRU), and all of the independent remaining one directional beams for each of the two antenna sets (the second directional beam of the first antenna set and the second directional beam of the second antenna set) may be allocated to another TXRU (second TXRU).

As an example, among independent two different directional beams for each antenna set independently generated at the same time by each of the two antenna sets, independent one first directional beam for each antenna set (the first directional beam of the first antenna set and the first directional beam of the second antenna set) may be allocated to one TXRU (first TXRU), the second directional beam of the first antenna set may be allocated to the second TXRU, and the second directional beam of the second antenna set may be allocated to the third TXRU.

<Data Transmission/Reception Using Serving Beam>

The reference communication device simultaneously generates at least one serving beam for simultaneously transmitting or receiving information or signal from/to at least one second communication device under the control of the controller.

The reference communication device simultaneously generates at least two different serving beams for simultaneously transmitting or receiving information or signal from/to at least one second communication device under the control of the controller.

The reference communication device may operate the simultaneously generated at least one serving beam to simultaneously transmit or simultaneously receive at least one of information or signal from/to the at least one second communication device.

The reference communication device may operate the simultaneously generated at least two different serving beams to simultaneously transmit or simultaneously receive at least one of information or signal from/to the at least one second communication device.

<Identity and Independence of Data for Each Transmission and Reception Beam of Serving Beam Usage Data>

The reference communication device may operate all of the simultaneously generated at least one serving beam to simultaneously transmit or simultaneously receive the same at least one information or signal to/from the at least one second communication device.

The reference communication device operates all of the at least two directional beams among the simultaneously generated at least one serving beam to simultaneously transmit or simultaneously receive the same at least one of information or signal from/to the at least one second communication device.

The reference communication device may operate each of the simultaneously generated at least one serving beam to simultaneously transmit or simultaneously receive independent at least one of information or signal from/to the at least one second communication device.

The reference communication node may operate each of the at least two directional beams among the simultaneously generated at least one serving beam to simultaneously transmit or simultaneously receive at least one of independent information or signal from/to the at least one second communication device.

The reference communication device may operate all of the at least two directional beams among the simultaneously generated at least one serving beam to simultaneously transmit or simultaneously receive the same at least one of information or signal from/to the at least one second communication device, and each of the simultaneously generated at least two directional beams to simultaneously transmit or simultaneously receive independent at least one of information or signal from/to the at least one second communication device.

The reference communication device may operate all of the at least two directional beams among the simultaneously generated at least one serving beam to transmit or receive the same at least one information or signal to/from at least two different second communication devices among the at least one second communication device.

The reference communication device may operate each of at least two directional beams among the simultaneously generated at least one serving beam to transmit or receive independent at least one information or signal to/from at least two different second communication devices among the at least one second communication device.

The reference communication device may operate all of the at least two directional beams among the simultaneously generated at least one serving beam to transmit or receive the same at least one information or signal to/from at least two different second communication devices among the at least one second communication device, and each of the at least two directional beams to transmit or receive independent at least one information or signal to/from at least two different second communication devices among the at least one second communication device.

<Identity and Independence of Second Communication Device for Each Data Transmission/Reception Beam Using Serving Beam>

The reference communication device may operate all of the at least two directional beams among the simultaneously generated at least one serving beam to simultaneously transmit or simultaneously receive information or signal to/from the same at least one second communication device.

The reference communication device may operate each of at least two directional beams among the simultaneously generated at least one serving beam to simultaneously transmit or simultaneously receive information or signal from/to different at least one second communication device.

The reference communication device may operate all of the at least two directional beams among the simultaneously generated at least one serving beam to simultaneously transmit or simultaneously receive information or signal to/from the same at least one second communication device, and each of the at least two directional beams to simultaneously transmit or simultaneously receive information or signal from/to different at least one second communication device.

<Data Identity and Independence for Each Antenna Set for Transmission and Reception of Data Using Serving Beam>

The reference communication device may operate all of the at least one antenna set to simultaneously transmit or simultaneously receive the same at least one of information or signal from/to the at least one second communication device using the simultaneously generated at least one serving beam.

The reference communication device may operate each of the at least one antenna set of the antenna unit 21 to simultaneously transmit or simultaneously receive independent at least one information or signal from/to at least one second communication device using the simultaneously generated at least one serving beam.

The reference communication device may operate all of at least two antenna sets among the at least one antenna set to simultaneously transmit or simultaneously receive the same at least one of information or signal from/to at least one second communication device using the simultaneously generated at least one serving beam.

The reference communication device may operate each of at least two antenna sets among the at least one antenna set of the antenna unit 21 to simultaneously transmit or simultaneously receive independent at least one information or signal from/to at least one second communication device using the simultaneously generated at least one serving beam.

The reference communication device may operate all of the at least two antenna sets among the at least one antenna set to simultaneously transmit or simultaneously receive the same at least one of information or signal from/to the at least one second communication device, and each of at least two antenna sets among the at least one antenna set to simultaneously transmit or simultaneously receive independent at least one of information or signal from/to at least one second communication device using the simultaneously generated at least one serving beam.

<Identity and Independence of Second Communication Device for Each Data Transmission/Reception Antenna Set Using Serving Beam>

The reference communication device may operate all of the at least one antenna set to simultaneously transmit or simultaneously receive at least one information or signal to/from the same at least one second communication device using the simultaneously generated at least one serving beam.

The reference communication device may operate each of the at least one antenna set of the antenna unit 21 to simultaneously transmit or simultaneously receive at least one information or signal to/from independent at least one second communication device using the simultaneously generated at least one serving beam.

The reference communication device may operate all of the at least one antenna set to simultaneously transmit or simultaneously receive at least one of information or signal from/to the same at least one second communication device, and each of the at least one antenna set to simultaneously transmit or simultaneously receive at least one information or signal from/to independent at least one second communication device using the simultaneously generated at least one serving beam.

<TXRU Allocation to Serving Beam>

The reference communication device allocates the generated at least one serving beam to at least one TXRU.

The reference communication device allocates one directional beam among the generated at least one serving beam to at least two TXRUs. In this case, at least two TXRUs support transmission or reception of information or signal from/to at least one second communication device using one directional beam.

The reference communication device allocates at least two directional beams among the generated at least one serving beam to one TXRU. In this case, the one TXRU supports transmission or reception of information or signal from/to at least one second communication device using at least two directional beams among the generated at least one serving beam.

The reference communication device allocates at least two directional beams among the generated at least one serving beam to at least two TXRUs. In this case, the at least two TXRUs support transmission or reception of information or signal from/to at least one second communication device using at least two directional beams among the generated at least one serving beam.

The reference communication device allocates all of the same at least one serving beam of each of the antenna sets generated simultaneously by all of the at least two antenna sets to one TXRU.

The reference communication device allocates all of the same at least one serving beam of each of the antenna sets each generated simultaneously by all of the at least two antenna sets to at least one TXRU.

The reference communication device allocates all of the same at least one serving beam of each antenna set each generated simultaneously by all of the at least two antenna sets to one TXRU for each antenna set.

The reference communication device allocates all of the same at least one serving beam of each antenna set each generated simultaneously by all of the at least two antenna sets to at least one TXRU for each antenna set.

The reference communication device allocates all of the same at least two serving beams of each of the antenna sets each generated simultaneously by all of the at least two antenna sets to one TXRU.

The reference communication device allocates all of the same at least two serving beams of each of the antenna sets each generated simultaneously by all of the at least two antenna sets to at least one TXRU.

The reference communication device allocates all of the same at least two serving beams of each of the antenna sets each generated simultaneously by all of the at least two antenna sets to one TXRU for each antenna set.

The reference communication device allocates all of the same at least two serving beams of each of the antenna sets each generated simultaneously by all of the at least two antenna sets to at least one TXRU for each antenna set.

The reference communication device allocates each of the at least two directional beams among the simultaneously generated at least one serving beam to at least one TXRU that is different from the at least one TXRU allocated to the other directional beam among the at least two directional beams. In this case, at least one different TXRU for each directional beam supports transmission or reception of information or signal from/to the second communication device using at least two directional beams among the generated at least one serving beam.

The reference communication device allocates each of at least two directional beams among the simultaneously generated at least one serving beam to at least one TXRU identical to the at least one TXRU allocated to the other directional beam among the at least two directional beams, and allocates each of at least two directional beams to at least one TXRU that is different from the at least one TXRU allocated to the other directional beam among the at least two directional beams. In this case, the same at least one TXRU supports transmission or reception of information or signal to/from the second communication device using at least two directional beams among the generated at least one serving beam, and at least one TXRU different from the same at least one TXRU supports transmission or reception of information or signal to/from the second communication device using at least two directional beams among the generated at least one serving beam.

The reference communication device allocates each of at least two directional beams among the simultaneously generated at least one serving beam to at least one TXRU identical to the at least one TXRU allocated to the other directional beams among the at least two directional beams. In this case, the same at least one TXRU supports transmission or reception of information or signal to/from the second communication device using at least two directional beams among the generated at least one serving beam.

The reference communication device allocates each of at least two directional beams among the simultaneously generated at least one serving beam to at least one TXRU that is different from the at least one TXRU allocated to the other directional beam among the at least two directional beams. In this case, at least one different TXRU for each directional beam supports transmission or reception of information or signal from/to the second communication device using at least two directional beams among the generated at least one serving beam.

The reference communication device allocates each of at least two directional beams among the simultaneously generated at least one serving beam to at least one TXRU identical to the at least one TXRU allocated to the other directional beams among the at least two directional beams, and allocates each of at least two directional beams to at least one TXRU that is different from the at least one TXRU allocated to the other directional beam among the at least two directional beams. In this case, the same at least one TXRU supports transmission or reception of information or signal to/from the second communication device using at least two directional beams among the generated at least one serving beam, and at least one TXRU different from the same at least one TXRU supports transmission or reception of information or signal to/from the second communication device using at least two directional beams among the generated at least one serving beam.

The reference communication device may control all of the at least one antenna set to simultaneously and identically generate the at least one serving beam and the at least one tracking beam, respectively.

The reference communication device may control all of the at least two antenna sets to simultaneously and identically generate the at least one serving beam and the at least one tracking beam, respectively.

The reference communication device may control at least one first antenna set among at least two antenna sets to simultaneously and individually generate the at least one serving beam; and at least one second antenna set among the at least two antenna sets to simultaneously and individually generate the at least one tracking beam.

The reference communication device may control at least one first antenna set among at least two antenna sets to simultaneously and individually generate the at least one serving beam and the at least one first tracking beam; and at least one second antenna set among the at least two antenna sets to simultaneously and individually generate the at least one serving beam and the at least one second tracking beam.

The reference communication device may control at least one first antenna set among at least two antenna sets to simultaneously and individually generate a part of the at least one tracking beam and the at least one serving beam; and at least one second antenna set among the at least two antenna sets to simultaneously and individually generate a remaining part of the at least one tracking beam and the at least one serving beam.

The reference communication device may control at least one first antenna set among at least two antenna sets to simultaneously and individually generate a part of all of the at least one serving beam and the at least one tracking beam; and at least one second antenna set among the at least two antenna sets to simultaneously and individually generate a remaining part of all of the at least one serving beam and the at least one tracking beam.

The reference communication device may control at least one first antenna set among at least two antenna sets to simultaneously and individually generate the at least one serving beam; and each of at least one second antenna set among the at least two antenna sets to simultaneously and individually generate at least one different tracking beam.

The reference communication device may control all of the at least two antenna sets to simultaneously generate the at least one serving beam, identically and respectively; and each of the at least two antenna sets to simultaneously generate different at least one tracking beam.

The reference communication device may control at least one first antenna set among at least two antenna sets to simultaneously and individually generate the at least one serving beam and the at least one tracking beam; and at least one second antenna set among the at least two antenna sets to simultaneously and individually generate at least one serving beam or the at least one tracking beam generated by the first antenna set.

The reference communication device may control to sequentially generate the at least one serving beam and the at least one first tracking beam; and the at least one serving beam and the at least one second tracking beam.

The reference communication device may control to sequentially generate a part of the at least one tracking beam and the at least one serving beam; and a remaining part of the at least one tracking beam and the at least one serving beam.

The reference communication device may control to sequentially generate a part of all of the at least one serving beam and the at least one tracking beam; and a remaining part of all of the at least one serving beam and the at least one tracking beam.

The reference communication device may control at least one antenna set to generate at least one composite beam covering directivity of the at least one serving beam and the at least one tracking beam.

The reference communication device may control at least one antenna set to simultaneously or sequentially generate at least two independent composite beams covering the directivity of the at least one serving beam and the at least one tracking beam. The reference communication device may control at least two antenna sets to simultaneously or sequentially generate at least two independent composite beams.

The reference communication device may control at least one first antenna set among at least two antenna sets to simultaneously or sequentially generate at least one first composite beam; and at least one second antenna set among the at least two antenna sets to simultaneously or sequentially generate another at least one second composite beam.

Each antenna set of the reference communication device may simultaneously generate at least one serving beam and at least one tracking beam different from the at least one serving beam.

At least one serving beam and at least one tracking beam respectively generated at the same time by all of the antenna sets may be allocated to one TXRU.

At least one serving beam and at least one tracking beam respectively generated at the same time by all of the antenna sets may be allocated to at least one TXRU.

At least one serving beam respectively generated at the same time by all of the antenna sets may be allocated to one TXRU and at least one tracking beam respectively generated at the same time by all of the antenna sets may be allocated to another TXRU.

At least one serving beam respectively generated at the same time by all of the antenna sets may be allocated to at least one TXRU, and at least one tracking beam respectively generated at the same time by all of the antenna sets may be allocated to another at least one TXRU.

All of the at least two antenna sets of the reference communication device may simultaneously and identically generate at least one serving beam and at least one tracking beam different from the at least one serving beam, respectively.

All of the same at least one serving beam and at least one tracking beam of each of the antenna sets, which are respectively, identically generated at the same time by all of the at least two antenna sets, may be allocated to one TXRU.

All of the same at least one serving beam and at least one tracking beam of each of the antenna sets, which are respectively, identically generated at the same time by all of the at least two antenna sets, may be allocated to at least one TXRU.

The same at least one serving beam and at least one tracking beam of each of the antenna sets, which are respectively, identically generated at the same time by all of the at least two antenna sets, may be allocated to other one TXRU for each antenna set.

The same at least one serving beam and at least one tracking beam of each of the antenna sets, which are respectively, identically generated at the same time by all of the at least two antenna sets, may be allocated to other at least one TXRU for each antenna set.

All of the same at least one serving beam of each of the antenna sets, which are respectively, identically generated at the same time by all of the at least two antenna sets, may be allocated to one TXRU, and all of the same at least one tracking beam of each of the antenna sets, which are respectively, identically generated at the same time by all of the at least two antenna sets, may be allocated to another TXRU.

All of the same at least one serving beam of each of the antenna sets, which are respectively, identically generated at the same time by all of the at least two antenna sets, may be allocated to at least one TXRU, and all of the same at least one tracking beam of each of the antenna sets, which are respectively, identically generated at the same time by all of the at least two antenna sets, may be allocated to another at least one TXRU.

The same at least one serving beam of each of the antenna sets, which are respectively, identically generated at the same time by all of the at least two antenna sets, may be allocated to one TXRU for each antenna set, and the same at least one tracking beam of each of the antenna sets, which are respectively, identically generated at the same time by all of the at least two antenna sets, may be allocated to another TXRU for each antenna set.

The same at least one serving beam of each of the antenna sets, which are respectively, identically generated at the same time by all of the at least two antenna sets, may be allocated to at least one TXRU for each antenna set, and the same at least one tracking beam of each of the antenna sets, which are respectively, identically generated at the same time by all of the at least two antenna sets, may be allocated to different at least one TXRU for each antenna set. Each of the at least two antenna sets of the reference communication device may simultaneously generate independent at least one serving beam and at least one tracking beam different from the at least one serving beam.

All of independent at least one serving beam and at least one tracking beam of each of the antenna sets independently and simultaneously generated by each of the at least two antenna sets may be allocated to one TXRU.

All of the independent at least one serving beam and at least one tracking beam of each of the antenna sets independently and simultaneously generated by each of the at least two antenna sets may be allocated to at least one TXRU.

At least one independent serving beam and at least one tracking beam of each antenna set, which are independently and simultaneously generated by each of the at least two antenna sets, may be allocated to other one TXRU for each antenna set.

At least one serving beam and at least one tracking beam independently of each of the antenna sets, which are independently and simultaneously generated by each of the at least two antenna sets, may be allocated to other at least one TXRU for each antenna set.

All of independent at least one serving beam of each of the antenna sets, independently and simultaneously generated by each of the at least two antenna sets, may be allocated to one TXRU, and all of the independent at least one tracking beam of each of the antenna sets, independently and simultaneously generated by each of the at least two antenna sets, may be allocated to another TXRU.

All of the independent at least one serving beam of each of the antenna sets, independently and simultaneously generated by each of the at least two antenna sets, may be allocated to at least one TXRU, and all of the independent at least one tracking beam of each of the antenna sets, independently and simultaneously generated by each of the at least two antenna sets, may be allocated to different at least one TXRU.

At least one independent serving beam of each antenna set, which is independently and simultaneously generated by each of the at least two antenna sets, may be allocated to one TXRU for each antenna set, and at least one independent tracking beam of each of the antenna sets independently and simultaneously generated by each of the at least two antenna sets, may be allocated to other one TXRU for each antenna set.

At least one independent serving beam of each of the antenna sets independently and simultaneously generated by each of the at least two antenna sets, may be allocated to at least one TXRU for each antenna set, and at least one independent tracking beam of each of the antenna sets independently and simultaneously generated by each of the at least two antenna sets, may be allocated to different at least one TXRU for each antenna set.

The reference communication device may allocate all of the at least one serving beam to at least one first TXRU, and the reference communication device may allocate all of the at least one tracking beam to other at least one second TXRU.

The reference communication device may allocate all of the at least one serving beam to at least one first TXRU, and all of the at least one tracking beam to different at least one second TXRU.

The reference communication device may allocate all of the at least one serving beam to at least one first TXRU, and the reference communication device may allocate each of the at least one tracking beam to other at least one second TXRU.

The reference communication device may allocate all of at least one first tracking beams among the at least one serving beam and the at least one tracking beam to the at least one first TXRU, and all of the other at least one second tracking beam among the at least one serving beam and the at least one tracking beam to the other at least one second TXRU.

The reference communication device may allocate all of at least one first tracking beams among the at least one serving beam and the at least one tracking beam to at least one TXRU, and sequentially allocate all the other at least one second tracking beams among the at least one serving beam and the at least one tracking beam to the at least one TXRU.

The reference communication device may allocate a part of the at least one tracking beam and the at least one serving beam to at least one first TXRU, and a remaining part of the at least one tracking beam and the at least one serving beam to other at least one second TXRU.

The reference communication device may allocate a part of the at least one tracking beam and the at least one serving beam to at least one TXRU, and sequentially allocate a remaining part of the at least one tracking beam and the at least one serving beam to the at least one TXRU.

The reference communication device may allocate a part of all of the at least one serving beam and the at least one tracking beam to at least one first TXRU, and a remaining part of all of the at least one serving beam and the at least one tracking beam to other at least one second TXRU.

The reference communication device may allocate a part of all of the at least one serving beam and the at least one tracking beam to at least one TXRU, and sequentially allocate a remaining part of all of the at least one serving beam and the at least one tracking beam to the at least one TXRU.

The reference communication device may allocate all of the at least one composite beam to at least one TXRU.

The reference communication device may allocate each of the at least one composite beam to at least one different TXRU.

The reference communication device may sequentially allocate each of the at least one composite beam to at least one TXRU.

The reference communication device may allocate the at least one composite beam to at least one different TXRU for each antenna set.

The reference communication device may allocate a part of the at least one composite beam to at least one first TXRU, and a remaining part of the at least one composite beam to other at least one second TXRU.

The reference communication device may allocate a part of the at least one composite beam to at least one TXRU, and sequentially allocate a remaining part of the at least one composite beam to the at least one TXRU.

The reference communication device may allocate one first composite beam generated by at least one first antenna set among at least two antenna sets to at least one first TXRU, and at least one second composite beam generated by at least one second antenna set among the at least two antenna sets to other at least one second TXRU.

The reference communication device may allocate one first composite beam generated by at least one first antenna set among at least two antenna sets to at least one TXRU, and sequentially allocate at least one second composite beam generated by at least one second antenna set among the at least two antenna sets to the at least one TXRU.

The reference communication device may allocate a part of at least one composite beam generated by at least one first antenna set to at least one first TXRU, and a remaining part of the at least one composite beam generated by the at least one second antenna set to other at least one second TXRU.

The reference communication device may allocate a part of at least one composite beam generated by at least one first antenna set to at least one TXRU, and sequentially allocate a remaining part of the at least one composite beam generated by the at least one second antenna set to the at least one TXRU.

The reference communication device may allocate at least one first composite beam among the at least one composite beam to at least one first TXRU, and other at least one second composite beam among the at least two composite beams to other at least one second TXRU.

The reference communication device may allocate at least one first composite beam among the at least one composite beam to at least one TXRU, and sequentially allocate other at least one second composite beam among the at least two composite beams to the at least one TXRU.

The reference communication device may allocate all of the at least one first tracking beams among the at least one serving beam and the at least two tracking beams to at least one first TXRU, and all of the other at least one second tracking beam among the at least one serving beam and the at least two tracking beams to the other at least one second TXRU.

The reference communication device may allocate all of the at least one first tracking beam among the at least one serving beam and the at least two tracking beams to at least one TXRU, and sequentially allocate all of the other at least one second tracking beam among the at least one serving beam and the at least two tracking beams to the at least one TXRU.

The reference communication device may allocate all of the at least one first antenna set generating the at least one serving beam to at least one first TXRU, and all of the at least one second antenna set generating the at least one tracking beam to other at least one second TXRU.

The reference communication device may allocate the at least one serving beam and the at least one first tracking beam generated by the at least one first antenna set to at least one first TXRU, and the at least one serving beam and the at least one second tracking beam generated by the at least one second antenna set to other at least one second TXRU.

The reference communication device may allocate a part of the at least one tracking beam and the at least one serving beam generated by the at least one first antenna set to at least one first TXRU, and a remaining part of the at least one tracking beam and the at least one serving beam generated by the at least one second antenna set to other at least one second TXRU.

The reference communication device may allocate a part of the at least one tracking beam and the at least one serving beam generated by the at least one first antenna set to at least one TXRU, and sequentially allocate a remaining part of the at least one tracking beam and the at least one serving beam generated by the at least one second antenna set to the at least one TXRU.

The reference communication device may allocate a part of all of the at least one serving beam and the at least one tracking beam generated by the at least one first antenna set to at least one first TXRU, and a remaining part of all of the at least one serving beam and the at least one tracking beam generated by the at least one second antenna set to at least one second TXRU.

The reference communication device may allocate a part of all of the at least one serving beam and the at least one tracking beam generated by the at least one first antenna set to at least one TXRU, and sequentially allocate a remaining part of all of the at least one serving beam and the at least one tracking beam generated by the at least one second antenna set to the at least one TXRU.

The reference communication device may allocate the at least one serving beam generated by the at least one first antenna set to at least one first TXRU, and the different at least one tracking beam generated by each of the at least one second antenna set to different at least one second TXRU for each antenna set.

The reference communication device may allocate the at least one serving beam generated by all of the at least two antenna sets to at least one first TXRU, and the different at least one tracking beam generated by each of the at least two antenna sets to the different at least one second TXRU for each antenna set.

The reference communication device may allocate the at least one serving beam and the at least one tracking beam generated by the at least one first antenna set to at least one first TXRU, and the at least one serving beam or the at least one tracking beam generated by the at least one second antenna set to other at least one second TXRU.

The reference communication device may allocate the at least one first composite beam (or the at least one serving beam and the at least one first tracking beam) to at least one first TXRU, and the at least one second composite beam (or the at least one serving beam and the at least one second tracking beam) to at least one second TXRU.

The reference communication device may sequentially allocate the at least one first composite beam (or the at least one serving beam and the at least one first tracking beam) to at least one TXRU, and the at least one second composite beam (or the at least one serving beam and the at least one second tracking beam) to the at least one TXRU.

The reference communication device may allocate each of the at least one serving beam to at least one different first TXRU, and each of the at least one tracking beam to another at least one different second TXRU.

The reference communication device may allocate at least one service beam individually generated at the same time by each of the at least one antenna set to at least one first TXRU for each antenna set, and at least one tracking beam individually generated at the same time by each of the at least one antenna set to different at least one second TXRU for each antenna set.

The reference communication device may allocate at least one service beam and at least one tracking beam individually generated at the same time by each of the at least one antenna set to different at least one TXRU for each antenna set.

The reference communication device may simultaneously generate at least one serving beam and at least one directional beam (hereinafter referred to as a tracking beam) different from the at least one serving beam.

The reference communication device may use the simultaneously generated at least one serving beam and at least one tracking beam as one composite beam. The one composite beam has an overlapping coverage covering the coverage of the at least one serving beam and the coverage of the at least one tracking beam.

The reference communication device may use the simultaneously generated at least one serving beam and at least one tracking beam as at least two independent beams.

The reference communication device may simultaneously generate at least one serving beam, at least one first tracking beam different from the at least one serving beam, and at least one second tracking beam different from the at least one serving beam and the at least one first tracking beam. At this time, the at least one serving beam, the at least one first tracking beam, and the at least one second tracking beam are independent.

The reference communication device may use a first composite beam formed of at least one serving beam and at least one first tracking beam and a second composite beam formed from the at least one serving beam and at least one second tracking beam as two independent composite beams.

The reference communication device may use at least one serving beam, at least one first tracking beam, and at least one second tracking beam as three independent beams.

The reference communication device may generate at least one tracking beam different from the at least one serving beam while maintaining communication with at least one second communication device using the at least one serving beam.

The reference communication device may generate the at least one serving beam, the at least one first tracking beam, and the at least one second tracking beam while maintaining communication with at least one second communication device using the at least one serving beam.

The reference communication device may generate one composite beam formed of the at least one serving beam and the at least one tracking beam while maintaining communication with at least one second communication device using the at least one serving beam.

The reference communication device may generate a first composite beam formed by the at least one serving beam and at least one first tracking beam and a second composite beam formed by the at least one serving beam and at least one second tracking beam while maintaining communication with the at least one second communication device using the at least one serving beam.

The reference communication device receives at least one reference signal from at least one second communication device using the at least one serving beam, and measures signal quality of the at least one reference signal.

The reference communication device receives at least one first signal from the at least one second communication device, using at least one serving beam and at least one first tracking beam generated simultaneously, and measures signal quality of the at least one first signal.

The reference communication device receives at least one second signal from the at least one second communication node, using at least one serving beam and at least one second tracking beam generated simultaneously, and measures signal quality of the at least one second signal.

The reference communication device receives at least one first signal from the at least one second communication device, using the first composite beam formed of at least one serving beam and at least one first tracking beam generated simultaneously, and measures signal quality of the at least one first signal.

The reference communication device receives at least one second signal from the at least one second communication device using a second composite beam composed of at least one serving beam and at least one second tracking beam generated simultaneously, and measures signal quality of the at least one second signal.

The reference communication device may control to generate one signal quality from all of the at least one allocated TXRU.

The reference communication device may control each of the at least one allocated TXRU to generate one signal quality.

The reference communication device may control to generate one signal quality from all of the at least two allocated TXRUs.

The reference communication device may control each of the at least two allocated TXRUs to generate one signal quality.

The reference communication device may control to generate one signal quality from all of the at least one antenna set.

The reference communication device may control each of the at least one antenna set to generate one signal quality.

The reference communication device may control to generate one signal quality from all of the at least one serving beam.

The reference communication device may control to generate one signal quality from each of at least one serving beam.

The reference communication device may control to generate one signal quality of all of the at least one serving beam and the at least one tracking beam.

The reference communication device may control to simultaneously or sequentially generate one first second-signal quality of all of the at least one serving beam; and another second second-signal quality of all of the at least one tracking beam.

The reference communication device may control to simultaneously or sequentially generate one first second-signal quality of all of the at least one serving beam, and one second second-signal quality of each of the at least one tracking beam.

The reference communication device may control to simultaneously or sequentially generate one first second-signal quality of all of the at least one serving beam and the at least one first tracking beam; and another second second-signal quality of all of the at least one serving beam and the at least one second tracking beam.

The reference communication device may control to simultaneously or sequentially generate one first second-signal quality of a part of the at least one tracking beam and one of the at least one serving beam; and another second second-signal quality of a remaining part of the at least one tracking beam and the at least one serving beam.

The reference communication device may control to simultaneously or sequentially generate one first second-signal quality from a part of all of the at least one serving beam and the at least one tracking beam; and another second second-signal quality from a remaining part of all of the at least one serving beam and the at least one tracking beam.

The reference communication device may control to generate one signal quality of all of the at least one composite beam.

The reference communication device may control to simultaneously or sequentially generate one signal quality of each of the at least one composite beam.

The reference communication device may simultaneously or sequentially generate one first second-signal quality of all of the at least one first composite beam generated by the at least one first antenna set; and a second second-signal quality of all of the other at least one second composite beam generated by the other at least one second antenna set.

The reference communication device may simultaneously or sequentially generate one first second-signal quality of a part of at least one composite beam generated by at least one first antenna set; and another second second-signal quality of a remaining part of the at least one composite beam generated by the other at least one second antenna set.

The at least one first signal and the at least one second signal may be simultaneously received. In this case, each of the at least one first signal and the at least one second signal is allocated to different TXRUs.

The reference communication device may compare the signal quality of the reference signal and the signal quality of the first signal, if the comparison metric of the signal quality of the reference signal and the signal quality of the first signal is out of a predetermined threshold criterion, and change the at least one first tracking beam to at least one new serving beam.

The reference communication device may compare the signal quality of the reference signal and the signal quality of the second signal, if the comparison metric of the signal quality of the reference signal and the signal quality of the second signal is out of a predetermined threshold criterion, and change the at least one second tracking beam to at least one new serving beam.

At least two of the at least one TXRU may support transmission or reception of information or signal using at least one directional beam.

Each of at least two service space areas serviced by each of at least two directional beams among at least one serving beam may spatially overlap.

A space area of each of the service area and the at least one service-tracking composite area may be variable.

A space area of each of the service area and the at least one service-tracking composite area may be varied based on at least one of a communication environment (e.g., mobile, office, etc.), movement, service conditions, and access conditions of the reference communication device.

The service area represents a space area where communication services can be provided using the service area beam of the reference communication device generated for communication with the target communication device.

The service-tracking composite area is a space area including all or part of the space area of the active service area, and represents a space area set to simultaneously enable a directional beam search operation and communication service provision during a tracking process.

The service-tracking composite area represents a space area set to simultaneously enable a directional beam search/tracking operation and communication service provision during a search or tracking process while maintaining communication with the target communication device.

Hereinafter, various structures of a beam tracking apparatus using a directional beam according to embodiments of the present disclosure are described with reference to FIGS. 7 to 39.

Figure 7:
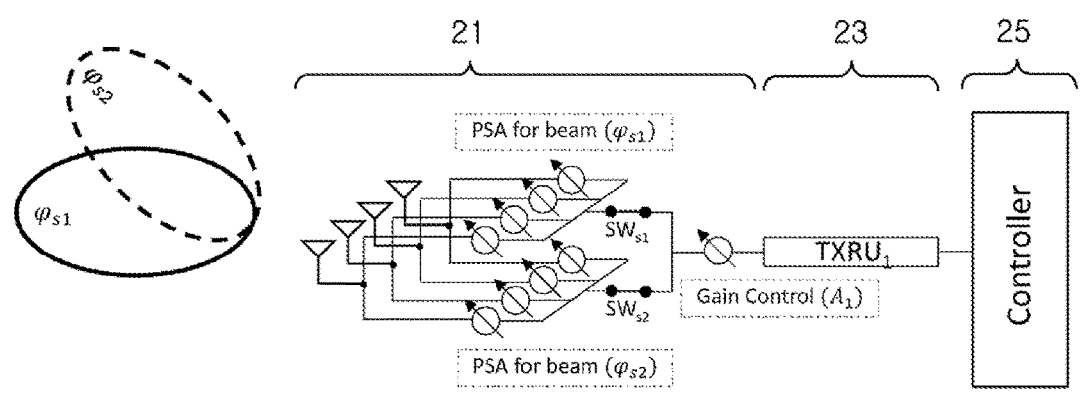

Referring to FIG. 7, an antenna set may be formed in the antenna unit 21, two phase shifter arrays (PSAs) may be connected to the antenna set, and a first serving beam φs1 and a second serving beam φs2 oriented in different directions may be respectively generated through the two phase shifter arrays of the antenna set. One transceiver unit TXRU1 of the transceiver 23 operating based on a control operation of the controller 25 may be provided, and the two phase shifter arrays of the antenna set configured to respectively generate the first serving beam φs1 and the second serving beam φs2 may be connected to share through a gain controller. The beam tracking apparatus according to an embodiment of the present disclosure may be configured to maintain at least one of a first serving beam and a second serving beam and generate the other at least one serving beam except for the maintained at least one serving beam. As described above, the antenna set may generate at least two different directional beams at the same time. Furthermore, at least one composite beam may be generated or at least one beam diversity may be formed from at least two different serving beams generated through the antenna set.

Figure 8:
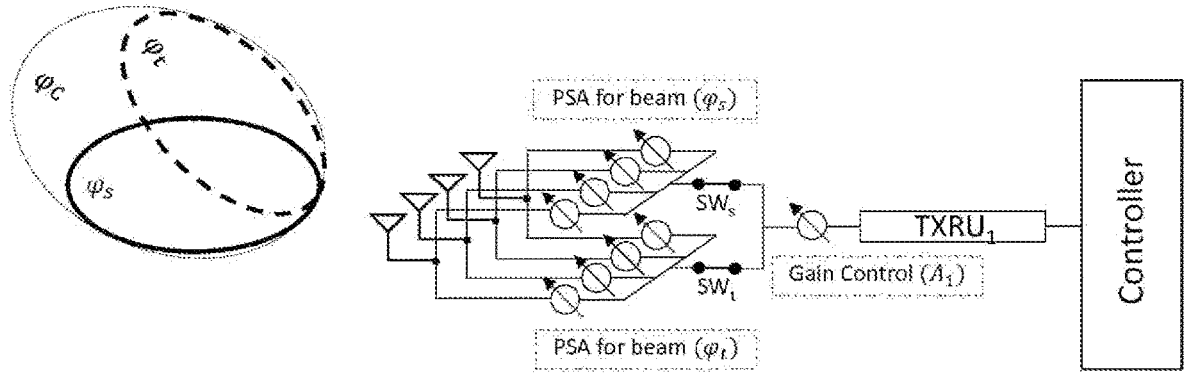

Referring to FIG. 8, an antenna set may be formed in the antenna unit 21, and two phase shifter arrays (PSAs) may be connected to the antenna set. A serving beam φps and a tracking beam φt oriented in different directions may be respectively generated through the two phase shifter arrays of the antenna set, and a composite beam φc may be formed from the serving beam φps and the tracking beam φt. One transceiver unit TXRU1 of the transceiver 23 operating based on a control operation of the controller 25 may be provided, and the two phase shifter arrays of the antenna set configured to respectively generate the serving beam φps and the tracking beam φt may be connected to share through a gain controller. The beam tracking apparatus according to an embodiment of the present disclosure may be configured to maintain a serving beam and generate a tracking beam. As described above, the antenna set may generate at least two different directional beams at the same time. Furthermore, at least one composite beam may be generated from the serving beam and at least one tracking beam generated through the antenna set.

Figure 9:
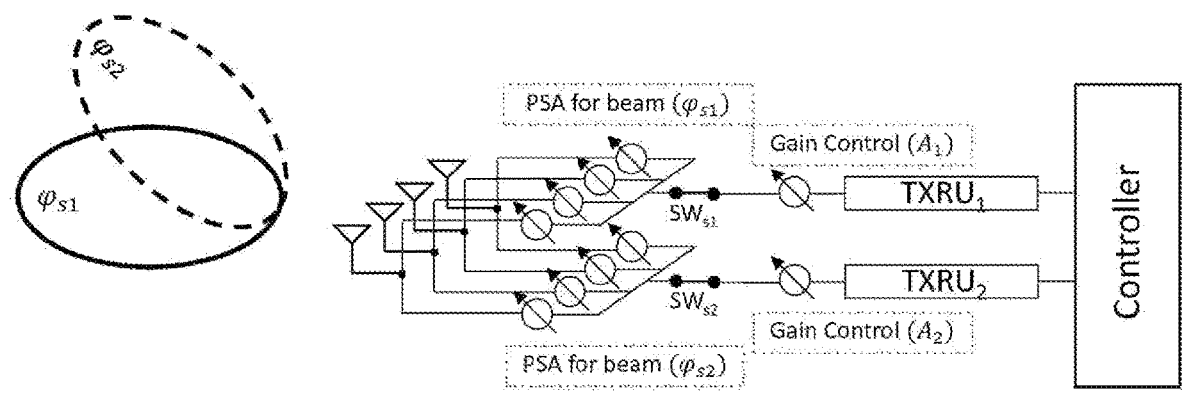

Referring to FIG. 9, an antenna set may be formed in the antenna unit 21, two phase shifter arrays (PSAs) may be connected to the antenna set, and a first serving beam φs1 and a second serving beam φs2 oriented in different directions may be respectively generated through the two phase shifter arrays of the antenna set. Two transceiver units TXRU1,2 of the transceiver 23 operating based on a control operation of the controller 25 may be provided, and the two phase shifter arrays of the antenna set configured to respectively generate the first serving beam φs1 and the second serving beam φs2 may be individually connected through corresponding gain controllers. The beam tracking apparatus according to an embodiment of the present disclosure may assign two serving beams oriented in different directions to two transceiver units. For example, a first serving beam may be assigned to a first transceiver unit, and a second serving beam may be assigned to a second transceiver unit. Further, the beam tracking apparatus according to an embodiment of the present disclosure may be configured to maintain at least one of the first serving beam and the second serving beam and generate the other at least one serving beam except for the maintained at least one serving beam. As described above, the antenna set may generate at least two different directional beams at the same time. Furthermore, at least one composite beam or at least one beam diversity; and/or at least one beam multiplexing may be formed by combining simultaneously or sequentially at least two different serving beams generated through the antenna set.

Figure 10:
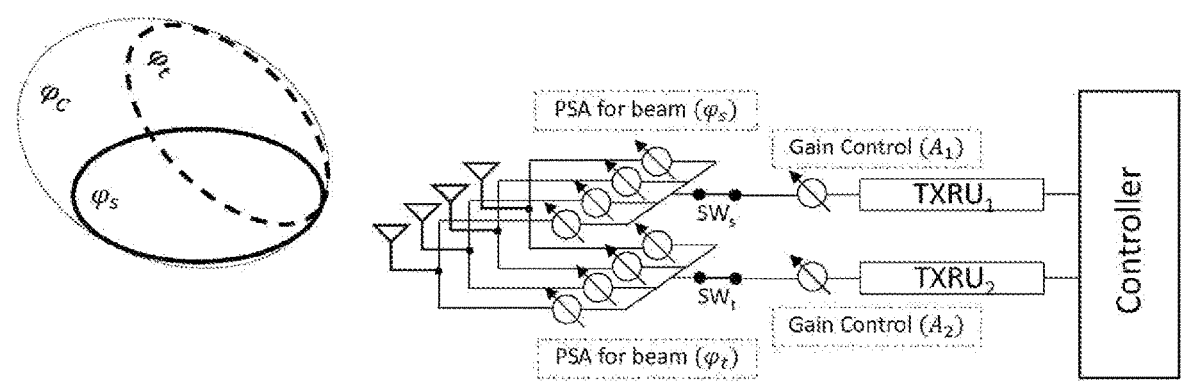

Referring to FIG. 10, an antenna set may be formed in the antenna unit 21, and two phase shifter arrays (PSAs) may be connected to the antenna set. A serving beam φps and a tracking beam φt oriented in different directions may be respectively generated through the two phase shifter arrays of the antenna set, and a composite beam φc may be formed from the serving beam φps and the tracking beam φt. Two transceiver units TXRU1,2 of the transceiver 23 operating based on a control operation of the controller 25 may be provided, and the two phase shifter arrays of the antenna set configured to respectively generate the serving beam φps and the tracking beam φt may be individually connected through corresponding gain controllers. The beam tracking apparatus according to an embodiment of the present disclosure may assign a serving beam and a tracking beam to two transceiver units. For example, the serving beam may be assigned to a first transceiver unit, and the tracking beam may be assigned to a second transceiver unit. Further, the beam tracking apparatus according to an embodiment of the present disclosure may be configured to maintain the serving beam and generate the tracking beam. As described above, the antenna set may generate at least two different directional beams at the same time. Furthermore, at least one composite beam may be formed by combining simultaneously or sequentially at least one serving beam and at least one tracking beam generated through the antenna set.

Figure 11:
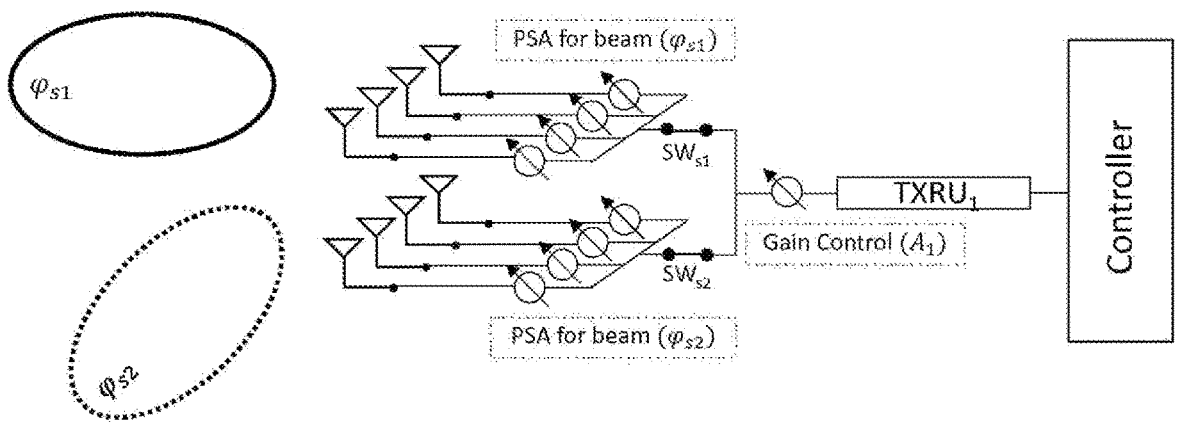

Referring to FIG. 11, two antenna sets may be formed in the antenna unit 21, a total of two phase shifter arrays (PSAs) may be respectively connected to the two antenna sets, and a first serving beam φs1 or a second serving beam φs2 oriented in different directions may be generated for each antenna set through the total of two phase shifter arrays. One transceiver unit TXRU1 of the transceiver 23 operating based on a control operation of the controller 25 may be provided, and the total of two phase shifter arrays configured to respectively generate the first serving beam φs1 and the second serving beam φs2 may be connected to share through a gain controller. The beam tracking apparatus according to an embodiment of the present disclosure may be configured to maintain at least one of a first serving beam and a second serving beam respectively generated through two antenna sets and generate the other at least one serving beam except for the maintained at least one serving beam. As described above, at least two antenna sets may generate at least one different directional beam for each antenna set, i.e., a total of at least two directional beams at the same time. Furthermore, at least one composite beam may be generated, or at least one antenna diversity; and/or at least one beam diversity may be formed from at least one different directional beam for each antenna set, i.e., a total of at least two different directional beams through at least two antenna sets.

Figure 12:
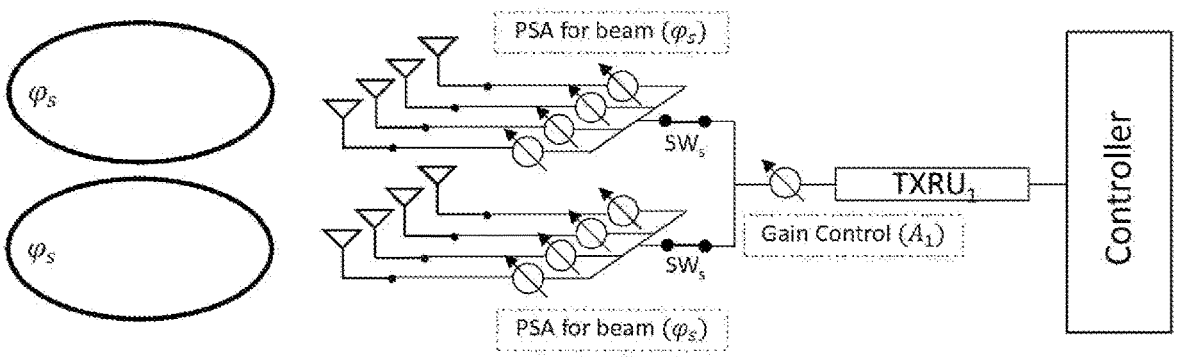

Referring to FIG. 12, two antenna sets may be formed in the antenna unit 21, a total of two phase shifter arrays (PSAs) may be respectively connected to the two antenna sets, and a total of two same serving beams φs oriented in the same direction may be respectively generated for the two antenna sets through the total of two phase shifter arrays. One transceiver unit TXRU1 of the transceiver 23 operating based on a control operation of the controller 25 may be provided, and the total of two phase shifter arrays of the two antenna sets configured to respectively generate the total two same serving beams for the two antenna sets may be connected to share through a gain controller. The beam tracking apparatus according to an embodiment of the present disclosure may be configured to maintain at least one of two same serving beams generated through two antenna sets and generate the at least one same serving beam except for the maintained at least one serving beam. As described above, at least two antenna sets may generate at least one directional beam for each antenna set, i.e., a total of at least two same directional beams at the same time. Furthermore, at least one antenna diversity may be formed from at least one directional beam for each antenna set, i.e., a total of at least two same directional beams through at least two antenna sets.

Figure 13:
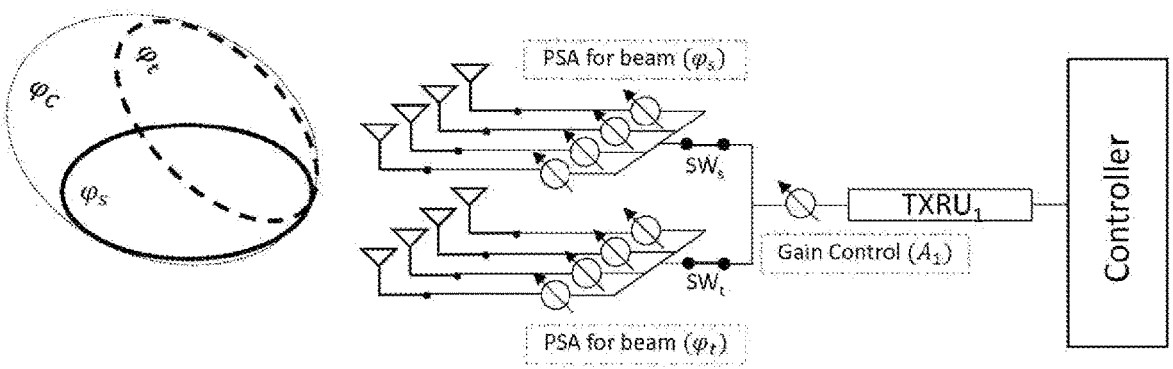

Referring to FIG. 13, two antenna sets may be formed in the antenna unit 21, and a total of two phase shifter arrays (PSAs) may be respectively connected to the two antenna sets. A total of two beams of a serving beam φs and a tracking beam φt oriented in different directions may be respectively generated for the two antenna sets through the total of two phase shifter arrays, and a composite bema (φc may be formed from the serving beam φs and the tracking beam φt. One transceiver unit TXRU1 of the transceiver 23 operating based on a control operation of the controller 25 may be provided, and the total of two phase shifter arrays of the two antenna sets configured to respectively generate the serving beam φs and the tracking beam φt may be connected to share through a gain controller. The beam tracking apparatus according to an embodiment of the present disclosure may be configured to maintain a serving beam generated through a first antenna set and generate a tracking beam through a second antenna set. As described above, at least two antenna sets may generate at least one directional beam for each antenna set, i.e., a total of at least two directional beams at the same time. Furthermore, at least one composite beam may be formed from at least one directional beam for each antenna set, i.e., a total of at least two directional beams through at least two antenna sets.

Figure 14:
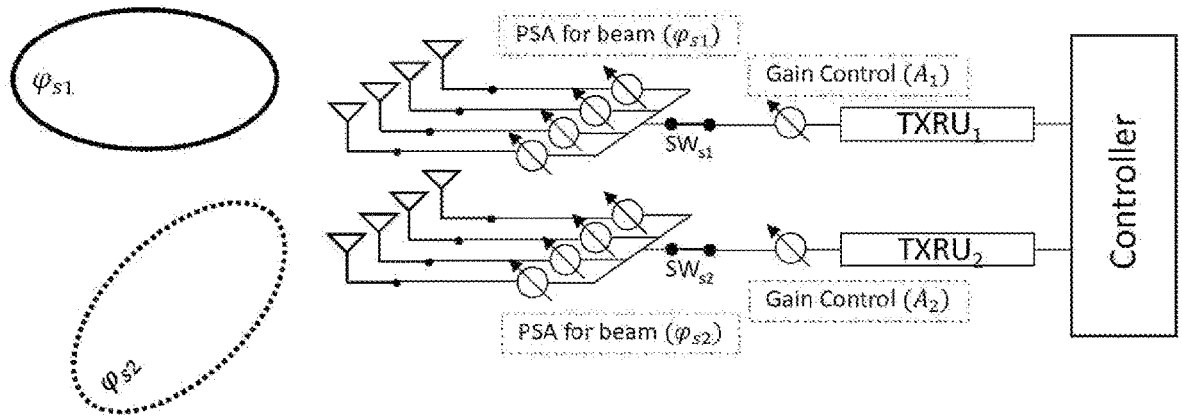

Referring to FIG. 14, two antenna sets may be formed in the antenna unit 21, and a total of two phase shifter arrays (PSAs) may be respectively connected to the two antenna sets. A total of two beams of a first serving beam φs1 and a second serving beam φs2 oriented in different directions may be respectively generated for the two antenna sets through the total of two phase shifter arrays. Two transceiver units TXRU1,2 of the transceiver 23 operating based on a control operation of the controller 25 may be provided, and the total of two phase shifter arrays of the two antenna sets configured to respectively generate the first serving beam φs1 and the second serving beam φs2 may be individually connected through corresponding gain controllers. The beam tracking apparatus according to an embodiment of the present disclosure may assign two serving beams oriented in different directions to two transceiver units. For example, a first serving beam may be assigned to a first transceiver unit, and a second serving beam may be assigned to a second transceiver unit. The beam tracking apparatus according to an embodiment of the present disclosure may be configured to maintain at least one of a first serving beam and a second serving beam and generate the other at least one serving beam except for the maintained at least one serving beam. As described above, at least two antenna sets may generate at least one directional beam for each antenna set, i.e., a total of at least two directional beams at the same time. Furthermore, at least one composite beam may be formed, or at least one antenna multiplexing; at least one antenna diversity; and/or at least one beam diversity may be formed by combining simultaneously or sequentially at least one directional beam for each antenna set (i.e., a total of at least two directional beams) through at least two antenna sets.

Figure 15:
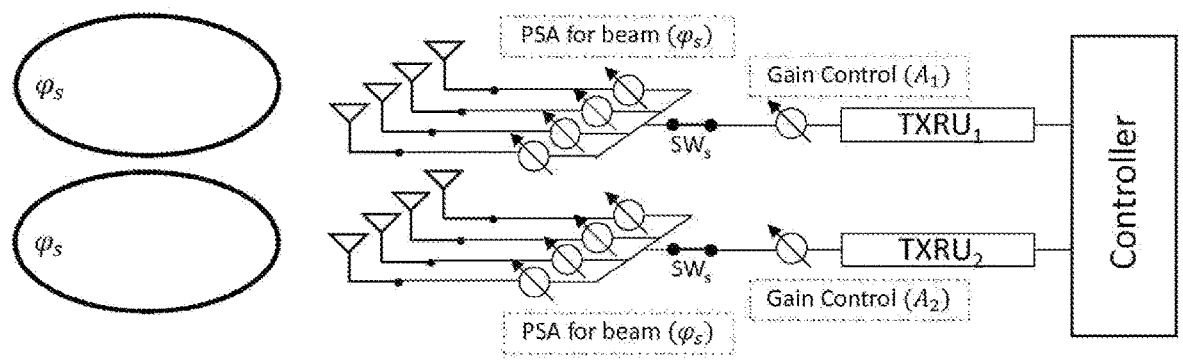

Referring to FIG. 15, two antenna sets may be formed in the antenna unit 21, and a total of two phase shifter arrays (PSAs) may be respectively connected to the two antenna sets. A total of two same serving beams φs oriented in the same direction may be respectively generated for the two antenna sets through the total of two phase shifter arrays. Two transceiver units TXRU1,2 of the transceiver 23 operating based on a control operation of the controller 25 may be provided, and the total of two phase shifter arrays of the two antenna sets configured to respectively generate the two same serving beams φs may be individually connected through corresponding gain controllers. The beam tracking apparatus according to an embodiment of the present disclosure may assign two serving beams oriented in the same direction to two transceiver units. For example, a serving beam generated through a first antenna set may be assigned to a first transceiver unit, and a serving beam generated through a first antenna set may be assigned to a second transceiver unit. The beam tracking apparatus according to an embodiment of the present disclosure may be configured to maintain at least one of two same serving beams and generate the at least one same serving beam except for the maintained at least one serving beam. As described above, at least two antenna sets may generate at least one directional beam for each antenna set, i.e., a total of at least two same directional beams at the same time. Furthermore, at least one antenna diversity and/or at least one antenna multiplexing may be formed by combining simultaneously or sequentially at least one directional beam for each antenna set (i.e., a total of at least two directional beams) through at least two antenna sets.

Figure 16:
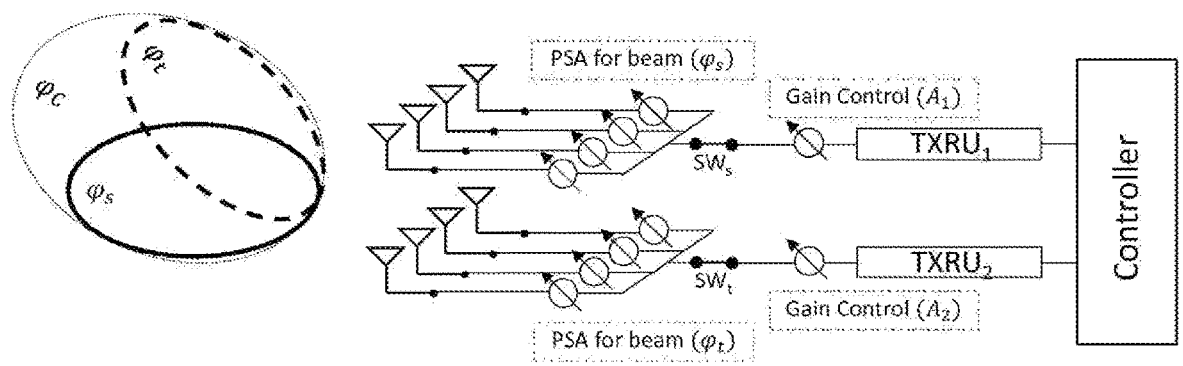

Referring to FIG. 16, two antenna sets may be formed in the antenna unit 21, and a total of two phase shifter arrays (PSAs) may be respectively connected to the two antenna sets. A total of two beams of a serving beam φs and a tracking beam φt oriented in different directions may be respectively generated for the two antenna sets through the total of two phase shifter arrays, and a composite beam φc may be formed from the serving beam φs and the tracking beam φt. Two transceiver units TXRU1,2 of the transceiver 23 operating based on a control operation of the controller 25 may be provided, and the total of two phase shifter arrays of the two antenna sets configured to respectively generate the serving beam φs and the tracking beam φt may be individually connected through corresponding gain controllers. The beam tracking apparatus according to an embodiment of the present disclosure may assign a serving beam and a tracking beam oriented in different directions to two transceiver units. For example, the serving beam may be assigned to a first transceiver unit, and the tracking beam may be assigned to a second transceiver unit. The beam tracking apparatus according to an embodiment of the present disclosure may be configured to maintain the serving beam and generate the tracking beam. As described above, at least two antenna sets may generate at least one directional beam for each antenna set, i.e., a total of at least two directional beams at the same time. Furthermore, at least one composite beam or at least one antenna multiplexing may be formed by combining simultaneously or sequentially at least one directional beam for each antenna set (i.e., a total of at least two directional beams) through at least two antenna sets.

Figure 17:
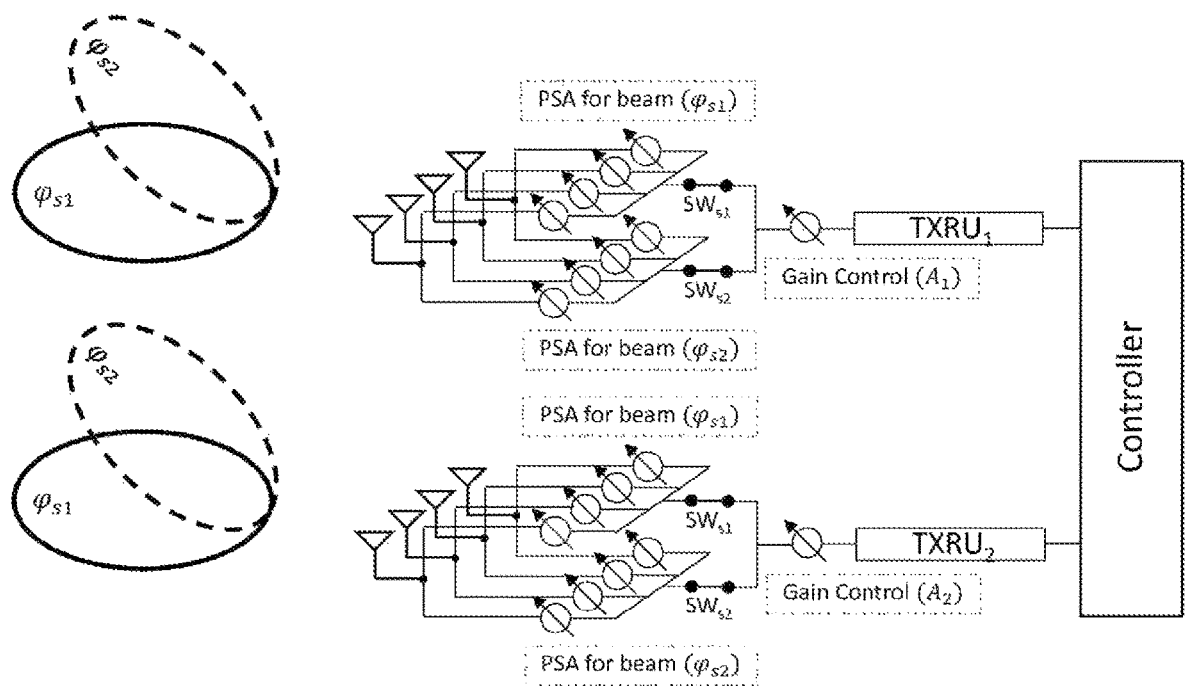

Referring to FIG. 17, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, the two antenna sets may be configured in the same way such that two different beams of a first serving beam φs1 and a second serving beam φs2 are generated for each antenna set. Two transceiver units TXRU1,2 of the transceiver 23 operating based on a control operation of the controller 25 may be provided, and the two phase shifter arrays connected to each antenna set may be connected to share through a corresponding gain controller. The beam tracking apparatus according to an embodiment of the present disclosure may assign a first serving beam and a second serving beam generated for each antenna set, i.e., a total of four serving beams to two transceiver units through two antenna sets. For example, a first serving beam and a second serving beam generated through a first antenna set may be assigned to a first transceiver unit, and a first serving beam and a second serving beam generated through a second antenna set may be assigned to a second transceiver unit. The beam tracking apparatus according to an embodiment of the present disclosure may be configured through the two antenna sets to maintain at least one of the first serving beam and the second serving beam for each antenna set (i.e., the total of four serving beams) and generate the at least one serving beam except for the maintained at least one serving beam. Furthermore, at least one composite beam may be generated from at least two different directional beams generated through an antenna set. Alternatively, at least one composite beam may be formed or at least one antenna multiplexing; at least one antenna diversity; and/or at least one beam diversity may be formed by combining simultaneously or sequentially at least two of at least one first serving beam and at least one second serving beam for each antenna set (i.e., a total of at least four serving beams) through at least two antenna sets.

Figure 18:
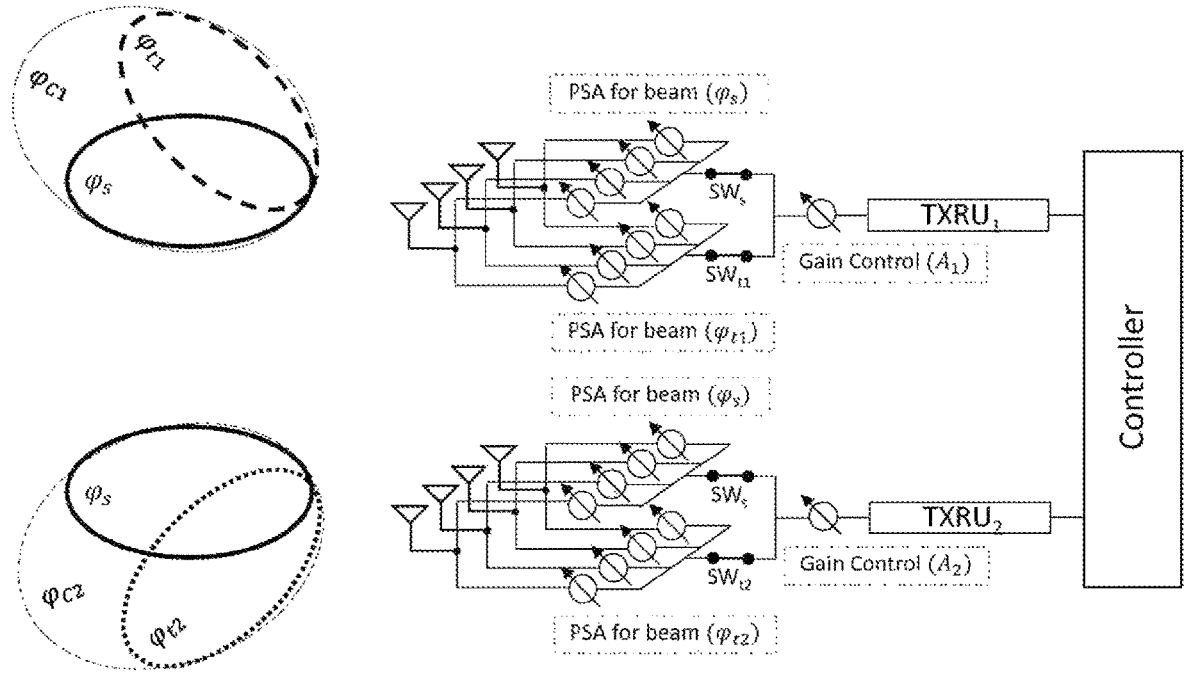

Referring to FIG. 18, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, each of the two antenna sets may generate one of serving beams φs oriented in the same direction and one of tracking beams φt1 and φt2 oriented in different directions, and two composite beams φc1 and φc2 may be formed from the serving beams and the tracking beams generated for the two antenna sets. That is, one serving beam and one tracking beam for each antenna set, and one composite beam generated from them are illustrated. Further, the two serving beams respectively generated through the two antenna sets have the same directionality, and the two tracking beams respectively generated through the two antenna sets have different directionalities. Two transceiver units TXRU1,2 of the transceiver 23 operating based on a control operation of the controller 25 may be provided, and the two phase shifter arrays connected to each antenna set may be connected to share through a corresponding gain controller. The beam tracking apparatus according to an embodiment of the present disclosure may assign a serving beam and a first tracking beam generated through a first antenna set or a first composite beam from them to a first transceiver unit, and assign a serving beam and a second tracking beam generated through a second antenna set or a second composite beam from them to a second transceiver unit. The beam tracking apparatus according to an embodiment of the present disclosure may be configured through the two antenna sets to maintain at least one of one serving beam for each antenna set (i.e., a total of two same serving beams) and generate the other serving beam except for the maintained at least one serving beam and at least one of one tracking beam for each antenna set (i.e., a total of two different tracking beams). Furthermore, at least one composite beam corresponding to a corresponding antenna set may be generated from at least one serving beam and at least one tracking beam generated through an antenna set. Alternatively, at least one composite beam may be formed or at least one antenna multiplexing and/or at least one antenna diversity may be formed by combining simultaneously or sequentially at least two of at least one serving beam and at least one tracking beam for each antenna set (i.e., a total of at least four directional beams) through at least two antenna sets.

Figure 19:
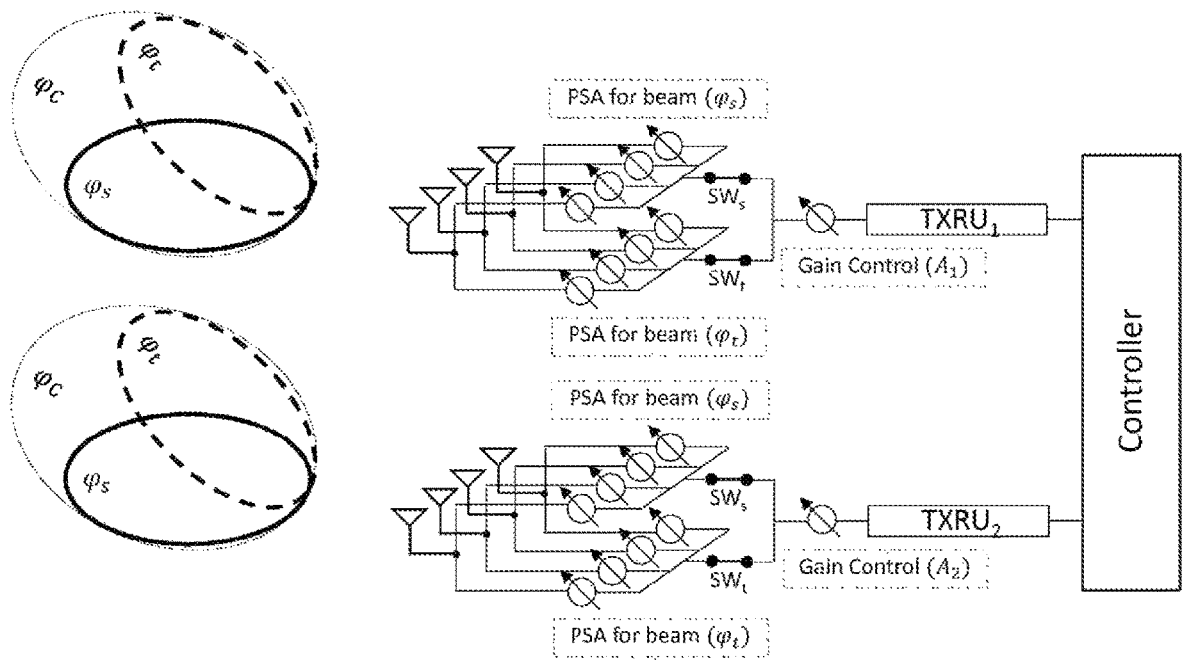

Referring to FIG. 19, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, each of the two antenna sets may generate one of serving beams φs oriented in the same direction and one of tracking beams φt oriented in the same direction, and two same composite beams (pc may be formed from the serving beam and the tracking beam generated for each antenna set. That is, one serving beam and one tracking beam for each antenna set, and one composite beam generated from them are illustrated. Further, the two serving beams respectively generated through the two antenna sets have the same directionality, and the two tracking beams respectively generated through the two antenna sets also have the same directionality. Two transceiver units TXRU1,2 of the transceiver 23 operating based on a control operation of the controller 25 may be provided, and the two phase shifter arrays connected to each antenna set may be connected to share through a corresponding gain controller. The beam tracking apparatus according to an embodiment of the present disclosure may assign a serving beam and a tracking beam generated through a first antenna set or a composite beam from them to a first transceiver unit, and assign a serving beam and a tracking beam generated through a second antenna set or a composite beam from them to a second transceiver unit. The beam tracking apparatus according to an embodiment of the present disclosure may be configured through the two antenna sets to maintain at least one of one serving beam for each antenna set (i.e., a total of two same serving beams) and generate the other serving beam except for the maintained at least one serving beam and at least one of one tracking beam for each antenna set (i.e., a total of two same tracking beams). Furthermore, at least one composite beam corresponding to a corresponding antenna set may be generated from at least one serving beam and at least one tracking beam generated through an antenna set. Alternatively, at least one composite beam may be formed or at least one antenna multiplexing and/or at least one antenna diversity may be formed by combining simultaneously or sequentially at least two of at least one serving beam and at least one tracking beam for each antenna set (i.e., a total of at least four directional beams) through at least two antenna sets.

Figure 20:
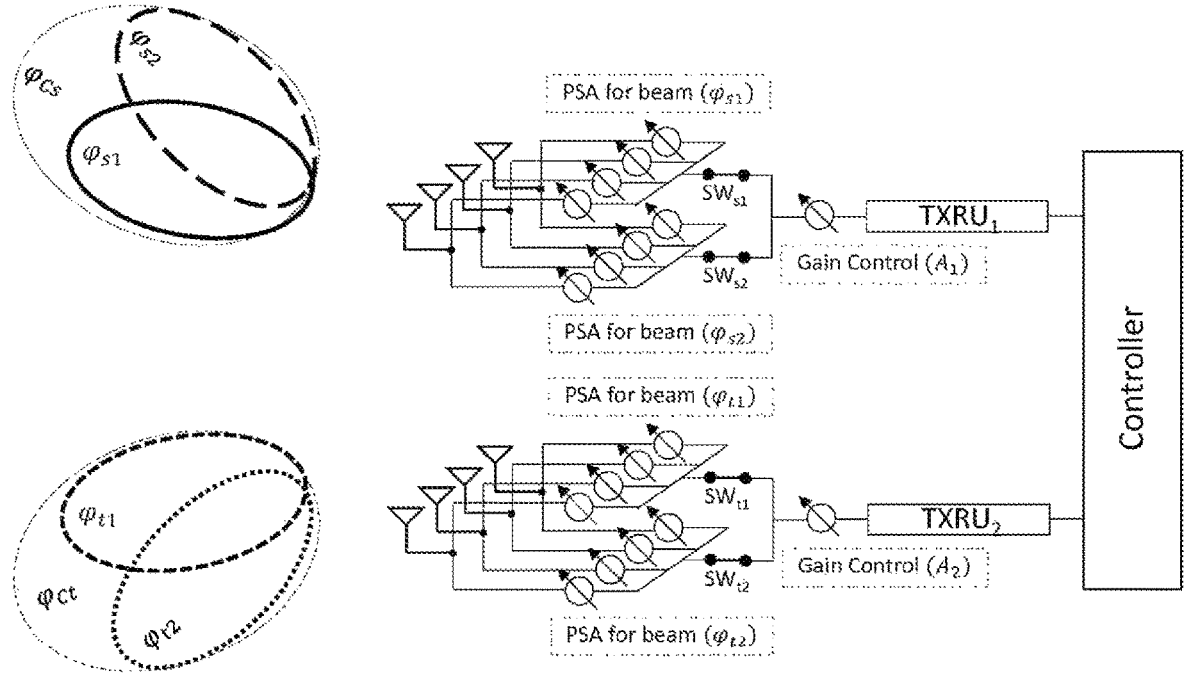

Referring to FIG. 20, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate different first and second serving beams φs1 and φs2 and form a composite beam yes from them, and a second antenna set may generate different first and second tracking beams φt1 and φt2 and form a composite beam φct from them. Two transceiver units TXRU1,2 of the transceiver 23 operating based on a control operation of the controller 25 may be provided, and the two phase shifter arrays connected to each antenna set may be connected to share through a corresponding gain controller. The beam tracking apparatus according to an embodiment of the present disclosure may assign a first serving beam and a second serving beam generated through a first antenna set or a composite beam from them to a first transceiver unit, and assign a first tracking beam and a second tracking beam generated through a second antenna set or a composite beam from them to a second transceiver unit. The beam tracking apparatus according to an embodiment of the present disclosure may be configured through the two antenna sets to maintain at least one of the first serving beam and the second serving beam of the first antenna set and generate the other serving beam except for the maintained at least one serving beam and at least one of the two different tracking beams of the second antenna set. Furthermore, at least one composite beam corresponding to a corresponding antenna set may be generated from at least one serving beam and at least one tracking beam generated through an antenna set. Alternatively, at least one composite beam may be formed or at least one antenna multiplexing; at least one antenna diversity; and/or at least one beam diversity may be formed by combining simultaneously or sequentially at least two of at least two serving beams or at least two tracking beams for each antenna set (i.e., a total of at least four directional beams) through at least two antenna sets.

Figure 21:
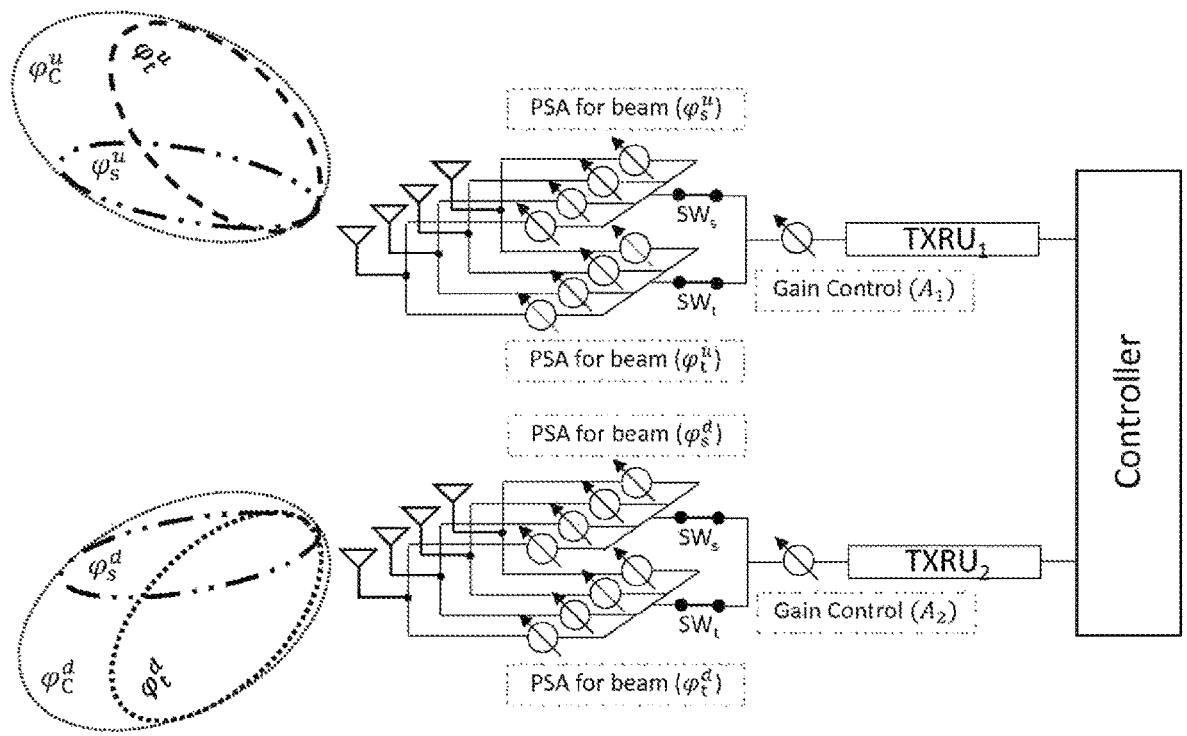

Referring to FIG. 21, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate an upper serving beam $\varphi_s^u$ and an upper tracking beam $\varphi_t^u$ and form an upper composite beam $\varphi_C^u$ from them, and a second antenna set may generate a lower serving beam $\varphi_n^d$ and a lower tracking beam $\varphi_t^d$ and form a lower composite beam $\varphi_C^d$ from them. Two transceiver units TXRU1,2 of the transceiver 23 operating based on a control operation of the controller 25 may be provided, and the two phase shifter arrays connected to each antenna set may be connected to share through a corresponding gain controller. The beam tracking apparatus according to an embodiment of the present disclosure may assign an upper serving beam and an upper tracking beam generated through a first antenna set or an upper composite beam from them to a first transceiver unit, and assign a lower serving beam and a lower tracking beam generated through a second antenna set or a lower composite beam from them to a second transceiver unit. The beam tracking apparatus according to an embodiment of the present disclosure may form at least one combination serving beam from at least two partial serving beams by combining the upper serving beam of the first antenna set and the lower serving beam of the second antenna set. In the same manner, the beam tracking apparatus may form at least one combination tracking beam from at least two partial tracking beams by combining the upper tracking beam and the lower tracking beam, or may form at least one combination composite beam from at least two partial composite beams by combining the upper composite beam and the lower composite beam. Furthermore, the beam tracking apparatus may be configured to maintain the combination serving beam generated through the two antenna sets and generate the combination tracking beam.

Figure 22:
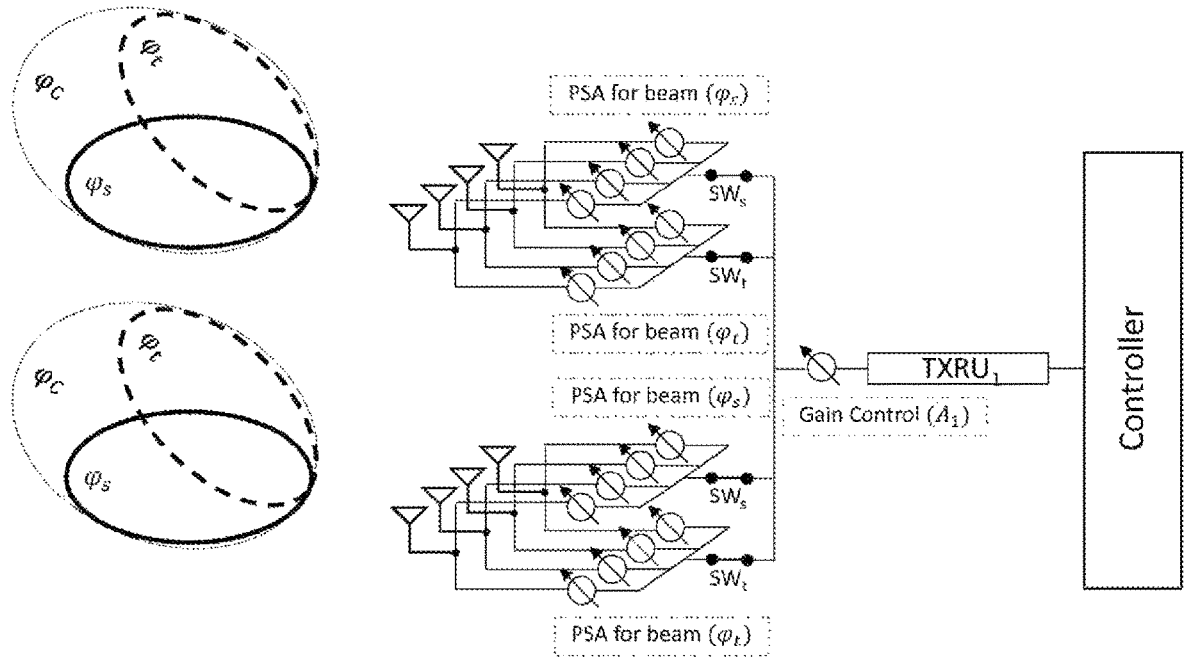

Referring to FIG. 22, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, each of the two antenna sets may generate one of serving beams φs oriented in the same direction and one of tracking beams φt oriented in the same direction, and two same composite beams (pc may be formed from the serving beam and the tracking beam generated for each antenna set. That is, one serving beam and one tracking beam for each antenna set, and one composite beam generated from them are illustrated. Further, the two serving beams respectively generated through the two antenna sets have the same directionality, and the two tracking beams respectively generated through the two antenna sets also have the same directionality. One transceiver unit TXRU1 of the transceiver 23 operating based on a control operation of the controller 25 may be provided, and the two phase shifter arrays for each antenna set, i.e., the total of four phase shifter arrays for the two antenna sets may be connected to share through a gain controller. The beam tracking apparatus according to an embodiment of the present disclosure may assign one same serving beam and one same tracking beam for each antenna set or a composite beam from them, i.e., two same serving beams and two same tracking beams for two antenna sets or two composite beams from them to one transceiver unit. The beam tracking apparatus according to an embodiment of the present disclosure may be configured through the two antenna sets to maintain at least one of one serving beam for each antenna set (i.e., a total of two same serving beams) and generate the at least one same serving beam except for the maintained at least one serving beam and at least one of one tracking beam for each antenna set (i.e., a total of two same tracking beams). Furthermore, at least one composite beam corresponding to a corresponding antenna set may be generated from at least one serving beam and at least one tracking beam generated through an antenna set. Alternatively, at least one composite beam may be formed or at least one antenna diversity may be formed from at least two of at least two same serving beams and at least two same tracking beams (i.e., a total of at least four directional beams) generated through at least two antenna sets.

Figure 23:
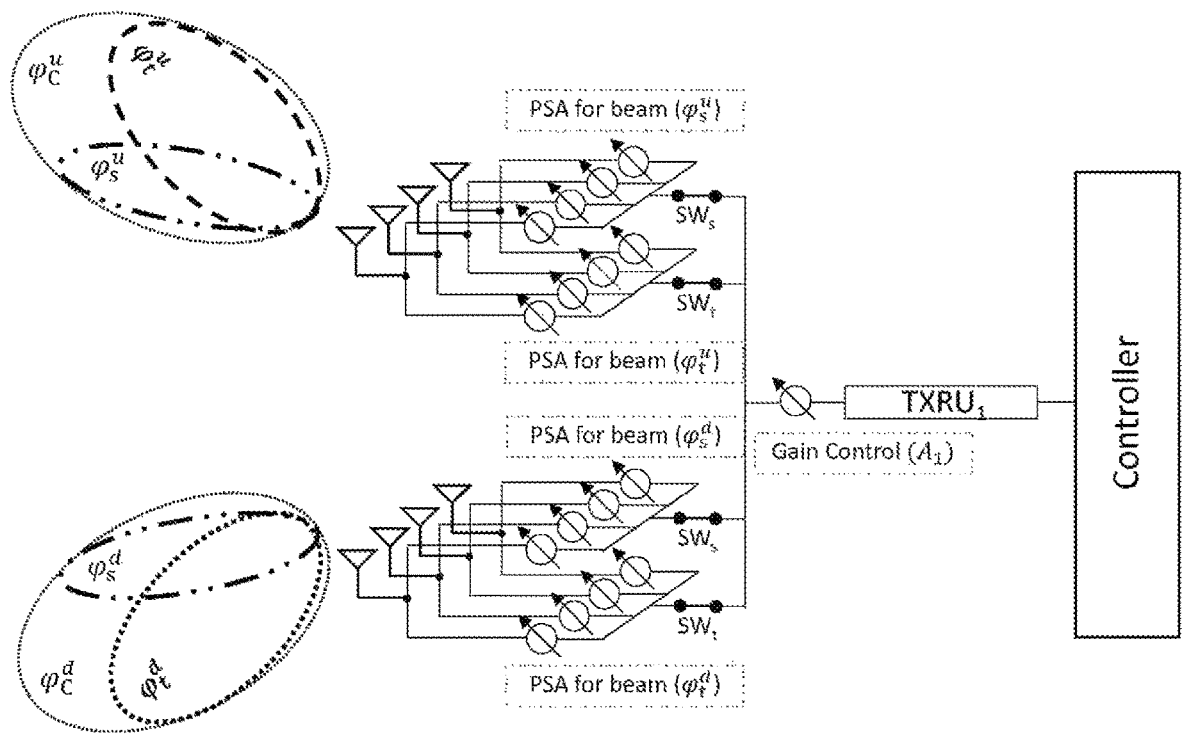

Referring to FIG. 23, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate an upper serving beam $\varphi_s^u$ and an upper tracking beam $\varphi_t^u$ and form an upper composite beam $\varphi_C^u$ from them, and a second antenna set may generate a lower serving beam $\varphi_n^d$ and a lower tracking beam $\varphi_t^d$ and form a lower composite beam $\varphi_C^d$ from them. One transceiver unit TXRU1 of the transceiver 23 operating based on a control operation of the controller 25 may be provided, and the two phase shifter arrays for each antenna set, i.e., the total of four phase shifter arrays for the two antenna sets may be connected to share through a gain controller. The beam tracking apparatus according to an embodiment of the present disclosure may form at least one combination serving beam from at least two partial serving beams by combining an upper serving beam of a first antenna set and a lower serving beam of a second antenna set. In the same manner, the beam tracking apparatus may form at least one combination tracking beam from at least two partial tracking beams by combining an upper tracking beam and a lower tracking beam, or may form at least one combination composite beam from at least two partial composite beams by combining an upper composite beam and a lower composite beam. Furthermore, the beam tracking apparatus may be configured to maintain the combination serving beam generated through the two antenna sets and generate the combination tracking beam at the same time.

Figure 24:
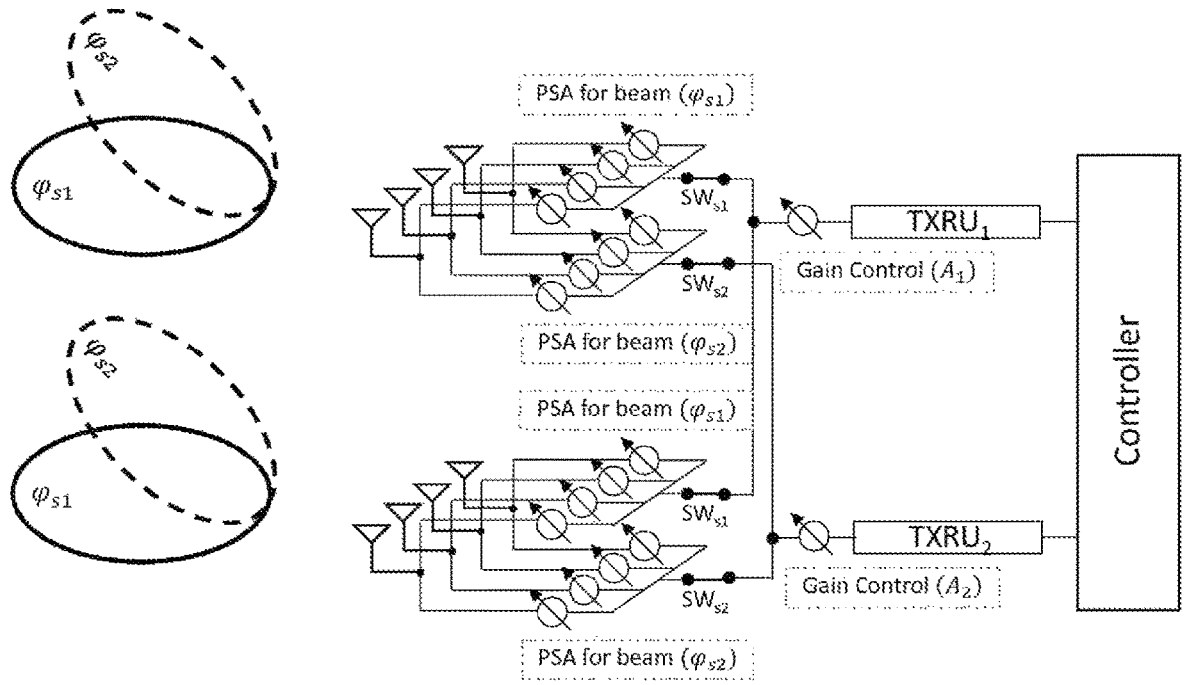

Referring to FIG. 24, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, the two antenna sets may be configured in the same way such that two different beams of a first serving beam φs1 and a second serving beam φs2 are generated for each antenna set. Two transceiver units TXRU1,2 of the transceiver 23 operating based on a control operation of the controller 25 may be provided, and the two phase shifter arrays exclusively selected for each antenna set with respect to the two antenna sets may be connected to share through a corresponding gain controller. That is, one phase shifter array connected to a first antenna set and one phase shifter array connected to a second antenna set may be selected to form a pair, and the two phase shifter arrays constituting the pair may be connected to a first transceiver unit to share. Further, other phase shifter array connected to the first antenna set and other phase shifter array connected to the second antenna set may be selected to form another pair, and the two phase shifter arrays constituting the pair may be connected to a second transceiver unit to share. The beam tracking apparatus according to an embodiment of the present disclosure may assign one same first serving beam for each antenna set, i.e., two same first serving beams for the two antenna sets to the first transceiver unit, and assign one same second serving beam for each antenna set, i.e., two same second serving beams for the two antenna sets to the second transceiver unit. The beam tracking apparatus according to an embodiment of the present disclosure may be configured through the two antenna sets to maintain at least one of a first serving beam and a second serving beam for each antenna set (i.e., a total of four serving beams) and generate the at least one serving beam except for the maintained at least one serving beam. Furthermore, at least one composite beam may be generated from at least two different directional beams generated through an antenna set. Alternatively, at least one composite beam may be formed or at least one antenna diversity; at least one beam multiplexing; and/or at least one beam diversity may be formed by combining simultaneously or sequentially at least two of at least one first serving beam and at least one second serving beam for each antenna set (i.e., a total of at least four directional beams) through at least two antenna sets.

Figure 25:
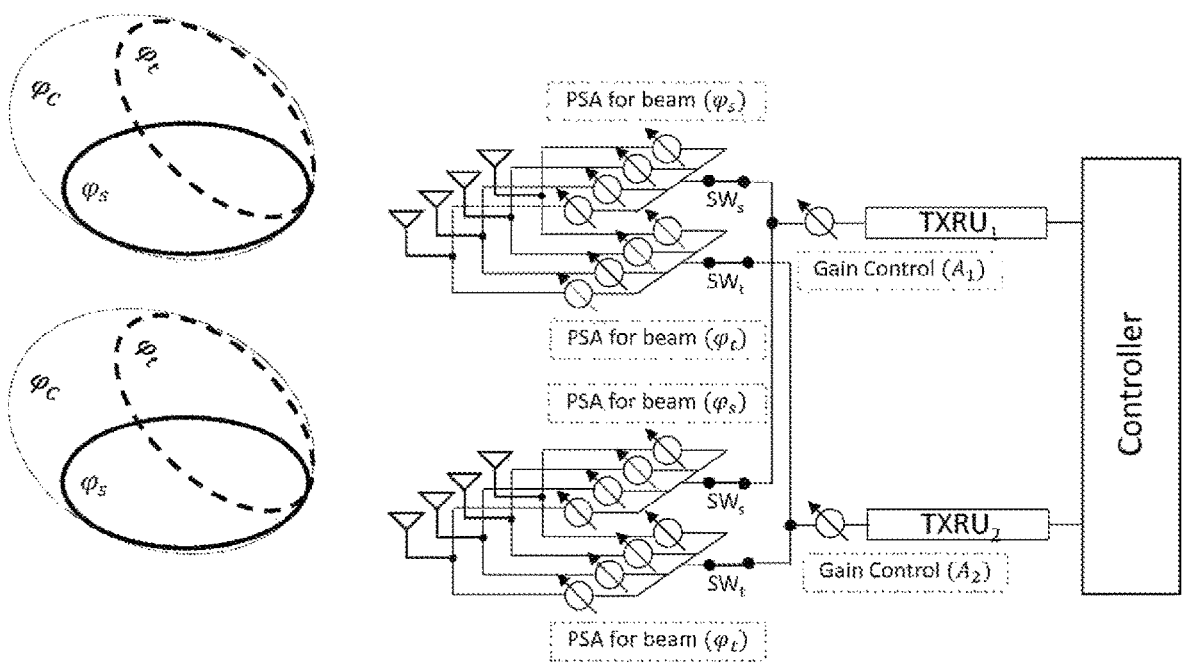

Referring to FIG. 25, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, each of the two antenna sets may generate one of serving beams φs oriented in the same direction and one of tracking beams φt oriented in the same direction, and two same composite beams (pc may be formed from the serving beam and the tracking beam generated for each antenna set. That is, one serving beam and one tracking beam for each antenna set, and one composite beam generated from them are illustrated. Further, the two serving beams respectively generated through the two antenna sets have the same directionality, and the two tracking beams respectively generated through the two antenna sets also have the same directionality. Two transceiver units TXRU1,2 of the transceiver 23 operating based on a control operation of the controller 25 may be provided, and the two phase shifter arrays exclusively selected for each antenna set with respect to the two antenna sets may be connected to share through a corresponding gain controller. The beam tracking apparatus according to an embodiment of the present disclosure may assign one same serving beam for each antenna set, i.e., two same serving beams for the two antenna sets to a first transceiver unit, and assign one same tracking beam for each antenna set, i.e., two same tracking beams for the two antenna sets to a second transceiver unit. The beam tracking apparatus according to an embodiment of the present disclosure may be configured through the two antenna sets to maintain at least one of one serving beam for each antenna set (i.e., a total of two same serving beams) and generate the other serving beam except for the maintained at least one serving beam and at least one of one tracking beam for each antenna set (i.e., a total of two same tracking beams). Furthermore, at least one composite beam corresponding to a corresponding antenna set may be generated from at least one serving beam and at least one tracking beam generated through an antenna set. Alternatively, at least one composite beam may be formed or at least one antenna diversity; at least one beam multiplexing; and/or at least one beam diversity may be formed by combining simultaneously or sequentially at least two of at least one serving beam and at least one tracking beam for each antenna set (i.e., a total of at least four directional beams) through at least two antenna sets.

Figure 26:
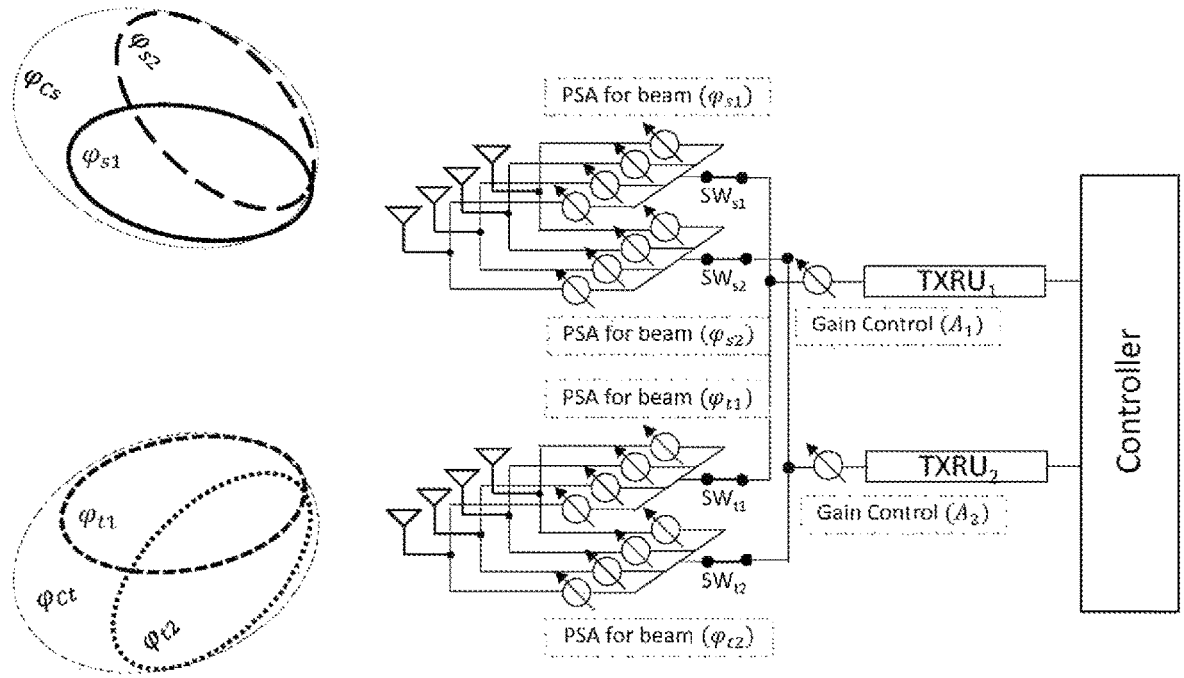

Referring to FIG. 26, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate different first and second serving beams φs1 and φs2 and form a composite beam yes from them, and a second antenna set may generate different first and second tracking beams φt1 and φt2 and form a composite beam φct from them. Two transceiver units TXRU1,2 of the transceiver 23 operating based on a control operation of the controller 25 may be provided, and the two phase shifter arrays exclusively selected for each antenna set with respect to the two antenna sets may be connected to share through a corresponding gain controller. The beam tracking apparatus according to an embodiment of the present disclosure may assign a first serving beam generated through a first antenna set and a first tracking beam generated through a second antenna set or a composite beam from them to a first transceiver unit, and assign a second serving beam generated through the first antenna set and a second tracking beam generated through the second antenna set or a composite beam from them to a second transceiver unit. The beam tracking apparatus according to an embodiment of the present disclosure may be configured through the two antenna sets to maintain at least one of the first serving beam and the second serving beam of the first antenna set and generate the other serving beam except for the maintained at least one serving beam and at least one of the two different tracking beams of the second antenna set. Furthermore, at least one composite beam corresponding to a corresponding antenna set may be generated from at least one serving beam and at least one tracking beam generated through an antenna set. Alternatively, at least one composite beam may be formed or at least one antenna diversity; at least one beam multiplexing; and/or at least one beam diversity may be formed by combining simultaneously or sequentially at least two of at least two serving beams or at least two tracking beams for each antenna set (i.e., a total of at least four directional beams) through at least two antenna sets.

Figure 27:
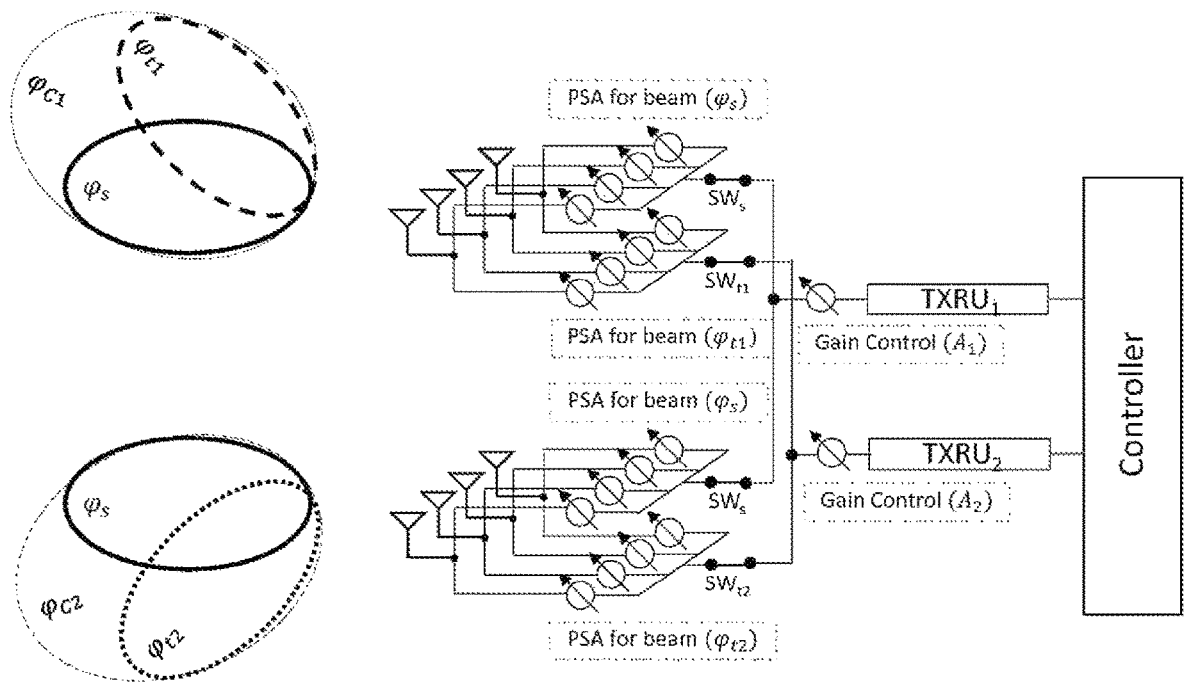

Referring to FIG. 27, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, each of the two antenna sets may generate one of serving beams φs oriented in the same direction and one of tracking beams φt1 and φt2 oriented in different directions, and two composite beams φc1 and φc2 may be formed from the serving beams and the tracking beams generated for the two antenna sets. That is, one serving beam and one tracking beam for each antenna set, and one composite beam generated from them are illustrated. Further, the two serving beams respectively generated through the two antenna sets have the same directionality, and the two tracking beams respectively generated through the two antenna sets have different directionalities. Two transceiver units TXRU1,2 of the transceiver 23 operating based on a control operation of the controller 25 may be provided, and the two phase shifter arrays exclusively selected for each antenna set with respect to the two antenna sets may be connected to share through a corresponding gain controller. The beam tracking apparatus according to an embodiment of the present disclosure may assign the same serving beams respectively generated through a first antenna set and a second antenna set, i.e., the two same serving beams from the two antenna sets to a first transceiver unit, and assign different tracking beams respectively generated through the first antenna set and the second antenna set, i.e., the two different tracking beams from the two antenna sets to a second transceiver unit. The beam tracking apparatus according to an embodiment of the present disclosure may be configured through the two antenna sets to maintain at least one of one serving beam for each antenna set (i.e., a total of two same serving beams) and generate the other serving beam except for the maintained at least one serving beam and at least one of one tracking beam for each antenna set (i.e., a total of two different tracking beams). Furthermore, at least one composite beam corresponding to a corresponding antenna set may be generated from at least one serving beam and at least one tracking beam generated through an antenna set. Alternatively, at least one composite beam may be formed or at least one antenna diversity; at least one beam multiplexing; and/or at least one beam diversity may be formed by combining simultaneously or sequentially at least two of at least one serving beam and at least one tracking beam for each antenna set (i.e., a total of at least four directional beams) through at least two antenna sets.

Figure 28:
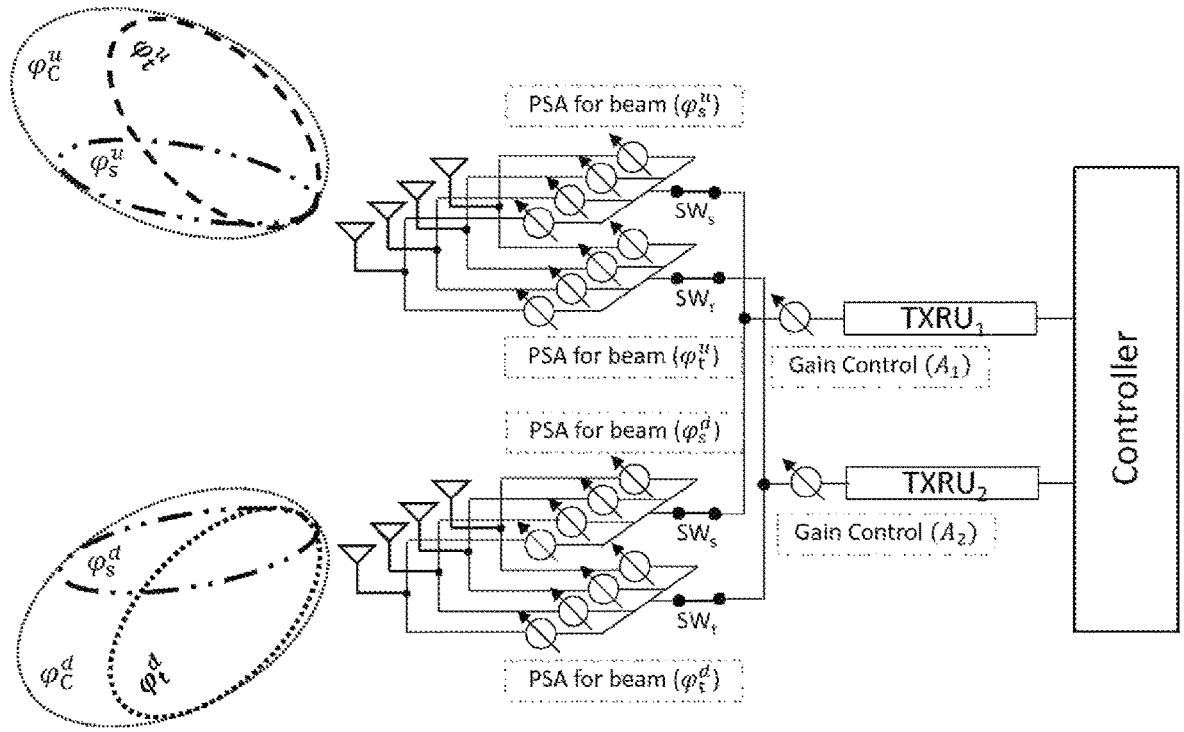

Referring to FIG. 28, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate an upper serving beam $\varphi_s^u$ and an upper tracking beam $\varphi_t^u$ and form an upper composite beam $\varphi_C^u$ from them, and a second antenna set may generate a lower serving beam $\varphi_n^d$ and a lower tracking beam $\varphi_t^d$ and form a lower composite beam $\varphi_C^d$ from them. Two transceiver units TXRU1,2 of the transceiver 23 operating based on a control operation of the controller 25 may be provided, and the two phase shifter arrays exclusively selected for each antenna set with respect to the two antenna sets may be connected to share through a corresponding gain controller. The beam tracking apparatus according to an embodiment of the present disclosure may assign an upper serving beam and a lower serving beam to a first transceiver unit and assign an upper tracking beam and a lower tracking beam to a second transceiver unit, with respect to the two antenna sets. The beam tracking apparatus according to an embodiment of the present disclosure may form at least one combination serving beam from at least two partial serving beams by combining the upper serving beam of the first antenna set and the lower serving beam of the second antenna set. In the same manner, the beam tracking apparatus may form at least one combination tracking beam from at least two partial tracking beams by combining the upper tracking beam and the lower tracking beam, or may form at least one combination composite beam from at least two partial composite beams by combining the upper composite beam and the lower composite beam. Furthermore, the beam tracking apparatus may be configured to maintain the combination serving beam generated through the two antenna sets and generate the combination tracking beam.

Figure 29:
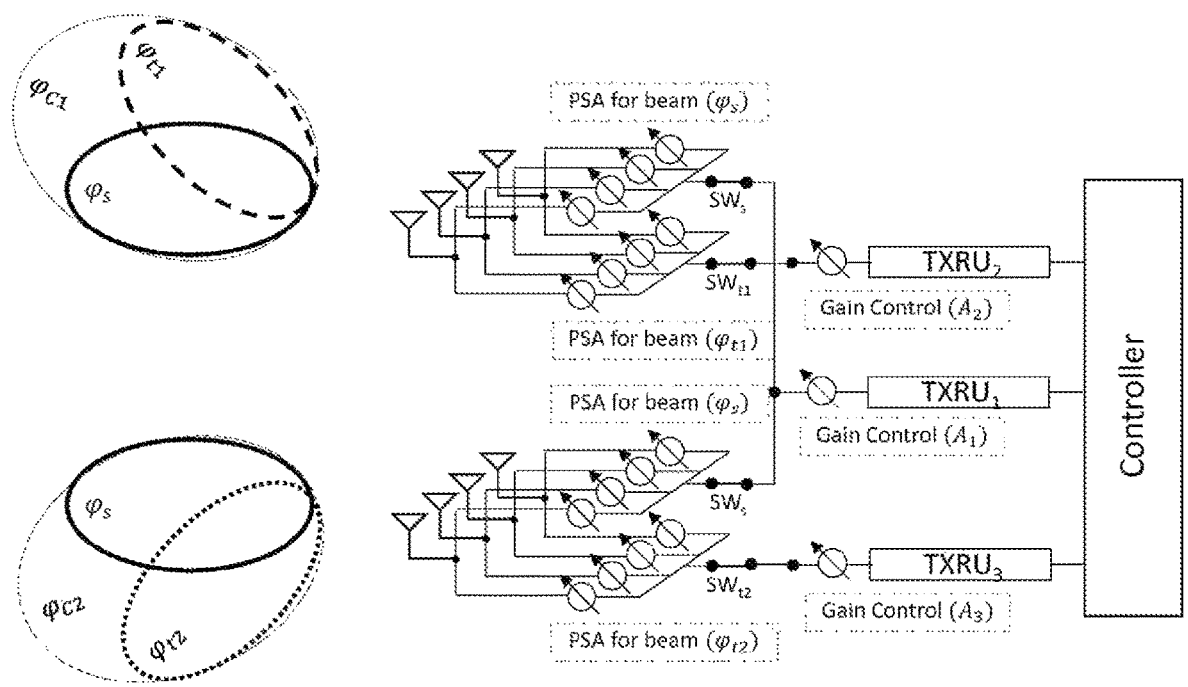

Referring to FIG. 29, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, each of the two antenna sets may generate one of serving beams φs oriented in the same direction and one of tracking beams φt1 and φt2 oriented in different directions, and two composite beams φc1 and φc2 may be formed from the serving beams and the tracking beams generated for the two antenna sets. That is, one serving beam and one tracking beam for each antenna set, and one composite beam generated from them are illustrated. Further, the two serving beams respectively generated through the two antenna sets have the same directionality, and the two tracking beams respectively generated through the two antenna sets have different directionalities. Three transceiver units TXRU1,2,3 of the transceiver 23 operating based on a control operation of the controller 25 may be provided. Two phase shifter arrays (phase shifter arrays for generating the serving beams) for an antenna set selected from among the two antenna sets may be connected to share a first transceiver unit through a corresponding gain controller, and a total of two phase shifter arrays (phase shifter arrays for generating the first tracking beam and the second tracking beam) for other antenna set selected from among the two antenna sets may be individually connected to two remaining transceiver units (second and third transceiver units) through corresponding gain controllers. The beam tracking apparatus according to an embodiment of the present disclosure may assign one same serving beam for each antenna set, i.e., the two same serving beams for the two antenna sets to the first transceiver unit, and respectively assign one different tracking beam for each antenna set, i.e., two different tracking beams for the two antenna sets to the second transceiver unit and the third transceiver unit. The beam tracking apparatus according to an embodiment of the present disclosure may be configured through the two antenna sets to maintain at least one of one serving beam for each antenna set (i.e., a total of two same serving beams) and generate the other serving beam except for the maintained at least one serving beam and at least one of one tracking beam for each antenna set (i.e., a total of two different tracking beams). Furthermore, at least one composite beam corresponding to a corresponding antenna set may be generated from at least one serving beam and at least one tracking beam generated through an antenna set. Alternatively, at least one composite beam may be formed or at least one antenna diversity; at least one antenna multiplexing; and/or at least one beam diversity may be formed by combining simultaneously or sequentially at least two of at least one serving beam and at least one tracking beam for each antenna set (i.e., a total of at least four directional beams) through at least two antenna sets.

Referring to FIG. 30, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate different first and second serving beams φs1 and φs2 and form a composite beam yes from them, and a second antenna set may generate different first and second tracking beams φt1 and φt2 and form a composite beam φct from them. Three transceiver units TXRU1,2,3 of the transceiver 23 operating based on a control operation of the controller 25 may be provided. Two phase shifter arrays (phase shifter arrays for generating the first serving beam and the first tracking beam) for an antenna set selected from among the two antenna sets may be connected to share a first transceiver unit through a corresponding gain controller, and a total of two phase shifter arrays (phase shifter arrays for generating the second serving beam and the second tracking beam) for other antenna set selected from among the two antenna sets may be individually connected to two remaining transceiver units (second and third transceiver units) through corresponding gain controllers. The beam tracking apparatus according to an embodiment of the present disclosure may respectively select the first serving beam and the first tracking beam from the two antenna sets to assign the first serving beam and the first tracking beam from the two antenna sets to the first transceiver unit, and respectively assign the second serving beam of the first antenna set and the second tracking beam of the second antenna set to the second transceiver unit and the third transceiver unit. The beam tracking apparatus according to an embodiment of the present disclosure may be configured through the two antenna sets to maintain at least one of the first serving beam and the second serving beam of the first antenna set and generate the other serving beam except for the maintained at least one serving beam and at least one of the two different tracking beams of the second antenna set. Furthermore, at least one composite beam corresponding to a corresponding antenna set may be generated from at least one serving beam and at least one tracking beam generated through an antenna set. Alternatively, at least one composite beam may be formed or at least one antenna diversity; at least one antenna multiplexing; at least one beam multiplexing; and/or at least one beam diversity may be formed by combining simultaneously or sequentially at least two of at least two serving beams or at least two tracking beams for each antenna set (i.e., a total of at least four directional beams) through at least two antenna sets.

Referring to FIG. 31, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate an upper serving beam $\varphi_s^u$ and an upper tracking beam $\varphi_t^u$ and form an upper composite beam $\varphi_C^u$ from them, and a second antenna set may generate a lower serving beam $\varphi_n^d$ and a lower tracking beam $\varphi_t^d$ and form a lower composite beam $\varphi_C^d$ from them. Three transceiver units TXRUs,1,2 of the transceiver 23 operating based on a control operation of the controller 25 may be provided. Two phase shifter arrays (phase shifter arrays for generating the upper serving beam and the lower serving beam) for an antenna set selected from among the two antenna sets may be connected to share a serving transceiver unit TXRUs through a corresponding gain controller, and a total of two phase shifter arrays (phase shifter arrays for generating the upper tracking beam and the lower tracking beam) for other antenna set selected from among the two antenna sets may be individually connected to two remaining transceiver units (first and second transceiver units) through corresponding gain controllers. The beam tracking apparatus according to an embodiment of the present disclosure may form at least one combination serving beam from at least two partial serving beams by combining the upper serving beam of the first antenna set and the lower serving beam of the second antenna set, form at least one combination tracking beam from at least two partial tracking beams by combining the upper tracking beam and the lower tracking beam, generate at least one combination composite beam from at least two partial composite beams by combining at least one upper composite beam and at least one lower composite beam, or form at least one combination composite beam by combining at least one combination serving beam and at least one combination tracking beam.

Referring to FIG. 32, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate different first and second serving beams φs1 and φs2 and form a composite beam yes from them, and a second antenna set may generate different first and second tracking beams φt1 and φt2 and form a composite beam φct from them. Three transceiver units TXRU1,2,3 of the transceiver 23 operating based on a control operation of the controller 25 may be provided. Two phase shifter arrays (phase shifter arrays for generating the first serving beam and the second serving beam) of the first antenna set may be connected to share a first transceiver unit through a corresponding gain controller, and two phase shifter arrays (phase shifter arrays for generating the first tracking beam and the second tracking beam) of the second antenna set may be individually connected to two remaining transceiver units (second and third transceiver units) through corresponding gain controllers. The beam tracking apparatus according to an embodiment of the present disclosure may assign the first serving beam and the second serving beam of the first antenna set to the first transceiver unit and respectively assign the first tracking beam and the second tracking beam of the second antenna set to the second transceiver unit and the third transceiver unit. The beam tracking apparatus according to an embodiment of the present disclosure may be configured through the two antenna sets to maintain at least one of the first serving beam and the second serving beam of the first antenna set and generate the other serving beam except for the maintained at least one serving beam and at least one of the two different tracking beams of the second antenna set. Furthermore, at least one composite beam corresponding to a corresponding antenna set may be generated from at least one serving beam and at least one tracking beam generated through an antenna set. Alternatively, at least one composite beam may be formed or at least one antenna diversity; at least one antenna multiplexing; at least one beam multiplexing; and/or at least one beam diversity may be formed by combining simultaneously or sequentially at least two of at least two serving beams or at least two tracking beams for each antenna set (i.e., a total of at least four directional beams) through at least two antenna sets.

Referring to FIG. 33, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate different first and second serving beams φs1 and φs2 and form a composite beam yes from them, and a second antenna set may generate different first and second tracking beams φt1 and φt2 and form a composite beam φct from them. Four transceiver units TXRU1,2,3,4 of the transceiver 23 operating based on a control operation of the controller 25 may be provided. Four phase shifter arrays configured to generate four directional beams (a first serving beam, a second serving beam, a first tracking beam, and a second tracking beam) from two antenna sets may be individually connected to four transceiver units through corresponding gain controllers. The beam tracking apparatus according to an embodiment of the present disclosure may individually assign four independent directional beams (a first serving beam, a second serving beam, a first tracking beam, and a second tracking beam) generated through two antenna sets to four transceiver units (a first transceiver unit, a second transceiver unit, a third transceiver unit, and a fourth transceiver unit), respectively. The beam tracking apparatus according to an embodiment of the present disclosure may be configured through the two antenna sets to maintain at least one of the first serving beam and the second serving beam of the first antenna set and generate the other serving beam except for the maintained at least one serving beam and at least one of the two different tracking beams of the second antenna set. Furthermore, at least one composite beam corresponding to a corresponding antenna set may be generated from at least one serving beam and at least one tracking beam generated through an antenna set. Alternatively, at least one composite beam may be formed or at least one antenna diversity; at least one antenna multiplexing; at least one beam multiplexing; and/or at least one beam diversity may be formed by combining simultaneously or sequentially at least two of at least two serving beams or at least two tracking beams for each antenna set (i.e., a total of at least four directional beams) through at least two antenna sets.

Referring to FIG. 34, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, each of the two antenna sets may generate one of serving beams φs oriented in the same direction and one of tracking beams φt1 and φt2 oriented in different directions, and two composite beams φc1 and φc2 may be formed from the serving beams and the tracking beams generated for the two antenna sets. That is, one serving beam and one tracking beam for each antenna set, and one composite beam generated from them are illustrated. Further, the two serving beams respectively generated through the two antenna sets have the same directionality, and the two tracking beams respectively generated through the two antenna sets have different directionalities. Four transceiver units TXRU1,2, 3,4 of the transceiver 23 operating based on a control operation of the controller 25 may be provided. Four phase shifter arrays configured to generate four directional beams (a serving beam of a first antenna set, a serving beam of a second antenna set, a first tracking beam, and a second tracking beam) from two antenna sets may be individually connected to four transceiver units through corresponding gain controllers. The beam tracking apparatus according to an embodiment of the present disclosure may individually assign four directional beams (a serving beam of a first antenna set, a serving beam of a second antenna set, a first tracking beam, and a second tracking beam) generated through two antenna sets to four transceiver units (a first transceiver unit, a second transceiver unit, a third transceiver unit, and a fourth transceiver unit), respectively. The beam tracking apparatus according to an embodiment of the present disclosure may be configured through the two antenna sets to maintain at least one of one serving beam for each antenna set (i.e., a total of two serving beams) and generate the other serving beam except for the maintained at least one serving beam and at least one of one tracking beam for each antenna set (i.e., a total of two different tracking beams). Furthermore, at least one composite beam corresponding to a corresponding antenna set may be generated from at least one serving beam and at least one tracking beam generated through an antenna set. Alternatively, at least one composite beam may be formed or at least one antenna diversity; at least one antenna multiplexing; at least one beam multiplexing; and/or at least one beam diversity may be formed by combining simultaneously or sequentially at least two of at least one serving beam or at least one tracking beam for each antenna set (i.e., a total of at least four directional beams) through at least two antenna sets.

Referring to FIG. 35, two antenna sets may be formed in the antenna unit 21, and two phase shifter arrays (PSAs) for each antenna set, i.e., a total of four phase shifter arrays may be connected to the two antenna sets. Through the two phase shifter arrays for each antenna set, i.e., the total of four phase shifter arrays, a first antenna set among the two antenna sets may generate an upper serving beam $\varphi_s^u$ and an upper tracking beam $\varphi_t^u$ and form an upper composite beam $\varphi_C^u$ from them, and a second antenna set may generate a lower serving beam $\varphi_n^d$ and a lower tracking beam $\varphi_t^d$ and form a lower composite beam $\varphi_C^d$ from them. Four transceiver units TXRU1,2,3,4 of the transceiver 23 operating based on a control operation of the controller 25 may be provided. Four phase shifter arrays configured to generate four directional beams (an upper serving beam, a lower serving beam, an upper tracking beam, and a lower tracking beam) from two antenna sets may be individually connected to four transceiver units through corresponding gain controllers. The beam tracking apparatus according to an embodiment of the present disclosure may individually assign four partial directional beams (an upper serving beam, a lower serving beam, an upper tracking beam, and a lower tracking beam) generated through two antenna sets to four transceiver units (a first transceiver unit, a second transceiver unit, a third transceiver unit, and a fourth transceiver unit), respectively. The beam tracking apparatus according to an embodiment of the present disclosure may form at least one combination serving beam from at least two partial serving beams by combining the upper serving beam of the first antenna set and the lower serving beam of the second antenna set. In the same manner, the beam tracking apparatus may form at least one combination tracking beam from at least two partial tracking beams by combining the upper tracking beam and the lower tracking beam, or may form at least one combination composite beam from at least two partial composite beams by combining the upper composite beam and the lower composite beam. Furthermore, the beam tracking apparatus may be configured to maintain the combination serving beam generated through the two antenna sets and generate the combination tracking beam.

Figure 36:
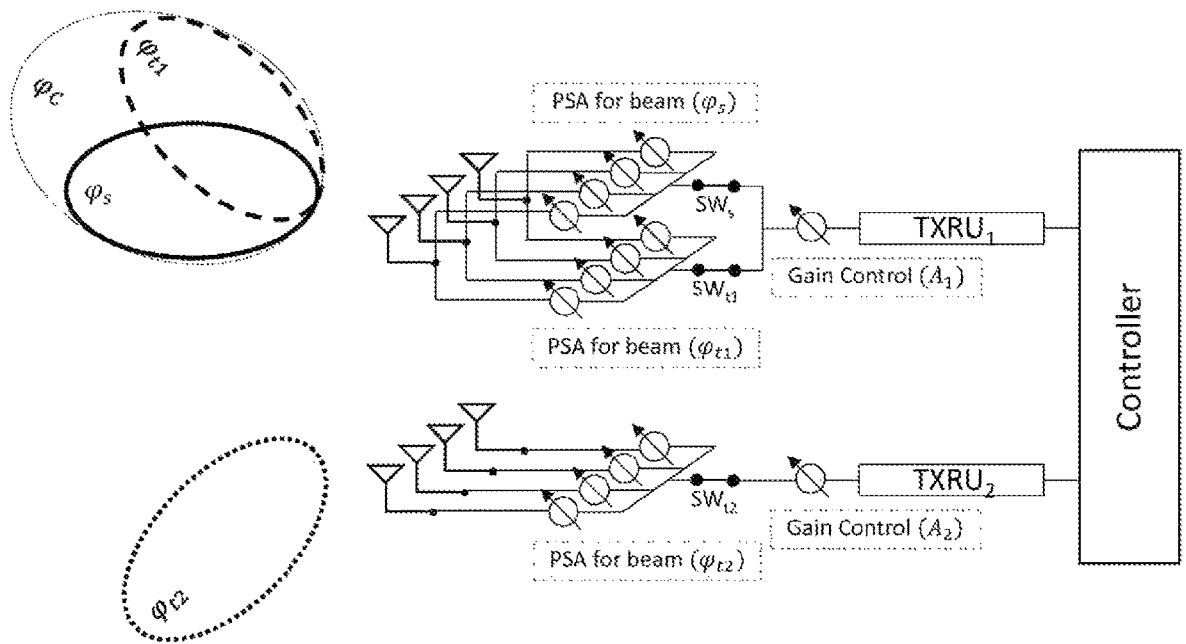

Referring to FIG. 36, two antenna sets may be formed in the antenna unit 21. In this case, two phase shifter arrays (PSAs) may be connected to one antenna set, and one phase shifter array may be connected to the other antenna set. Further, a serving beam φs and a first tracking beam φt1 may be generated through a first antenna set, and a composite beam φc may be formed from them, and a second tracking beam φt2 may be generated through a second antenna set. Two transceiver units TXRU1,2 of the transceiver 23 operating based on a control operation of the controller 25 may be provided. Two phase shifter arrays generating the serving beam and the first tracking beam through the first antenna set may be connected to share a first transceiver unit through a corresponding gain controller, and a phase shifter array of the second antenna set generating the remaining one tracking beam may be individually connected to a second transceiver unit through a corresponding gain controller. The beam tracking apparatus according to an embodiment of the present disclosure may assign the serving beam and the first tracking beam generated through the first antenna set to the first transceiver unit and assign the second tracking beam generated through the second antenna set to the second transceiver unit. The beam tracking apparatus according to an embodiment of the present disclosure may be configured through the two antenna sets to maintain the serving beam generated through the first antenna set and generate at least one of the remaining two tracking beams. Furthermore, at least one composite beam corresponding to a corresponding antenna set may be formed by combining at least two different directional beams generated through an antenna set. Alternatively, at least one composite beam may be formed or at least one antenna diversity; at least one antenna multiplexing; at least one beam multiplexing; and/or at least one beam diversity may be formed by combining simultaneously or sequentially at least two of at least three directional beams generated through at least two antenna sets.

Figure 37:
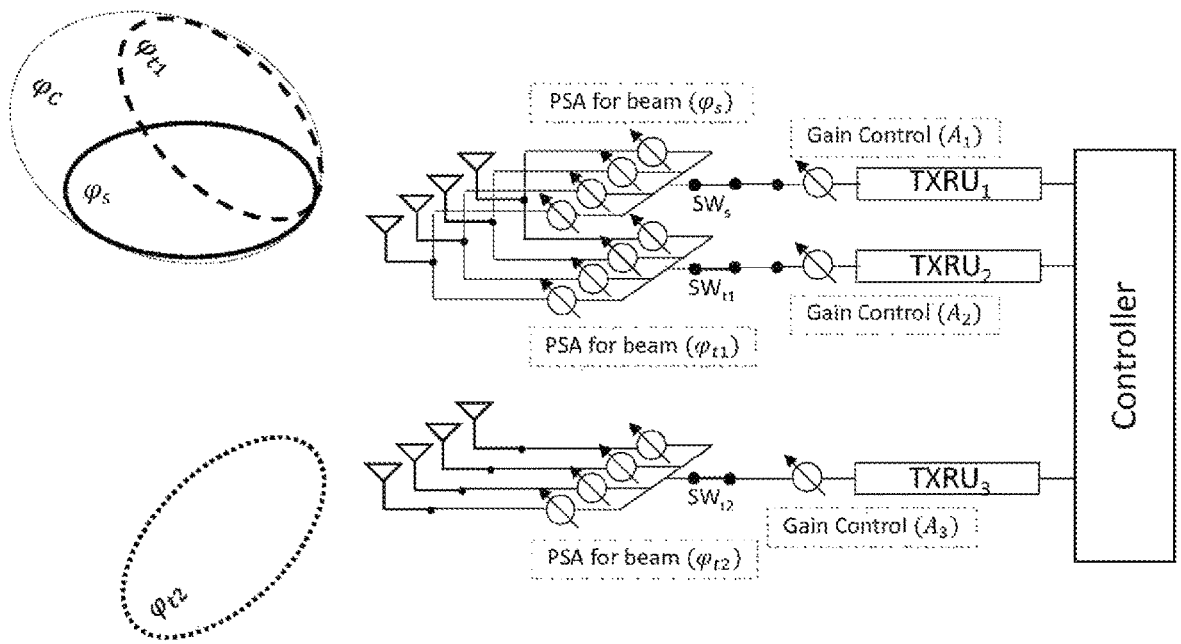

Referring to FIG. 37, two antenna sets may be formed in the antenna unit 21. In this case, two phase shifter arrays (PSA2) may be connected to one antenna set, and one phase shifter array may be connected to the other antenna set. Further, a serving beam φs and a first tracking beam (01 may be generated through a first antenna set, and a composite beam φc may be formed from them, and a second tracking beam φt2 may be generated through a second antenna set. Three transceiver units TXRU1,2,3 of the transceiver 23 operating based on a control operation of the controller 25 may be provided. Three phase shifter arrays respectively generating the serving beam, the first tracking beam, and the second tracking beam through the two antenna sets may be individually connected to three transceiver units through corresponding gain controllers. The beam tracking apparatus according to an embodiment of the present disclosure may individually assign the serving beam and the first tracking beam generated through the first antenna set to a first transceiver unit and a second transceiver unit, respectively and individually assign the second tracking beam generated through the second antenna set to a third transceiver unit. The beam tracking apparatus according to an embodiment of the present disclosure may be configured through the two antenna sets to maintain the serving beam generated through the first antenna set and generate at least one of the remaining two tracking beams. Furthermore, at least one composite beam corresponding to a corresponding antenna set may be formed by combining at least two different directional beams generated through an antenna set. Alternatively, at least one composite beam may be formed or at least one antenna diversity; at least one antenna multiplexing; at least one beam multiplexing; and/or at least one beam diversity may be formed by combining simultaneously or sequentially at least two of at least three directional beams generated through at least two antenna sets.

Figure 38:
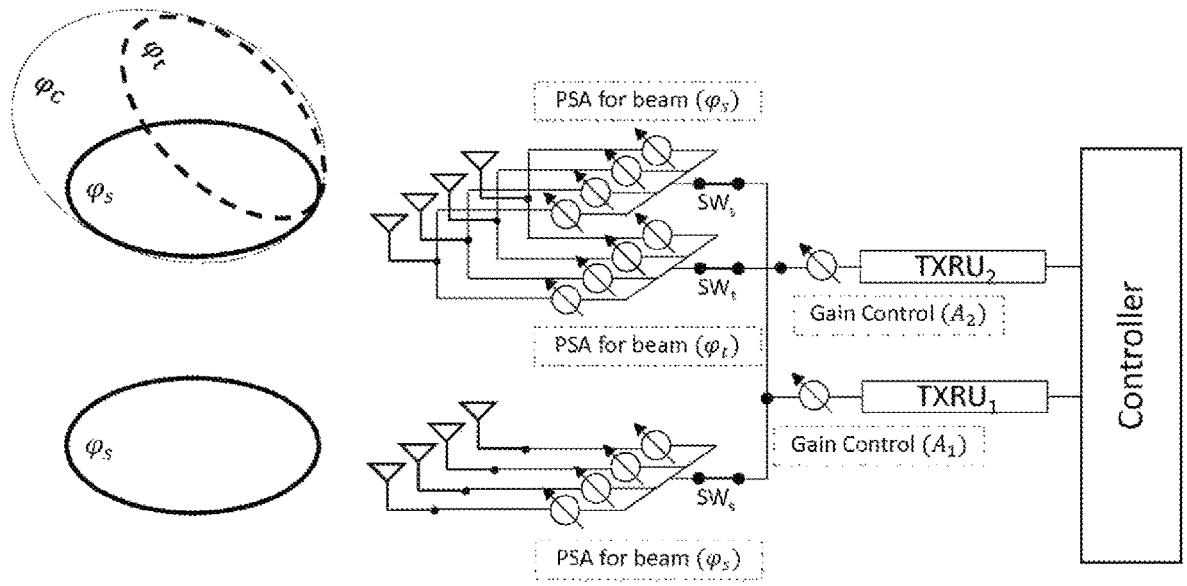

Referring to FIG. 38, two antenna sets may be formed in the antenna unit 21. In this case, two phase shifter arrays (PSAs) may be connected to one antenna set, and one phase shifter array may be connected to the other antenna set. Further, a serving beam φs and a tracking beam φt may be generated through a first antenna set, and a composite beam φc may be formed from them, and the same serving beam φs as the first antenna set may be generated through a second antenna set. Two transceiver units TXRU1,2 of the transceiver 23 operating based on a control operation of the controller 25 may be provided. The phase shifter array for generating the serving beam (i.e., the phase shifter arrays for generating a total of two serving beams) in each of the two antenna sets may be connected to share a first transceiver unit through a corresponding gain controller, and the phase shifter array for generating the tracking beam of the first antenna set may be individually connected to a second transceiver unit through a corresponding gain controller. The beam tracking apparatus according to an embodiment of the present disclosure may assign the two same serving beams respectively generated from the two antenna sets to the first transceiver unit and individually assign the tracking beam generated through the first antenna set to the second transceiver unit. The beam tracking apparatus according to an embodiment of the present disclosure may be configured through the two antenna sets to maintain at least one of the two same serving beams respectively generated from the two antenna sets and generate at least one of the other at least one serving beam except for the maintained at least one serving beam and the tracking beam. Furthermore, at least one composite beam corresponding to a corresponding antenna set may be formed by combining at least two different directional beams generated through an antenna set. Alternatively, at least one composite beam may be formed or at least one antenna diversity; at least one antenna multiplexing; at least one beam multiplexing; and/or at least one beam diversity may be formed by combining simultaneously or sequentially at least two of at least three directional beams generated through at least two antenna sets.

Figure 39:
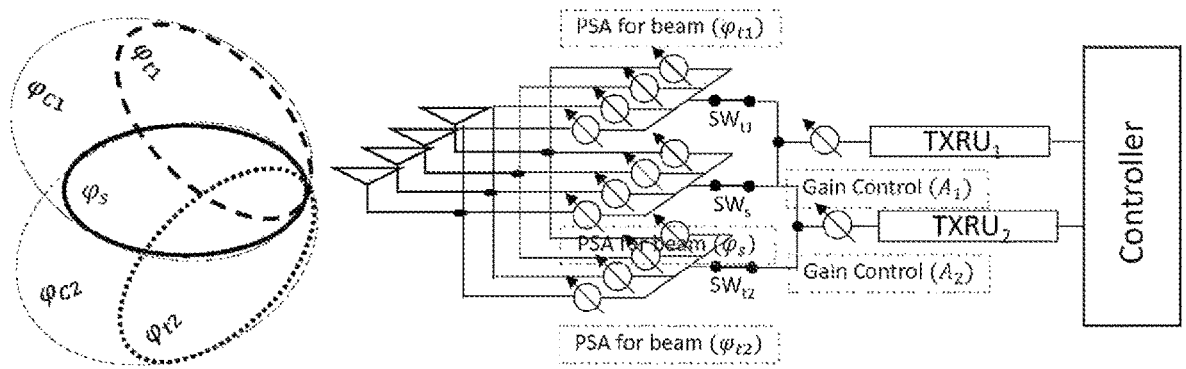

Referring to FIG. 39, an antenna set may be formed in the antenna unit 21, and three phase shifter arrays may be connected to the antenna set. One serving beam φs and two tracking beams φt1 and φt2 may be generated in the antenna set, and two composite beams φc1 and φc2 may be formed from combinations of the serving beam φs and the tracking beams φt1 and φt2. Two transceiver units TXRU1,2 of the transceiver 23 operating based on a control operation of the controller 25 may be provided, and the two phase shifter arrays may be connected to share through gain controllers corresponding to the transceiver units. A first transceiver unit may be assigned to the serving beam and the first tracking beam, and a second transceiver unit may be assigned to the serving beam and the second tracking beam. Each transceiver unit may be connected to the two phase shifter arrays through the gain controller, and the two transceiver units may commonly connected to the phase shifter array for the serving beam. The beam tracking apparatus according to an embodiment of the present disclosure may generate simultaneously or sequentially a first composite beam φc1 from the serving beam and the first tracking beam and a second composite beam φc2 from the serving beam and the second tracking beam. Furthermore, at least one composite beam may be formed or at least one beam multiplexing; and/or at least one beam diversity may be formed by combining simultaneously or sequentially the serving beam and at least two tracking beams. The beam tracking apparatus according to an embodiment of the present disclosure may be configured to maintain the serving beam and generate at least one of the two tracking beams.

As described above, embodiments of the present disclosure form the antenna unit 21 using at least one antenna set, connect at least one phase shifter to the antenna set, and sequentially connect it to a gain controller and a transceiver unit. These configurations capable of being controlled by the controller 25 can be connected with various structures through switches, and the serving beam, the tracking beam, or the composite beam can also be variously implemented. The various structures and implementation methods can be configured to maintain a currently serviced serving beam and generate a tracking beam oriented in a different direction from the serving beam, and may be provided to receive at least two signals from another communication device using the serving beam and the tracking beam and determine change in the serving beam based on the received signal. The various structures and implementation methods are not limited to the structures illustrated and described.

Figure 40:
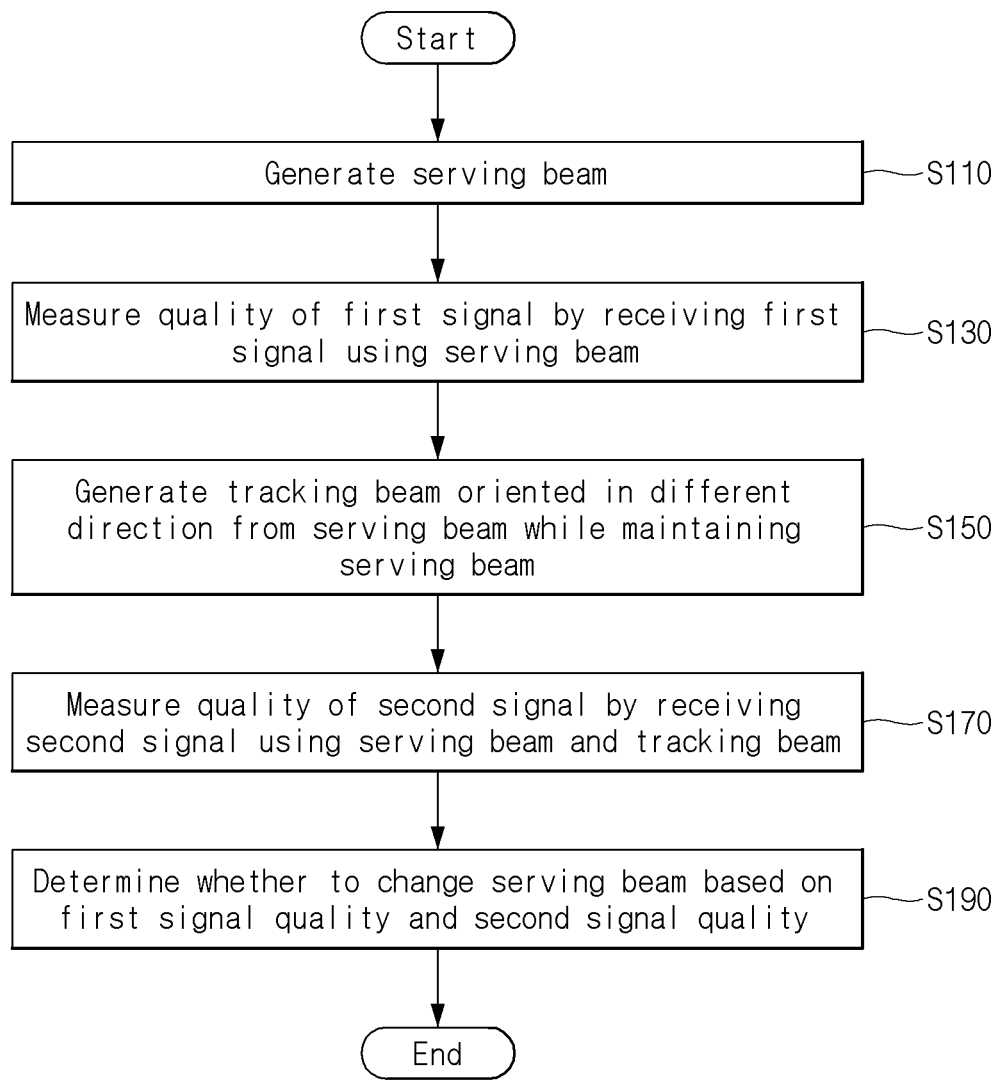
FIG. 40 is a flowchart illustrating a beam tracking method according to another embodiment of the present disclosure.

FIG. 40 is a flowchart illustrating a beam tracking method according to another embodiment of the present disclosure and illustrates a reconstruction of the configuration of FIG. 2 described above in terms of time-series operation. Therefore, only the overview of each step is outlined here to avoid duplication of description. A series of beam tracking processes may be performed through a communication device including an antenna unit capable of simultaneously generating a plurality of directional beams. The directional beam may be generated through beamforming each time or may be selected from among a set of predetermined directional beams, and the communication device may be a reference communication device.

In step S110, the communication device generates a serving beam.

In step S130, the communication device receives a first signal from a target communication device using the serving beam generated through the step S110 to measure a first signal quality of the first signal.

In step S150, the communication device generates a tracking beam oriented in a different direction from the serving beam generated through the step S110 while maintaining the serving beam. More specifically, this process may simultaneously generate a plurality of directional beams oriented in different directions, including the serving beam and the tracking beam, generate a composite beam including a directionality of the serving beam and a directionality of the tracking beam, or simultaneously generate the serving beam and the composite beam, using an antenna set of an array antenna structure to form a beam pattern by combining individual antenna elements or a parasitic array antenna structure. In this instance, if a plurality of tracking beams or a plurality of composite beams are generated, the tracking beams or the composite beams may be generated simultaneously or sequentially using the antenna set. Next, using a phase shifter array that is connected to the antenna set and is provided based on the number of directional beams to be generated, the communication device may flexibly operate other phase shifter array to generate the tracking beam or the composite beam while maintaining the operation of the phase shifter array corresponding to the serving beam.

In the step S110 or the step S150, the directional beam may be generated by pre-determining at least one of the number, directions, or patterns of beams or adaptively determining at least one of the number, directions, or patterns of beams based on at least one of an equipment capability, a communication environment, a moving speed, a channel condition, a channel information usage method, a service condition, a user profile, or an access condition.

In step S170, the communication device measures a second signal quality of a second signal by receiving the second signal from the target communication device using the serving beam and the tracking beam. More specifically, in the step S170, the communication device may continuously maintain the reception of the first signal while receiving the second signal by receiving the at least one second signal using the at least one tracking beam; or receiving the at least one second signal by combining the serving beam and the at least one tracking beam; or receiving the at least one second signal using at least one composite beam including a directionality of the serving beam and a directionality of the at least one tracking beam; or receiving the first signal using the serving beam and at the same time receiving the at least one second signal using the at least one tracking beam, using at least one combination of the serving beam and the at least one tracking beam, or using the at least one composite beam.

For the transmission and reception operations of the serving beam and the tracking beam, the communication device may individually assign one TXRU to each of the serving beam and the at least one tracking beam; individually assign one TXRU to a combination including at least two of the serving beam and the at least one tracking beam; individually assign one TXRU to each of a part of the serving beam and the at least one tracking beam and individually assign other one TXRU to a combination including at least two of other part; individually assign one TXRU to each of a part of at least one composite beam including a directionality of the serving beam and a directionality of the at least one tracking beam and individually assign other one TXRU to a combination including at least two composite beams of other part; assign one TXRU to the serving beam, and individually assign other one TXRU to each of part or all of the at least one tracking beam and individually assign yet other one TXRU to a combination including at least two tracking beams for other part of the at least one tracking beam; or assign one TXRU to the serving beam; and individually assign other one TXRU to each of all or part of at least one combination (hereinafter, referred to as a "serving-tracking beam combination") including the serving beam and at least one of the at least one tracking beam, or the at least one composite beam; and individually assign yet other one TXRU to at least two serving-tracking beam combinations or a combination of at least two composite beams for other part of the at least one serving-tracking beam combination or the at least one composite beam.

Figure 41:
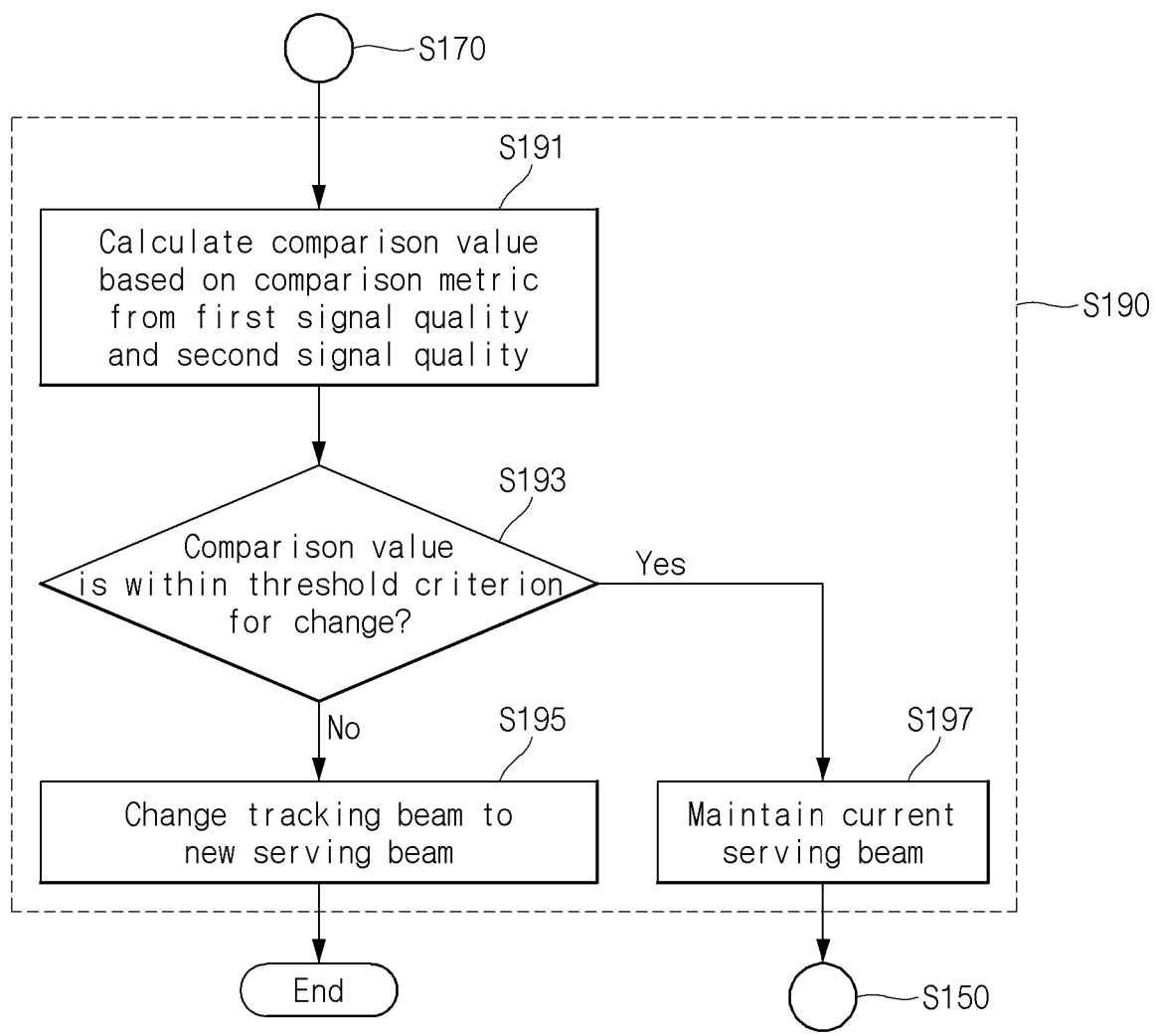
FIG. 41 is a flowchart illustrating in detail a process of determining change in a serving beam based on signal quality in a beam tracking method of FIG. 40.

In step S190, the communication device determines a change in the serving beam based on the measured first signal quality and the measured second signal quality. Each operation is described with reference to FIG. 41 that illustrates in detail the step S190.

In step S191, the communication device calculates a comparison value based on a comparison metric from the first signal quality and the second signal quality. Next, in step S193, if the comparison value calculated through the step S191 is out of a preset threshold criterion for change (e.g., if the comparison value is greater than a single set threshold criterion or does not fall within a set threshold range), step S195 is performed to change the tracking beam to a new serving beam. On the other hand, if the comparison value calculated through the step S191 is within the preset threshold criterion for change (e.g., if the comparison value is less than or equal to the single set threshold criterion or falls within the set threshold range), step S197 is performed to maintain a current serving beam.

Now, returning to the step S150 of generating the tracking beam oriented in the different direction from the serving beam, the communication device may generate a new tracking beam to perform again the series of beam tracking processes described above. For example, subsequent to the beam tracking processes illustrated in FIGS. 40 and 41, the steps S150 to S190 are repeatedly performed using the new tracking beam oriented in a different direction from the tracking beam. In this case, the communication device may generate the new tracking beam oriented in the different direction from the tracking beam through the step S150, measure a new second signal quality of a new second signal by receiving the new second signal from the target communication device using the serving beam and the new tracking beam through the step S170, and determine whether to change the serving beam based on the first signal quality of the first signal and the new second signal quality of the new second signal through the step S190.

Figure 42:
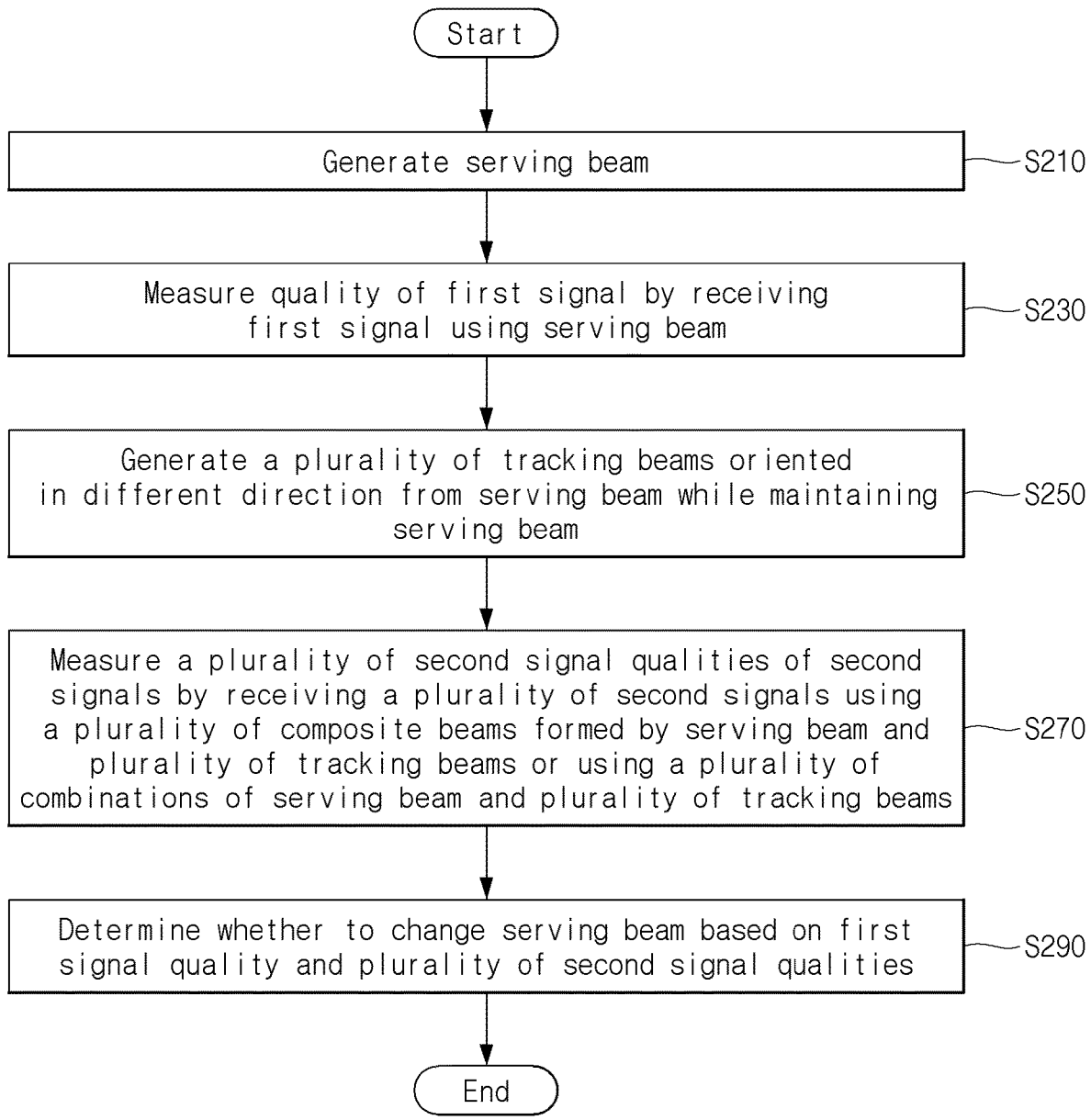
FIG. 42 is a flowchart illustrating a beam tracking method according to another embodiment of the present disclosure.

FIG. 42 is a flowchart illustrating a beam tracking method according to another embodiment of the present disclosure. The beam tracking method of FIG. 42 is partially similar to the beam tracking method of FIG. 40, but proposes a method of determining a change in a serving beam using a plurality of tracking beams. A series of beam tracking processes may be performed through a communication device including an antenna unit capable of simultaneously generating a plurality of directional beams. The directional beam may be generated through beamforming each time or may be selected from among a set of predetermined directional beams, and the communication device may be a reference communication device.

In step S210, the communication device generates a serving beam.

In step S230, the communication device measures a first signal quality of a first signal by receiving the first signal from a target communication device using the serving beam generated through the step S210.

In step S250, the communication device maintains the serving beam generated through the step S210 and simultaneously generates a plurality of tracking beams oriented in a different direction from the serving beam. The tracking beams may be generated as at least two directional beams oriented in different directions from the serving beam.

In step S270, the communication device measures a plurality of second signal qualities of a plurality of second signals by receiving the plurality of second signals from the target communication device using a plurality of composite beams formed by the serving beam and the plurality of tracking beams or using a plurality of combinations of the serving beam and the plurality of tracking beams. In this instance, since the two or more tracking beams are used, the number of composite beans and the number of second signals formed by combinations of the tracking beams and the serving beam are equal to or less than the number of the tracking beams.

Figure 43:
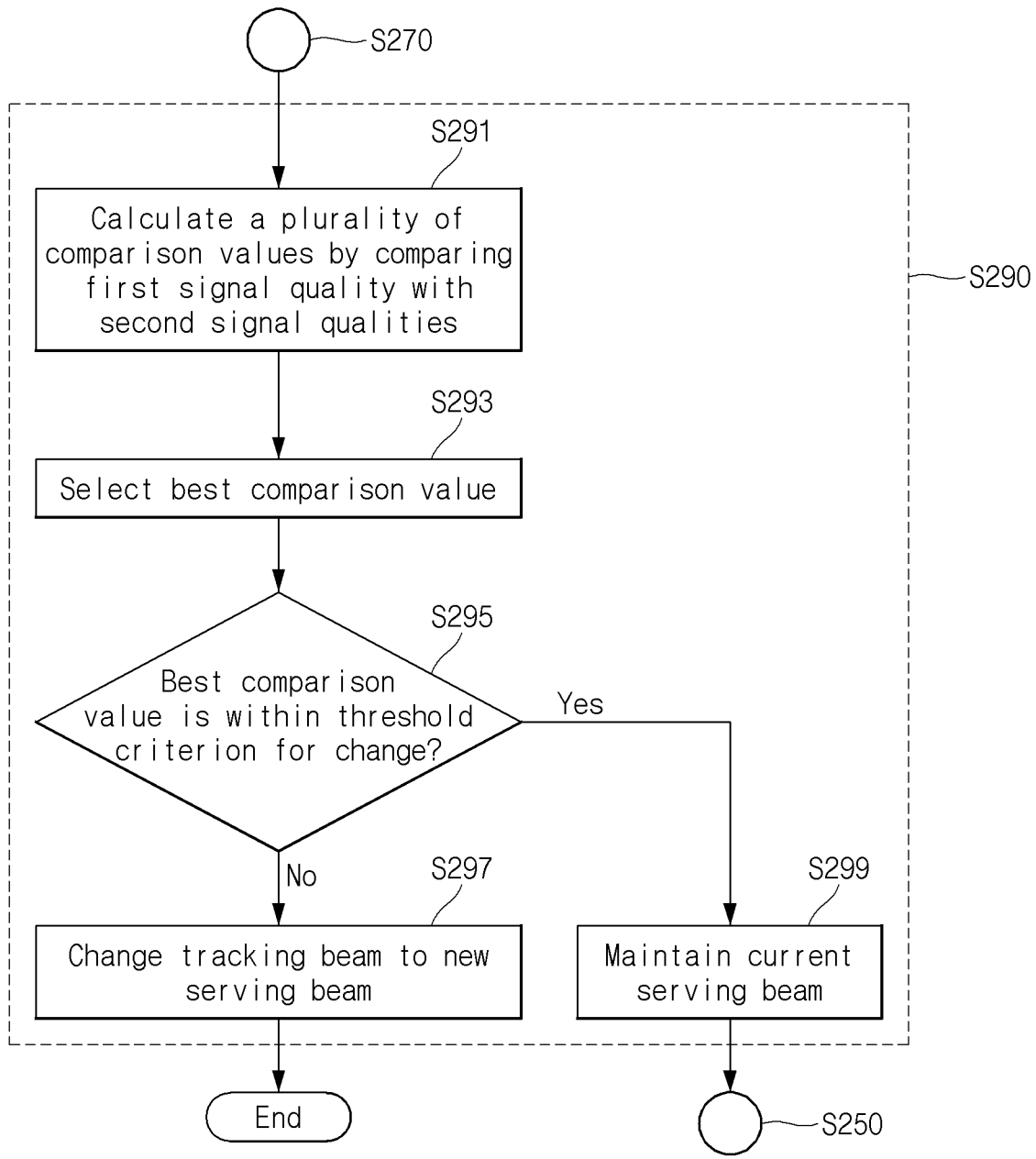
FIG. 43 is a flowchart illustrating in detail a process of determining change in a serving beam based on a best comparative result in a beam tracking method of FIG. 42.

In step S290, the communication device compares the first signal quality with the second signal qualities to determine whether to change the serving beam. Since the number of second signal qualities is also two or more, if the two or more second signal qualities are compared with the first signal quality, two or more of comparison results are also obtained. Therefore, a criterion capable of determining a change in the serving beam based on a plurality of comparison results is required. Each operation is described with reference to FIG. 43 that illustrates in detail the step S290.

In step S291, the communication device compares the first signal quality with the second signal qualities and calculates a plurality of comparison values based on a comparison metric. In step S293, the communication device selects a best comparison value from among the plurality of calculated comparison values. In this instance, since a criterion for superiority of the comparison value may be determined based on a type of the comparison metric, a comparison value indicating the best value among the plurality of comparison values may be selected depending on an implementation environment.

Next, in step S295, if the best comparison value selected through the step S293 is out of a preset threshold criterion for change (e.g., if the best comparison value is greater than a single set threshold criterion or does not fall within a set threshold range), step S297 is performed to change the tracking beam generating the selected best comparison value to a new serving beam. On the other hand, if the best comparison value is within the preset threshold criterion for change (e.g., if the best comparison value is less than or equal to the single set threshold criterion or falls within the set threshold range), step S299 is performed to maintain a current serving beam. Now, returning to the step S250 of generating the plurality of tracking beams oriented in the different direction from the serving beam, the communication device may generate a new tracking beam to perform again the series of beam tracking processes described above.

The embodiments of the present disclosure determine whether to change a serving beam based on a signal received by generating a tracking beam while maintaining the serving beam, and thus can search, track, and switch a directional beam of a terminal without communication disconnection and an additional procedure, processing delay, and resource loss due to control signal exchange in a mobile communication system using directional beams, in response to a channel environment in which rapid and frequent changes in position and direction occur due to rapid mobility, rapid rotation, rapid direction change, rapid shaking, etc. of a mobile communication UE, and can provide the best communication service by actively searching, tracking, and switching the directional beam of the terminal according to changes in a communication channel environment. In particular, the embodiments of the present disclosure generate an additional tracking beam using an additional phase shifter other than a phase shifter for maintaining the serving beam, and thus can be usefully utilized for directional beam search, tracking and switching for the 5G mobile communication system that does not affect current communication services and stipulates communication using directional beams, or the 6G mobile communication systems that will require more urgent use of directional beams in the future.

Embodiments of the present disclosure can be implemented as computer-readable codes on a computer-readable recording medium with respect to a series of control operations for beam tracking. The computer-readable recording medium includes all types of recording devices in which data readable by a computer system is stored.

Examples of the computer-readable recording medium include a ROM, a RAM, a CD-ROM, a magnetic tape, a floppy disk, an optical data storage device, etc. Further, the computer-readable recording medium may be distributed to computer systems connected over a network, and computer-readable codes may be stored and executed in a distributed manner. Functional programs, codes, and code segments for implementing the present disclosure can be easily construed by programmers skilled in the art to which the present disclosure pertains.

As described above, the present disclosure has been examined focusing on its various embodiments. A person having ordinary skills in the technical field to which the present disclosure pertains will be able to understand that the various embodiments can be implemented in modified forms within the scope of the essential characteristics of the present disclosure. Therefore, the disclosed embodiments are to be considered illustrative rather than restrictive. The scope of the present disclosure is shown in the claims rather than the foregoing description, and all differences within the scope should be construed as being included in the present disclosure.

What is claimed is:

1. A beam tracking apparatus comprising:
an antenna unit configured to simultaneously generate a plurality of directional beams;
a transceiver including at least one transceiver unit (TXRU) configured to supply a signal to the antenna unit or receive a signal from the antenna unit; and
a controller configured to control beam generation of the antenna unit and TXRU assignment of the transceiver, wherein the controller is configured to:
control the antenna unit to generate a serving beam;
receive a first signal from a target communication device using the serving beam;
control the antenna unit to generate at least one tracking beam oriented in a different direction from the serving beam while maintaining the serving beam;
receive at least one second signal from the target communication device using the serving beam and the at least one tracking beam; and
determine whether to change the serving beam based on the first signal and the at least one second signal.

2. The beam tracking apparatus of claim 1, wherein the controller is configured to:
measure a first signal quality of the first signal by receiving the first signal from the target communication device using the serving beam;
measure at least one second signal quality of the at least one second signal by receiving the at least one second signal from the target communication device using the serving beam and the at least one tracking beam; and
determine whether to change the serving beam based on the first signal quality and the at least one second signal quality.

3. The beam tracking apparatus of claim 2, wherein the controller is configured to:
calculate at least one comparison value based on a comparison metric from the first signal quality and the at least one second signal quality;
select a best comparison value from among the at least one comparison value; and
when the best comparison value is out of a preset threshold criterion for change, change the tracking beam generating the best comparison value to a new serving beam.

4. The beam tracking apparatus of claim 3, wherein the comparison metric includes at least one of:
a comparison metric based on a difference in signal quality including a metric defined based on a difference obtained by subtracting the first signal quality from the second signal quality, a metric defined based on a logarithm of the difference, and a metric defined based on an exponential function of the difference; and
a comparison metric based on a ratio of signal quality including a metric defined based on a ratio obtained by dividing the second signal quality by the first signal quality, a metric defined based on a logarithm of the ratio, and a metric defined based on an exponential function of the ratio.

5. The beam tracking apparatus of claim 2, wherein the first signal quality or the at least one second signal quality is calculated based on at least one of:
signal quality indicators including a signal-to-noise ratio (SNR), a signal-to-interference-plus-noise ratio (SINR), a reference signal received power (RSRP), a received signal strength indicator (RSSI), a reference signal received quality (RSRQ), and a received channel power indicator (RCPI); and error rate indicators including a bit error rate (BER), a block error rate (BLER), a frame error rate (FER), and a packet error rate (PER).

6. The beam tracking apparatus of claim 1, wherein, in order to receive the at least one second signal using the serving beam and the at least one tracking beam, the controller is configured to:
  receive the at least one second signal using the at least one tracking beam, or
  receive the at least one second signal by combining the serving beam and the at least one tracking beam, or
  receive the at least one second signal using at least one composite beam including a directionality of the serving beam and a directionality of the at least one tracking beam, or
  receive the first signal using the serving beam and at the same time receive the at least one second signal using the at least one tracking beam, at least one combination of the serving beam and the at least one tracking beam, or the at least one composite beam.

7. The beam tracking apparatus of claim 1, wherein the first signal and the at least one second signal include at least one of synchronization signals, reference signals, pilot signals, training signals, preamble/midamble/postamble, control signals, data signals, broadcast signals, and random access signals,
  wherein the synchronization signals include primary synchronization signals (PSS)/secondary synchronization signals (SSS), and
  wherein the reference signals include at least one of a channel state information-reference signal (CSI-RS), a sounding reference signal (SRS), a phase tracking reference signal (PTRS), a demodulation reference signal (DMRS), and a cell specific reference signal (CRS).

8. The beam tracking apparatus of claim 1, wherein the antenna unit includes:
  an antenna set based on an array antenna structure forming a beam pattern by combining individual antenna elements or a parasitic array antenna structure;
  a phase shifter connected to the antenna set and configured to control each of the antenna elements; and
  a gain controller configured to control a gain of the antenna set,
  wherein the antenna set includes one or more antenna sets, and simultaneously or sequentially generates a plurality of directional beams oriented in different directions, including the serving beam and the at least one tracking beam; or simultaneously or sequentially generates at least one composite beam including a directionality of the serving beam and a directionality of the at least one tracking beam; or simultaneously or sequentially generates the serving beam and the at least one composite beam,
  wherein, simultaneously or sequentially generating the plurality of directional beams through the one or more antenna sets, one antenna set generates a plurality of different directional beams, or at least two antenna sets each generate at least one directional beam which is either the same or different among the sets, and
  wherein the phase shifter array is provided according to the number of directional beams to be generated, and other phase shifter array flexibly operates to generate the at least one tracking beam or the at least one composite beam while maintaining the operation of the phase shifter array corresponding to the serving beam.

9. The beam tracking apparatus of claim 8, wherein when the at least one tracking beam or the at least one composite beam is generated as a plurality of tracking beams or a plurality of composite beams, the antenna unit simultaneously or sequentially generates the plurality of tracking beams or the plurality of composite beams using the one or more antenna sets.

10. The beam tracking apparatus of claim 1, wherein, for transmission and reception operations of the serving beam and the at least one tracking beam, the controller is configured to:
  individually assign one TXRU to each of the serving beam and the at least one tracking beam,
  individually assign one TXRU to a combination including at least two of the serving beam and the at least one tracking beam,
  individually assign one TXRU to each of a part of the serving beam and the at least one tracking beam and individually assign other one TXRU to a combination including at least two of other part,
  individually assign one TXRU to each of a part of at least one composite beam including a directionality of the serving beam and a directionality of the at least one tracking beam and individually assign other one TXRU to a combination including at least two composite beams of other part,
  assign one TXRU to the serving beam, and individually assign other one TXRU to each of part or all of the at least one tracking beam and individually assign yet other one TXRU to a combination including at least two tracking beams for other part of the at least one tracking beam, or
  assign one TXRU to the serving beam; and individually assign other one TXRU to each of all or part of at least one serving-tracking beam combination, which is at least one combination including the serving beam and at least one of the at least one tracking beam, or the at least one composite beam; and individually assign yet other one TXRU to at least two serving-tracking beam combinations or a combination of at least two composite beams for other part of the at least one serving-tracking beam combination or the at least one composite beam.

11. A method of performing beam tracking by a communication device including an antenna unit simultaneously generating a plurality of directional beams, the method comprising steps of:
  (a) generating a serving beam;
  (b) measuring a first signal quality of a first signal by receiving the first signal from a target communication device using the serving beam;
  (c) generating at least one tracking beam oriented in a different direction from the serving beam while maintaining the serving beam;
  (d) measuring at least one second signal quality of the at least one second signal by receiving the at least one second signal from the target communication device using the serving beam and the at least one tracking beam; and
  (e) determining whether to change the serving beam based on the first signal quality and the at least one second signal quality.

12. The method of claim 11, wherein the step (c) comprises steps of:
  (c1) by using one or more antenna sets based on an array antenna structure forming a beam pattern by combining individual antenna elements or a parasitic array antenna structure, simultaneously or sequentially generating a plurality of directional beams oriented in different directions, including the serving beam and the at least one tracking beam, or simultaneously or sequentially generating at least one composite beam including a directionality of the serving beam and a directionality of the at least one tracking beam; or simultaneously or sequentially generating the serving beam and the at least one composite beam; and (c2) by using a phase shifter array that is connected to the one or more antenna sets and is provided according to the number of directional beams to be generated, flexibly operating other phase shifter array to generate the at least one tracking beam or the at least one composite beam while maintaining the operation of the phase shifter array corresponding to the serving beam.

13. The method of claim 12, wherein when the at least one tracking beam or the at least one composite beam is generated as a plurality of tracking beams or a plurality of composite beams, the step (c1) comprises simultaneously or sequentially generating the plurality of tracking beams or the plurality of composite beams using the one or more antenna sets.

14. The method of claim 11, wherein the step (c) comprises:
pre-determining at least one of the number, directions, or patterns of beams, or
adaptively determining at least one of the number, directions, or patterns of beams based on at least one of an equipment capability, a communication environment, a moving speed, a channel condition, a channel information usage method, a service condition, a user profile, or an access condition.

15. The method of claim 11, further comprising, for transmission and reception operations of the serving beam and the at least one tracking beam:
individually assigning one transceiver unit (TXRU) to each of the serving beam and the at least one tracking beam,
individually assigning one TXRU to a combination including at least two of the serving beam and the at least one tracking beam,
individually assigning one TXRU to each of a part of the serving beam and the at least one tracking beam and individually assigning other one TXRU to a combination including at least two of other part,
individually assigning one TXRU to each of a part of at least one composite beam including a directionality of the serving beam and a directionality of the at least one tracking beam and individually assigning other one TXRU to a combination including at least two composite beams of other part,
assigning one TXRU to the serving beam, and individually assigning other one TXRU to each of part or all of the at least one tracking beam and individually assigning yet other one TXRU to a combination including at least two tracking beams for other part of the at least one tracking beam, or
assigning one TXRU to the serving beam, and individually assigning other one TXRU to each of all or part of at least one serving-tracking beam combination, which is at least one combination including the serving beam and at least one of the at least one tracking beam, or the at least one composite beam; and individually assigning yet other one TXRU to at least two serving-tracking beam combinations or a combination of at least two composite beams for other part of the at least one serving-tracking beam combination or the at least one composite beam.

16. The method of claim 11, wherein, in order to receive the at least one second signal using the serving beam and the at least one tracking beam, the step (d) comprises:
receiving the at least one second signal using the at least one tracking beam, or
receiving the at least one second signal by combining the serving beam and the at least one tracking beam, or
receiving the at least one second signal using at least one composite beam including a directionality of the serving beam and a directionality of the at least one tracking beam, or
receiving the first signal using the serving beam and at the same time receiving the at least one second signal using the at least one tracking beam, at least one combination of the serving beam and the at least one tracking beam, or the at least one composite beam.

17. The method of claim 11, wherein the step (e) comprises steps of:
(e1) calculating at least one comparison value based on a comparison metric from the first signal quality and the at least one second signal quality;
(e2) selecting a best comparison value from among the at least one comparison value; and
(e3) when the best comparison value is out of a preset threshold criterion for change, changing the tracking beam generating the best comparison value to a new serving beam.

18. The method of claim 11, further comprising step of:
(f) repeatedly performing the steps (c) to (e) using at least one new tracking beam oriented in a different direction from the at least one tracking beam, wherein the step (f) comprises generating the at least one new tracking beam oriented in the different direction from the at least one tracking beam while maintaining the serving beam through the step (c), measuring at least one new second signal quality by receiving at least one new second signal from the target communication device using the serving beam and the at least one new tracking beam through the step (d), and determining whether to change the serving beam based on the first signal quality and the at least one new second signal quality through the step (e).

19. A method of performing beam tracking by a communication device including an antenna unit simultaneously generating a plurality of directional beams, the method comprising:
generating a serving beam;
measuring a first signal quality of a first signal by receiving the first signal from a target communication device using the serving beam;
simultaneously or sequentially generating a plurality of tracking beams oriented in a different direction from the serving beam or a plurality of composite beams based on the serving beam and the plurality of tracking beams while maintaining the serving beam;
measuring a plurality of second signal qualities of a plurality of second signals by receiving the plurality of second signals from the target communication device using a plurality of combinations including the serving beam and the plurality of tracking beams or using the plurality of composite beams; and
determining whether to change the serving beam by comparing the first signal quality with the plurality of second signal qualities.

20. The method of claim 19, wherein determining whether to change the serving beam comprises:
- calculating a plurality of comparison values based on a comparison metric by comparing the first signal quality with each of the plurality of second signal qualities;
- selecting a best comparison value from among the plurality of comparison values; and
- when the best comparison value is out of a preset threshold criterion for change, changing the tracking beam generating the best comparison value to a new serving beam.

* * * * *